United States Patent [19]

Ishihara et al.

[11] Patent Number: 6,124,945
[45] Date of Patent: Sep. 26, 2000

[54] COLOR IMAGE TRANSFER PROCESSING APPARATUS AND METHOD, COLOR IMAGE RECONSTRUCTION PROCESSING APPARATUS AND METHOD, AND COLOR IMAGE TRANSFER SYSTEM

[75] Inventors: Kouki Ishihara; Takamitsu Aoki; Kouji Maeda; Masayuki Horii; Keizou Ueno; Kazuhiro Tamada; Eiichi Ebihara; Toshio Konaka; Hiroyuki Kaneda; Shigeyoshi Nakamura, all of Kawasaki; Moriaki Sugimoto, Yokohama, all of Japan

[73] Assignee: Fujitsu Limited, Kawasaki, Japan

[21] Appl. No.: 09/045,010

[22] Filed: Mar. 20, 1998

[30] Foreign Application Priority Data

Jun. 9, 1997 [JP] Japan .................................. 9-150535

[51] Int. Cl.[7] .............................. G06F 15/00; G03F 3/08
[52] U.S. Cl. ......................... 358/1.9; 358/523; 382/165
[58] Field of Search ...................... 358/523, 524, 358/520, 539, 534, 536, 1.9, 1.2, 1.16; 382/165, 162, 163, 167

[56] References Cited

U.S. PATENT DOCUMENTS

| | | | |
|---|---|---|---|
| 5,515,451 | 5/1996 | Tsuji et al. | 382/135 |
| 5,633,952 | 5/1997 | Outa et al. | 382/165 |
| 5,828,470 | 10/1998 | Maeda et al. | 358/504 |
| 5,835,243 | 11/1998 | Mori | 382/167 |
| 5,835,244 | 11/1998 | Bestmann | 382/167 |
| 6,005,680 | 12/1999 | Luther et al. | 358/456 |

FOREIGN PATENT DOCUMENTS

| | | |
|---|---|---|
| 0 711 069 | 5/1996 | European Pat. Off. . |
| 19525177 | 7/1995 | Germany . |
| 7-49677 | 2/1995 | Japan . |
| 8-65672 | 3/1996 | Japan . |

OTHER PUBLICATIONS

L.M. Po, et al., "Quadtree Based Colour Quantisation Image Compression", *Electornics Letters*, vol. 31, No. 23, (Nov. 1995), pp. 1988–1990.

Primary Examiner—Madeleine Nguyen
Attorney, Agent, or Firm—Staas & Halsey, LLP

[57] ABSTRACT

A color image is scanned in the matrix direction by the number of colors calculating unit and the number (A) of colors of different full color pixel values is counted. In this instance, each time the number (A) of colors is counted up, a pallet forming unit sequentially stores the full color pixel values as representative colors into entries and forms a subtractive color pallet. When the number (A) of colors exceeds the number (n) of entries of the subtractive color pallet, a transfer format discriminating unit counts the number (N) of transfer pixels up to the end of one-preceding row and compares a transfer data amount by a full color format with a transfer data amount by a pallet format in the number (N) of transfer pixels, thereby allowing the data transfer by the color format of a smaller one of the transfer data amounts to be executed by a data transfer unit.

19 Claims, 42 Drawing Sheets

FIG. 1A PRIOR ART
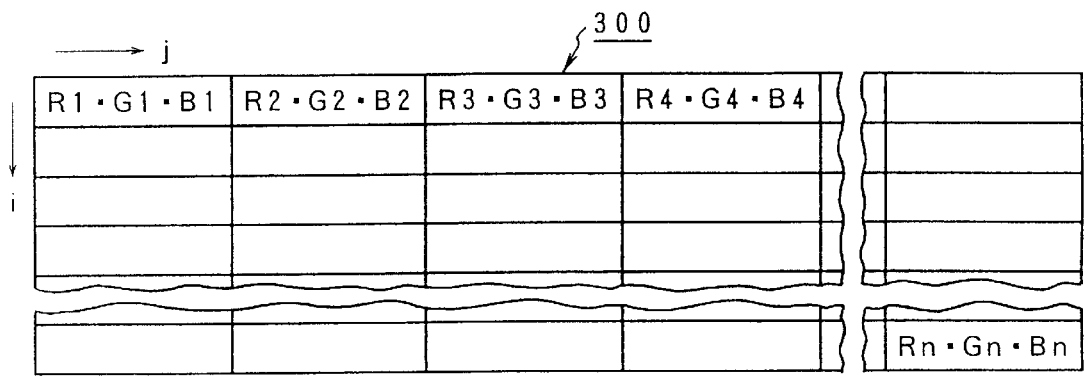
FIG. 1B PRIOR ART
| ENTRY | REPRESENTATIVE COLOR |
|---|---|
| 001 | REP (R1·G1·B1) |
| 002 | REP (R2·G2·B2) |
| 003 | REP (R3·G3·B3) |
| 004 | REP (R4·G4·B4) |
| 005 | REP (R5·G5·B5) |
| 006 | REP (R6·G6·B6) |
| ⋮ | ⋮ |
| 256 | REP (Rn·Gn·Bn) |
FIG. 1C PRIOR ART
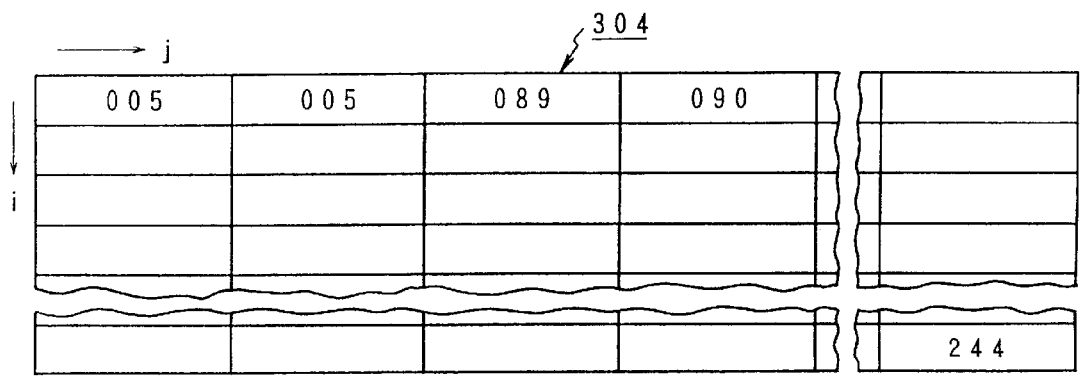

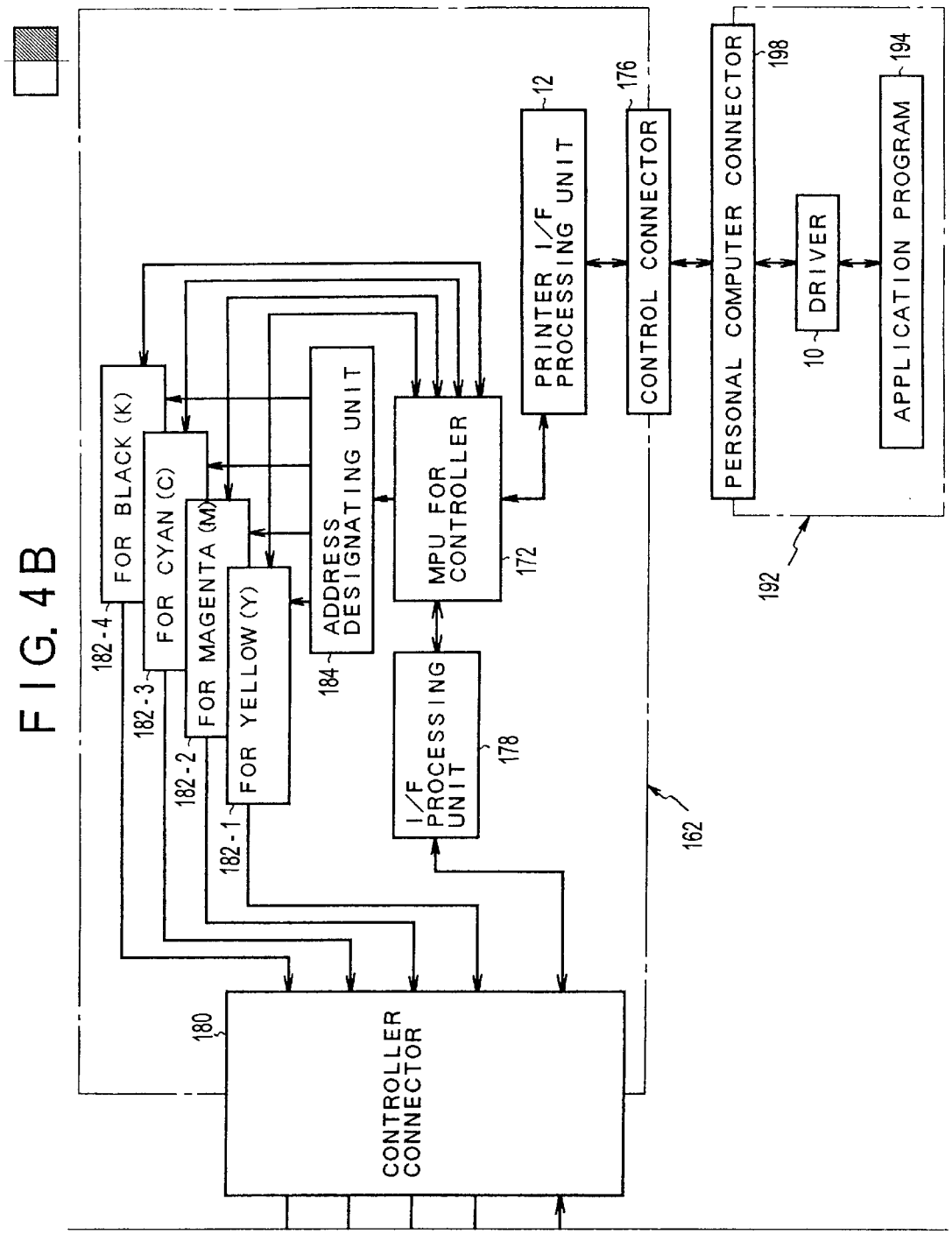

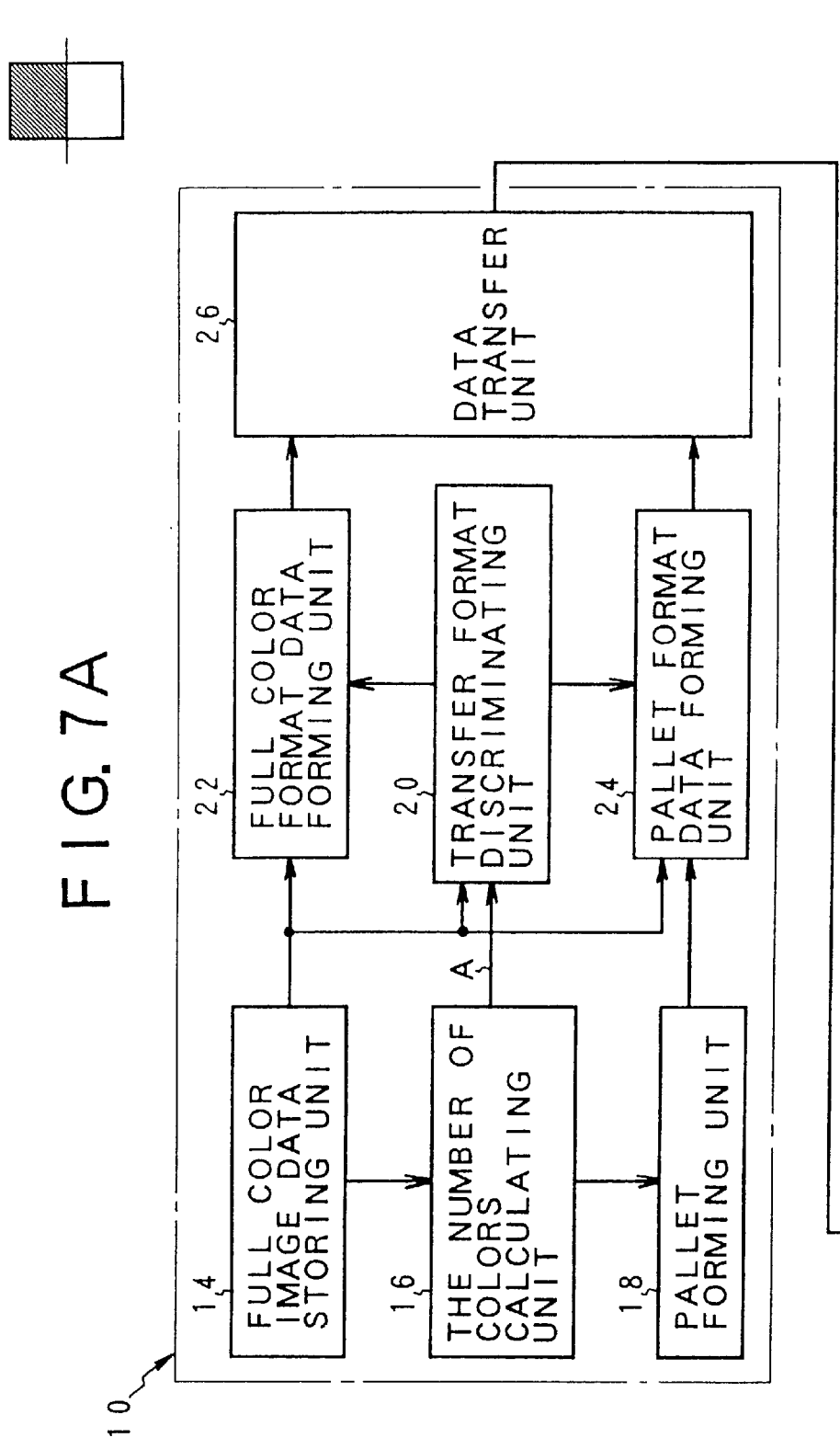

SUBTRACTIVE COLOR PALLET (LUT) OF 8-BIT ENTRY

| 8-BIT ENTRY En | REPRESENTATIVE COLOR (RGB EACH 8 BITS) |
|---|---|
| 0 | R000·B000·G000 |
| 1 | R001·B001·G001 |
| 2 | R002·B002·G002 |
| 3 | R003·B003·G003 |
| 4 | R004·B004·G004 |
| ⋮ | ⋮ |
| 255 | R255·B255·G255 |

FIG. 12

SUBTRACTIVE COLOR PALLET (LUT) OF 7-BIT ENTRY

| 7-BIT ENTRY $E_n$ | REPRESENTATIVE COLOR (RGB EACH 8 BITS) |
|---|---|
| 0 | R00·B00·G00 |
| 1 | R01·B01·G01 |
| 2 | R02·B02·G02 |
| 3 | R03·B03·G03 |
| 4 | R04·B04·G04 |
| ⋮ | ⋮ |
| 128 | R128·B128·G128 |

SUBTRACTIVE COLOR PALLET (LUT) OF 6-BIT ENTRY

| 6-BIT ENTRY $E_n$ | REPRESENTATIVE COLOR (RGB EACH 8 BITS) |
|---|---|
| 0 | R00·B00·G00 |
| 1 | R01·B01·G01 |
| 2 | R02·B02·G02 |
| 3 | R03·B03·G03 |
| 4 | R04·B04·G04 |
| ⋮ | ⋮ |
| 64 | R64·B64·G64 |

SUBTRACTIVE COLOR PALLET (LUT) OF 5-BIT ENTRY

| 5-BIT ENTRY $E_n$ | REPRESENTATIVE COLOR (RGB EACH 8 BITS) |
|---|---|
| 0 | R00·B00·G00 |
| 1 | R01·B01·G01 |
| 2 | R02·B02·G02 |
| 3 | R03·B03·G03 |
| 4 | R04·B04·G04 |
| ⋮ | ⋮ |
| 32 | R32·B32·G32 |

FIG. 15

| THE NUMBER n OF PALLET ENTRIES | THE NUMBER OF ENTRY BITS | THE NUMBER OF PEXELS IN WHICH PALLET AND FULL COLOR DATA AMOUNT COINCIDE | DISCRIMINATION THRESHOLD VALUE B OF PALLET AND FULL COLOR ($\alpha=10$) |
|---|---|---|---|
| 256 | 8 | 384 | 394 |
| 128 | 7 | 192 | 202 |
| 64 | 6 | 96 | 106 |
| 32 | 5 | 48 | 58 |

FIG. 18

| MODE | COLOR NUMBER CHECK BITS |
|---|---|
| 1 | ● ● ● ● ● ● ● ● |
| 2 | ● ● ● ● ● ● ● × |
| 3 | ● ● ● ● ● ● × × |
| 4 | ● ● ● ● ● × × × |

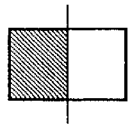
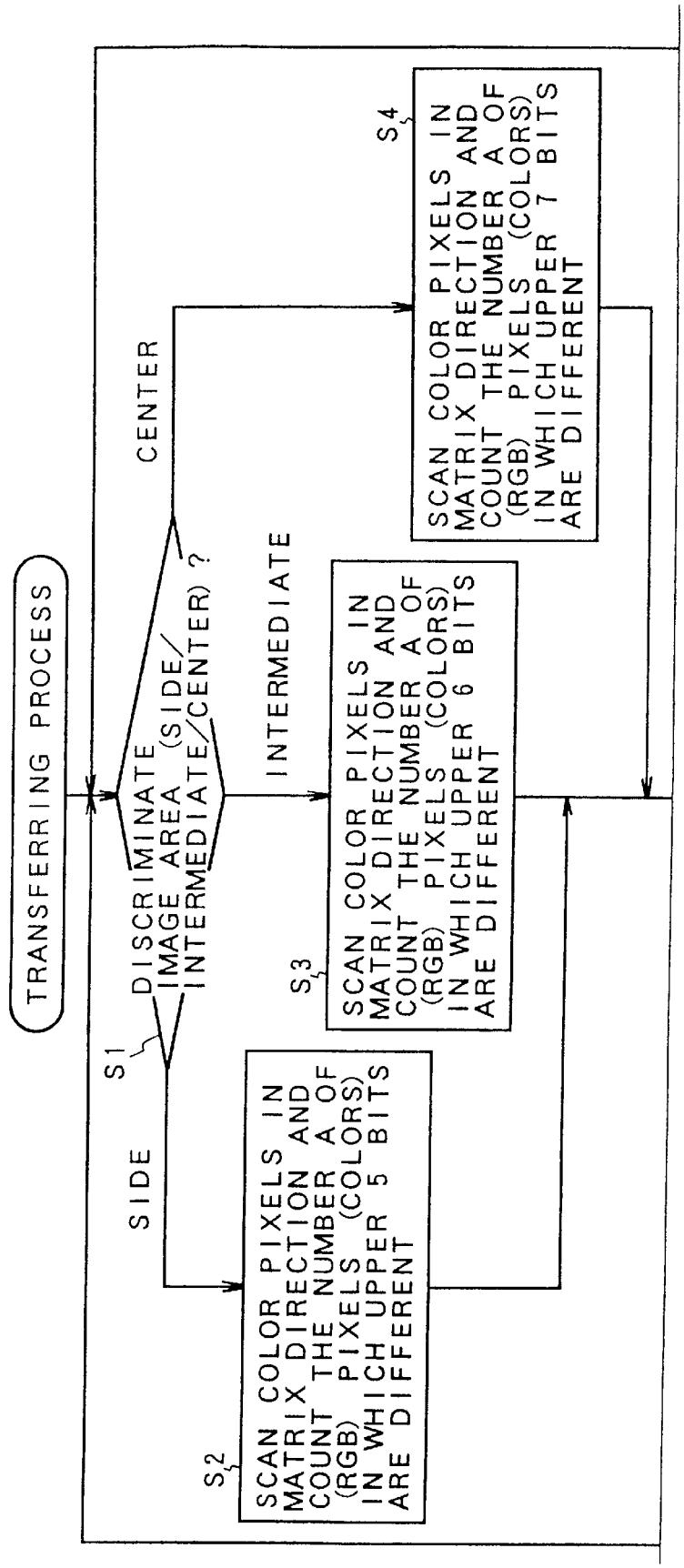
FIG. 19A

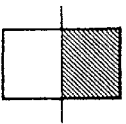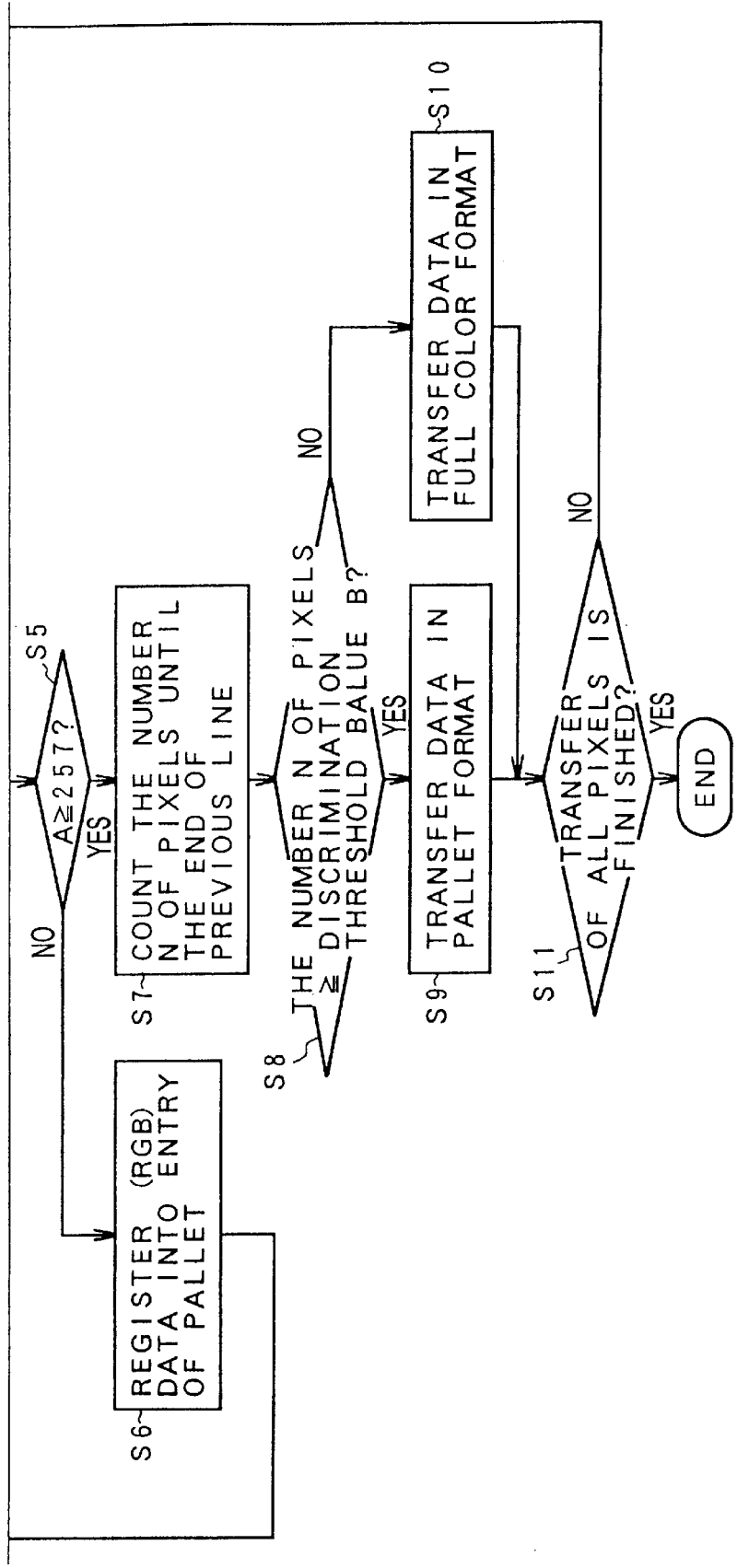
FIG. 19B

FIG. 25

B PALLET (200-3)

| B PIXEL VALUE | B DATA | LUT 2-BIT ENTRY |
|---|---|---|
| 255 | 246 | 11 |
| 223 | 190 | 10 |
| 159 | 132 | 01 |
| 95 | 41 | 00 |
| 0 | | |

G PALLET (200-2)

| G PIXEL VALUE | G DATA | LUT 3-BIT ENTRY |
|---|---|---|
| 255 | 247 | 111 |
| 239 | 222 | 110 |
| 207 | 192 | 101 |
| 175 | 159 | 100 |
| 143 | 125 | 011 |
| 111 | 95 | 010 |
| 79 | 64 | 001 |
| 47 | 21 | 000 |
| 0 | | |

R PALLET (200-1)

| R PIXEL VALUE | R DATA | LUT 3-BIT ENTRY |
|---|---|---|
| 255 | 246 | 111 |
| 239 | 232 | 110 |
| 223 | 205 | 101 |
| 191 | 176 | 100 |
| 159 | 141 | 011 |
| 127 | 111 | 010 |
| 95 | 80 | 001 |
| 63 | 28 | 000 |
| 0 | | |

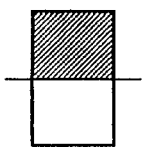
FIG. 26A
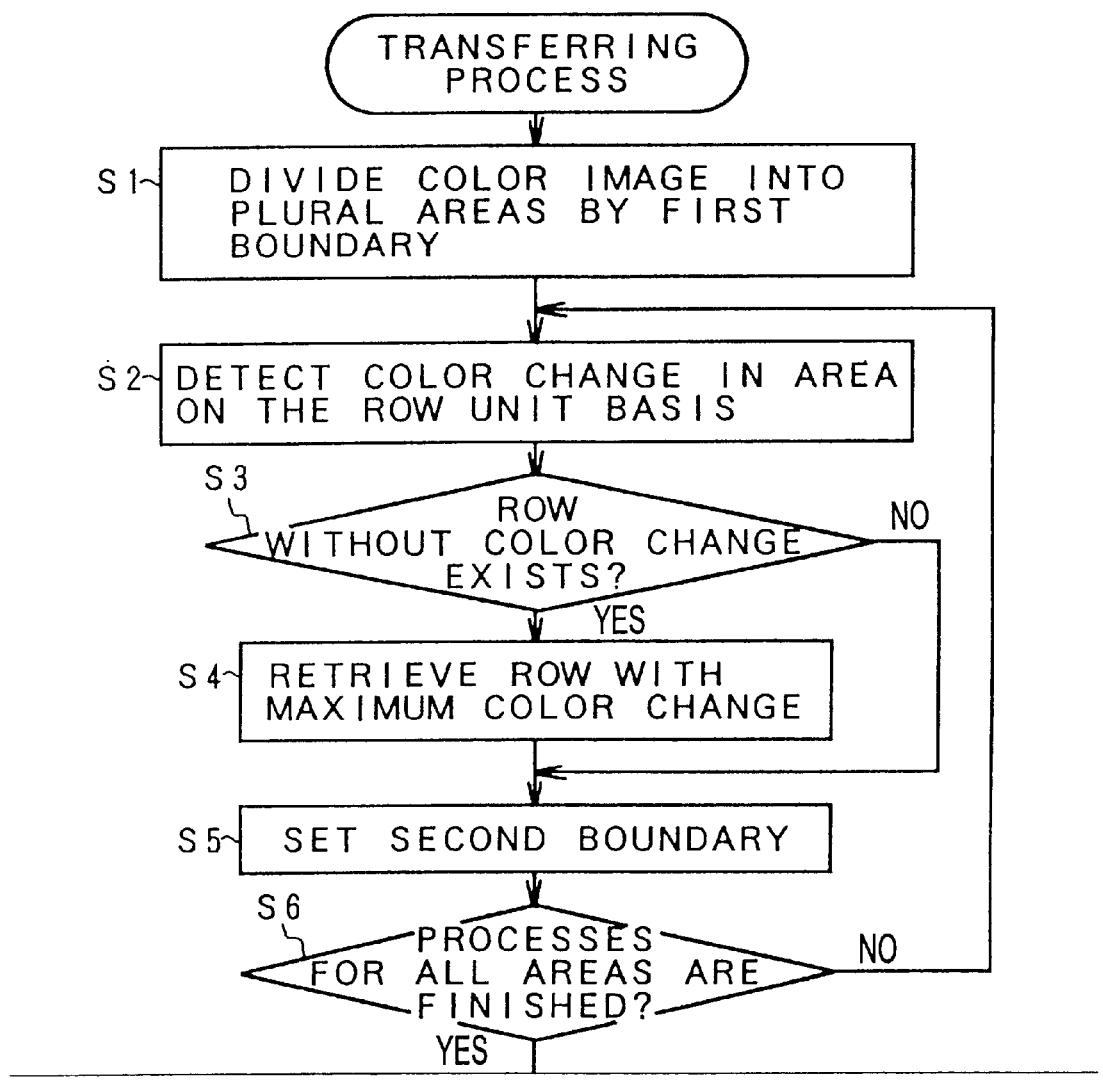

FIG. 26B
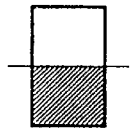
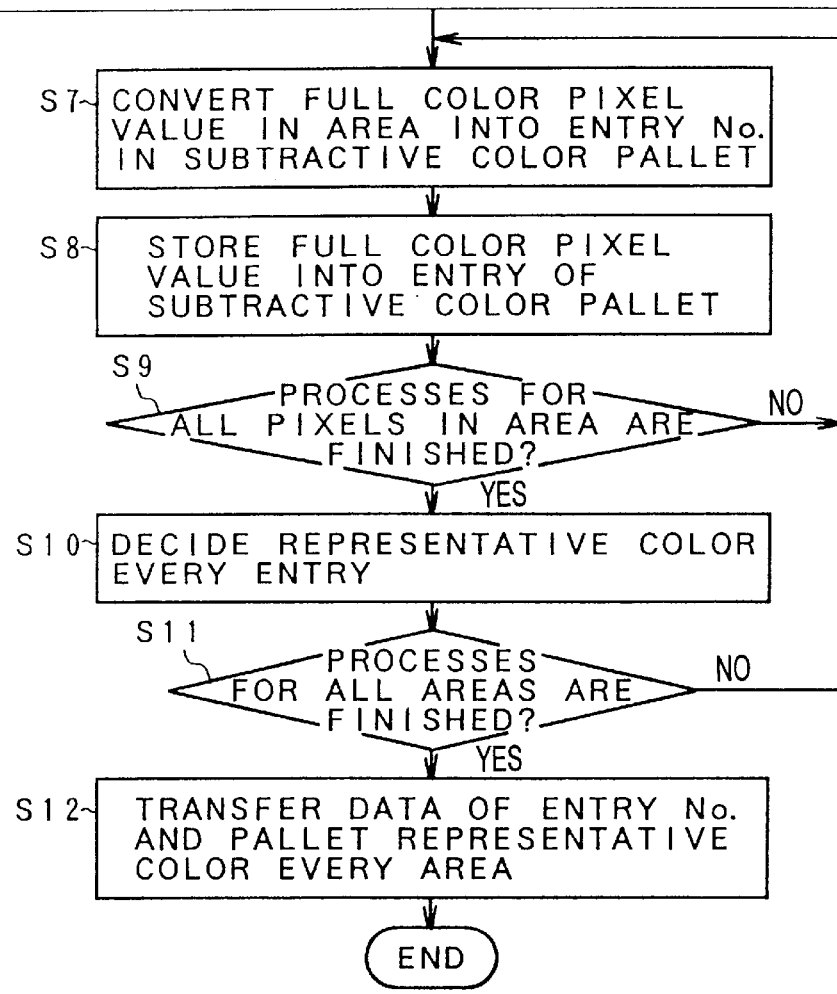

FIG. 31A 214-1

| COLOR No. | 1 | 2 | 3 | .... | 256 |
|---|---|---|---|---|---|
| Y | 10/256 | 15/256 | 32/256 | .... | 44/256 |
| M | 20/256 | 45/256 | 51/256 | .... | 51/256 |
| C | 30/256 | 62/256 | 72/256 | .... | 17/256 |

FIG. 31B 214-2

| COLOR No. | 1 | 2 | 3 | .... | 256 |
|---|---|---|---|---|---|
| Y | 10/256 | 15/256 | 32/256 | .... | 44/256 |
| M | 20/256 | 45/256 | 51/256 | .... | 51/256 |
| C | 30/256 | 62/256 | 72/256 | .... | 17/256 |

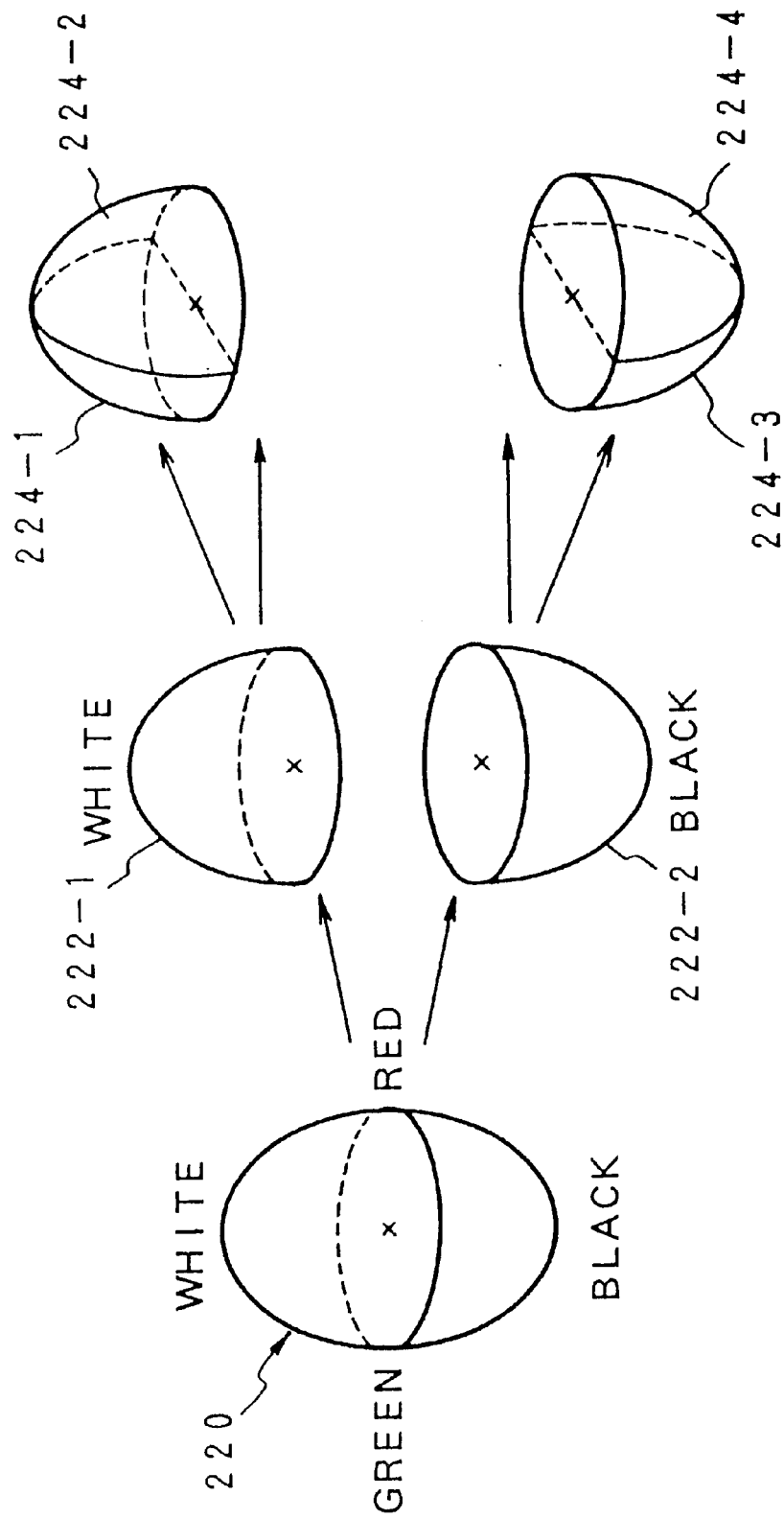

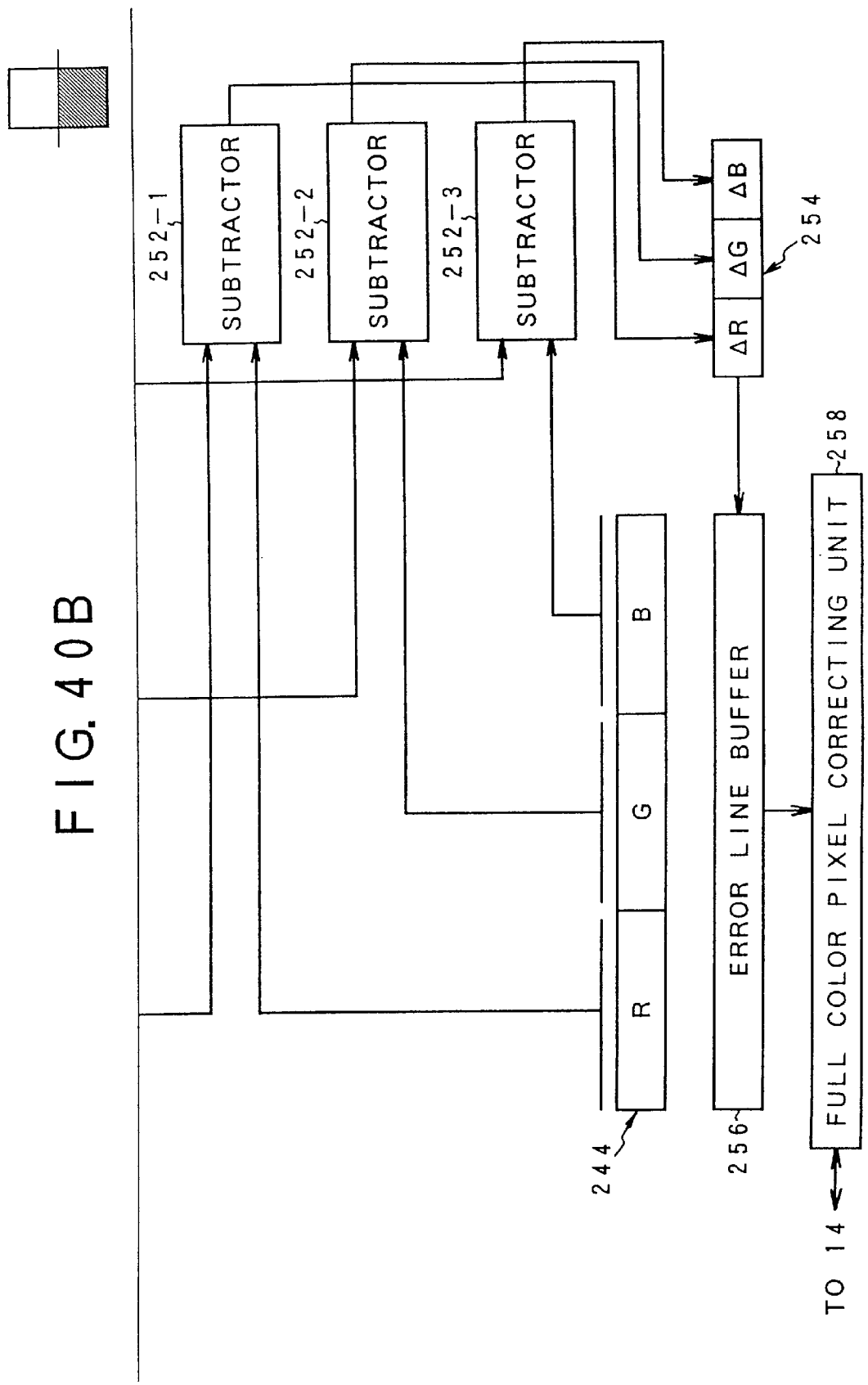

COLOR IMAGE TRANSFER PROCESSING APPARATUS AND METHOD, COLOR IMAGE RECONSTRUCTION PROCESSING APPARATUS AND METHOD, AND COLOR IMAGE TRANSFER SYSTEM

BACKGROUND OF THE INVENTION

The present invention relates to color image transfer processing apparatus and method, color image reconstruction processing apparatus and method, and a color image transfer system for compressing color image data of a full color space which is treated in a computer by a subtractive color pallet and for transferring the compressed data to equipment such as a printer or the like. More particularly, the invention relates to color image transfer processing apparatus and method, color image reconstruction processing apparatus and method, and a color image transfer system for compressing color image data by a subtractive color process using a subtractive color pallet every divided area of the color image data and for transferring the compressed data.

Hitherto, in a color image which is processed on a computer, with respect to an RGB display system as an example, the color image is expressed by 8 bits of each of color components of R, G, and B and color image data of a full color space of (256)×(256)×(256)=16,777,216 colors by combinations of R, G, and B is treated. When the full color image data is transferred as it is to an external apparatus such as a printer or the like, however, since one pixel consists of three bytes, there are problems such that an amount of data increases in proportional to three times of the number of pixels, a buffer capacity on the printer side increases, and it takes a longer time for data transfer. Consequently, a pallet transfer system (subtractive color processing system) for converting full color pixel data of three bytes into halftone data of one byte by using a LUT (look-up table) called a subtractive color pallet and for transferring the halftone data is used.

FIGS. 1A to 1C schematically show the pallet transfer system. FIG. 1A shows color image data 300 having the number (N) of color pixels of a full color space as a target to be transferred. The color image data 300 is constructed by (N) pixels in which each position is designated by (i) row and (j) column. For example, in the RGB space, one color pixel is constructed by pixel data of R, G, and B of three bytes. FIG. 1B shows a subtractive color pallet 302 which is used for transfer of the color image data 300 of FIG. 1A. The number of colors which can be simultaneously expressed in a color image is limited to representative colors of, for example, n=256 colors. That is, the subtractive color pallet 302 has 256 entries shown by entry numbers 001 to 256 and RGB pixel data of three bytes is stored as a representative color in each entry. There are two kinds of methods of determining the 256 representative colors: namely, a fixed dividing method of determining by dividing the RGB full color space into 256 spaces which are decided by a predetermined number of entries; and a variable dividing method of distributing pixels into the RGB full color space and dividing the RGB full color space into 256 spaces.

According to the fixed dividing method, as shown in FIG. 2, an RGB space 306 is preliminarily divided into 256 spaces. Specifically, the space division is determined by a combination of upper bits of 8-bit data of each of the color components of R, G, and B. For example, when each of the R axis and the G axis is divided into eight portions by using upper three bits of each of the R and G components and the B axis is divided into four portions by using upper two bits of the B component, the space can be divided into (8×8×4=) 256 spaces. When the space can be divided into the 256 spaces as mentioned above, representative color candidates are determined in consideration of a distribution of the RGB color pixels of FIG. 1A in the divided spaces, and an average value of the RGB representative color candidates existing in each divided space is obtained and is registered as a representative color in the subtractive color pallet 302 as shown in FIG. 1B. By forming the entries of the subtractive color pallet of FIG. 1B by upper three bits of each of the R and G components and upper two bits of the B component, it can be determined that the RGB color pixel belongs to which one of the divided space. That is, the 8-bit entry of an arbitrary RGB color pixel is constructed by the following bits.

bits b7 to b5=upper three bits of the R component
bits b4 to b2=upper three bits of the G component
bits b1 to b0=upper two bits of the B component When they are expressed by a decimal notation, they become the entry number in FIG. 1B. Consequently, the full color 3-byte RGB pixel data in FIG. 1A is converted to a halftone code 304 expressed by the 8-bit entry number in FIG. 1C by using upper three bits of each of the R and G components and the upper two bits of the B component and the halftone code 304 is transferred. Simultaneously, the representative colors corresponding to the 256 entries of the subtractive color pallet of FIG. 1B are also transferred as pallet representative colors, thereby enabling the subtractive color pallet to be reconstructed on the transfer destination side. In the transfer destination, the subtractive color pallet 302 as shown in FIG. 1B is reconstructed from the received representative colors and the RGB color pixel data of the representative color is reconstructed with reference to the subtractive color pallet 302 from the entry number as a halftone code in FIG. 1C which was simultaneously received. The data amount when the full color three-byte RGB data of (N) pixels is transferred is equal to (3×N) bytes. On the other hand, according to the pallet transfer, it is sufficient that the halftone data showing the entry consists of (N) bytes, which is ⅓ of the above data amount. Even when the data amount of (256×3=) 768 bytes of the 3-byte RGB data of the 256 representative colors of the pallet is added to (N) bytes, the data amount can be sufficiently reduced.

On the other hand, according to the variable dividing method of determining the representative colors of the subtractive color pallet, the distribution of (N) color pixels in FIG. 1A in the RGB space 306 in FIG. 2 is considered and the color space is divided into two equal spaces so that the numbers of distributed pixels are equal. The dividing operation is finished at a time point when the dividing number is equal to 256 as the number of entries, and the average value of the RGB color pixels existing in each divided space is obtained and is registered as a representative color into the subtractive color pallet. The determination of the representative colors by the variable dividing method is preferable from a viewpoint that the size of each divided space dynamically changes according to the contents of the color image data which is transferred and the representative color that is closer to the original color can be reconstructed. However, it takes a long processing time to divide the space when the representative colors are decided. When one subtractive color pallet is formed for the whole color image data as a target and the color image data is converted to the halftone data and is transferred, the differences between the original color image and the representative colors of the subtractive color pallet are relatively large and there is a case where reproducibility of a reconstructed color image by the representative colors obtained from the halftone data with reference to the pallet is not so good. Therefore, the color image data 300 is divided into a plurality of areas #1 to #6 in the row direction as shown in FIG. 3, a subtractive color pallet is formed every one of the divided areas #1 to #6, and the color image data 300 is converted to a halftone code which is expressed by the representative color and the entry number and is transferred, thereby improving the reproducibility of the color image on the transfer destination side.

In the pallet transfer system according to such an area division, a color deviation in each area can be expressed and the reproducibility of the color is improved as compared with that in case of selecting the representative color in the whole image data. Since the subtractive color pallet is formed by selecting the representative color every area, however, there are problems such that even in case of the same color, the representative color differs every area, and even if the same color is used in two areas before and after the boundary of the areas, when the color image is reconstructed by the representative colors from the halftone codes, a color deviation occurs at the area boundary.

SUMMARY OF THE INVENTION

According to the invention, there is provided a color image transfer processing apparatus and method for reducing a color deviation in a boundary portion when a color pixel is converted to a halftone code of an entry number of a subtractive color pallet every divided area of a color image, the halftone code is transferred together with a representative color, and the image is reconstructed.

It is an object of the invention to provide a color image transfer processing apparatus for converting color image data of a full color space having the number of colors expressed by full bits of a color pixel value to halftone data expressed by an entry number of a subtractive color pallet and for transferring the halftone data together with a pallet representative color to a color image reconstruction processing apparatus.

Switching Between the Full Color Format and the Pallet Format

According to the invention, such a color image transfer processing apparatus comprises: the number of colors calculating unit; a pallet forming unit; a transfer format discriminating unit; and a data transfer unit including a full color format data forming unit and a pallet format data forming unit. The number of colors calculating unit calculates the number (A) of colors as the number of different color pixel values while scanning the pixels of color image data every row. The pallet forming unit has storing areas of representative colors of a predetermined number (n) of entries and sequentially stores the full color pixel values as representative colors into the entries each time the number of colors calculating unit counts up the number (A) of colors, thereby forming a subtractive color pallet. When the number (A) of colors counted by the number of colors calculating unit exceeds a predetermined number (n) of entries of the subtractive color pallet, the transfer format discriminating unit counts the number (N) of transfer pixels up to the pixel at the end of the previous row, compares a transfer data amount according to the full color format of the number (N) of transfer pixels with a transfer data amount according to the pallet format, and instructs the data transfer according to the format having a smaller transfer data amount. When an instruction of data transfer of the pallet format is received, the data transfer unit forms and transfers pallet format data including halftone codes obtained by converting the full color pixels to the entry numbers of the subtractive color pallet and the representative colors of the subtractive color pallet. When an instruction of transfer of the full color format is received, the full color format data including the full color pixels as they are is formed and transferred. According to such a color image transferring process, in the data transfer of the pallet format such that the subtractive color pallet is formed and the color pixels are converted to the entry numbers and the entry numbers are transferred together with the representative colors, different color pixel values which are used are transferred as they are as pallet representative colors to an area serving as a transfer destination area, so that the color reproducibility on the transfer destination side is extremely high. Consequently, the color deviation at the area boundary hardly occurs. Since the data area is divided into relatively small areas where the number of colors corresponding to the number of entries of the pallet is counted and the data transfer of the pallet format is selected when the data amount is smaller than the transfer data amount in the full color format, the transfer data amount of the whole color image can be reduced more than that in the full color format.

The transfer format discriminating unit instructs the data transfer of the pallet format when the number (N) of transfer pixels of one time is equal to or larger than a predetermined discrimination threshold value (B) and instructs the data transfer of the full color format when the number (N) of transfer pixels is less than the discrimination threshold value (B). The discrimination threshold value (B) of the number (N) of transfer pixels is determined as follows. When it is assumed that the color pixel value is constructed by three color component values and the number of entries in the subtractive color pallet is labeled as (n), a transfer data amount D1 in the full color format is given by:

$$D1=(3\times N)$$

A transfer data amount D2 in the pallet format is given by:

$$D2=(n\times 3)+N$$

The number $N_O$ of transfer pixels when both of the transfer data amounts are equal (D1=D2) is consequently obtained by:

$$(N_O\times 3)=(n\times 3)+N_O$$

The discrimination threshold value (B) is obtained by adding a predetermined margin $\alpha$ to the number $N_O$ of transfer pixels. Specifically speaking, the value (B) is obtained as follows.

256 entries: discrimination threshold value (B)=384+$\alpha$
128 entries: discrimination threshold value (B)=192+$\alpha$
64 entries: discrimination threshold value (B)=96+$\alpha$
32 entries: discrimination threshold value (B)=48+$\alpha$ The data transfer unit adds identification information indicating whether the format is the pallet format or the full color format to the transfer data and transfers the resultant data. Thus, whether the data format is the pallet format or the full color format can be identified on the transfer destination side and the color image corresponding to each format can be properly reconstructed. When the data transfer amount in the pallet format is larger than the transfer data amount in the full color format, the transfer format discriminating unit allows the data transfer of the pallet format to be performed by executing the counting of the number (A) of colors by the number of colors calculating unit and the formation of the subtractive color pallet by the pallet forming unit while restricting the number of bits of the color pixel to the upper bit number by subtracting one bit by one from the least significant bit until the transfer data amount in the pallet format becomes smaller than the transfer data amount in the full color format. For example, when each of the three color component values of the full color pixels is constructed by (n) bits, which number is equal to the number of entries of the subtractive color pallet, the data transfer of the pallet format is performed by executing the counting of the number (A) of colors by the number of colors calculating unit and the formation of the subtractive color pallet by the pallet forming unit while restricting the number of upper bits to (n−1), (n−2), (n−3), . . . , (n−i) by subtracting one bit by one from the least significant bit of each color component value until the data amount in the pallet format becomes sufficiently smaller than the data amount in the full color format. Specifically speaking, when each of the three color component values of the full color pixels is constructed by eight bits, which number is equal to that of the entry of the subtractive color pallet, the data transfer of the pallet format is performed by executing the counting of the number (A) of colors by the number of colors calculating unit and the formation of the subtractive color pallet by the pallet forming unit while reducing the bits of each color component value one bit by one from the least significant bit so as to obtain upper seven bits, upper six bits, upper five bits, . . . until the data amount in the pallet format becomes sufficiently smaller than the data amount in the full color format. When the transfer data amount in the full color format is smaller as mentioned above, by sequentially restricting the bits of the color pixel which is used for the counting of the number of colors and the formation of the pallet so as to obtain upper seven bits, upper six bits, upper five bits, . . . , the transfer data amount in the pallet format is reduced and the data transfer of the pallet format is performed as much as possible. In the transferring process for sequentially restricting the upper bits of the color pixel, when a plurality of representative color candidates in each of which the remaining upper bits coincide due to the reduction of the lower bits exist, the pallet forming unit uses the central color or the averaged color as a representative color. Further, the transfer format discriminating unit allows the data transfer of the pallet format or the full color format to be executed by performing the counting of the number (A) of colors by the number of colors calculating unit and the formation of the subtractive color pallet by the pallet forming unit while restricting the number of bits of the color pixel to the number of upper bits by reducing one bit by one from the least significant bit in accordance with the positions in a plurality of display areas obtained by dividing a color image. For example, the number of upper bits is increased in the center area of the display area and the number of upper bits is decreased in the side area. Since the number of upper bits which are used to count the number of colors is large in the center area having the tendency such that color changes are concentrated, the number of pixels until the number of 256 colors is counted is small, the pallet representative color is closer to the original color, and the color reproducibility is high, so that the color deviation near the boundary can be reduced. On the contrary, in the side area where the color change is usually small, since the number of upper bits which are used to count the number of colors is small, the number of pixels until the number of 256 colors is counted is large. Although the color reproducibility decreases, the transfer data amount can be reduced.

According to the invention, there is provided a color image transfer processing method of compressing and transferring color image data comprising:

the number of colors calculating step of counting the number (A) of colors as the number of different color pixel values while scanning pixels of color image data every row;

a pallet forming step which has a storing area of representative colors of a predetermined number (n) of entries, sequentially stores the full color pixel values as representative colors into the entries each time the number (A) of colors is counted up, and forms a subtractive color pallet;

a transfer format discriminating step of counting the number (N) of transfer pixels up to the end of the previous row when the number (A) of colors exceeds the number of entries of the subtractive color pallet, comparing a transfer data amount according to a full color format of the number (N) of transfer pixels with a transfer data amount according to a pallet format, and instructing data transfer according to the format of a smaller one of the transfer data amounts; and a data transfer step of forming and transferring pallet format data including halftone codes obtained by converting the color pixels to entry numbers of the subtractive color pallet and the representative colors of the subtractive color pallet when an instruction of the data transfer of the pallet format is received and forming and transferring the full color format data including the full color pixels as they are when an instruction of the data transfer of the full color format is received.

The details of the color image transfer processing method are basically the same as those in case of the apparatus.

Color Image Transfer System

According to the invention, a color image transfer system comprising a color image transfer processing apparatus for transferring color image data and a color image reconstruction processing apparatus for reconstructing color image data from transfer data is provided.

In this case, the color image transfer processing apparatus comprises: the number of colors calculating unit for counting the number (A) of colors as the number of different full color pixel values while scanning pixels of color image data every row; a pallet forming unit which has a storing area of representative colors of a predetermined number of entries, sequentially stores the color pixel values as representative colors into the entries each time the number (A) of colors is counted up, and forms a subtractive color pallet; a transfer format discriminating unit for counting the number (N) of transfer pixels up to the end of the previous row when the number (A) of colors exceeds the number of entries of the subtractive color pallet, comparing a transfer data amount according to the full color format of the number (N) of transfer pixels with a transfer data amount according to the pallet format, and instructing data transfer according to the format of a smaller one of the transfer data amounts; and a data transfer unit for forming and transferring pallet format data including halftone codes obtained by converting the color pixels to entry numbers of the subtractive color pallet and the representative colors of the subtractive color pallet when an instruction of the data transfer of the pallet format is received and forming and transferring full color format data including the full color pixels as they are when an instruction of the data transfer of the full color format is received. The color image reconstruction processing apparatus has: a reception data discriminating unit for discriminating whether the color image data transferred from the color image transfer processing apparatus is based on the full color format or the pallet format; a full color format data reconstructing unit for reconstructing full color image data from the reception data when the reception data discriminating unit determines the full color format; and a pallet format data reconstructing unit for reconstructing the subtractive color pallet from the reception data when the reception data discriminating unit determines the pallet format and reconstructing the full color image data using the pallet representative colors with reference to the reconstructed pallet by the entry numbers of the received halftone codes.

Retrieval Setting of Area Boundary

According to the invention, there is provided a color image transfer processing apparatus in which a boundary of area division is set into a portion where there is no color change in a color image in order to reduce a color deviation in a boundary portion when the color image is reconstructed.

A color image transfer apparatus for this purpose is characterized by comprising: a first boundary setting unit for setting a fixedly determined first boundary for a color image and dividing the color image into a plurality of areas; a color change detecting unit for detecting a color change by retrieving each of the areas divided by the first boundary in the direction which perpendicularly crosses the boundary; a second boundary setting unit for setting a new second boundary by detecting a portion having no color change detected by the color change detecting unit; a code converting unit for converting each color pixel value into a halftone code expressed by an entry number of the subtractive color pallet with respect to each of the areas divided by the setting of the second boundary; a pallet forming unit for registering as representative color candidates into the corresponding entries of the subtractive color pallet each time the color pixel value is converted into the code and determining the representative color every entry after completion of the code conversion; and a data transfer unit for transferring the halftone code and the pallet representative color every area. As mentioned above, by retrieving a row having no color change with respect to the color image and dynamically setting the boundary, the color image is divided into a plurality of areas in which the row having no color change is set to a start position and a next row having no color change is set to an end position. The row having no color change denotes a position where pixels of the same color are arranged in the row direction. The color in the boundary portion is, therefore, preferentially selected as a representative color of the subtractive color pallet, the color reproducibility in the boundary portion is improved, and the boundary portion is inconspicuous in the reconstructed color image.

When the portion having no color change cannot be detected, the second boundary setting unit detects a portion having the maximum color change and sets a new second boundary. It is most desirable to set the boundary into a portion of the same color having no color change. If there is no portion having no color change, however, a portion having the maximum color change is selected. In the portion having the extreme color change, colors exist so as to be dispersed in all of the entries of the subtractive color pallet and a degree to be reflected to the pallet representative colors is higher than those of the other portions. When the boundary is set in the portion in which the change in color is extreme, therefore, the color reproducibility in the boundary portion in a reconstructed image is increased and the boundary portion can be made inconspicuous in a reconstructed color image. The first boundary setting unit sets the first boundary in the row direction of the color image and the color change detecting unit detects the color change by starting the retrieval always from the head row with respect to each of the areas divided by the first boundary. The color change detecting unit can also detect the color change by retrieving each of the areas positioning on both sides of the first boundary in the direction so as to be away from the first boundary. The color change detecting unit detects the color difference between the head pixel of each row and each of the pixels subsequent to the head pixel. The second boundary setting unit determines that the row in which all of the color differences in the row direction are equal to zero is a row having no color change, and sets the second boundary.

According to the invention, there is provided a color image transfer processing method of setting a boundary into a portion having no color change of a color image in order to reduce a color deviation in a boundary portion when the color image is reconstructed, comprising:

a first boundary setting step of setting a fixedly determined first boundary for a color image, thereby dividing the color image into a plurality of areas;

a color change detecting step of detecting a color change by retrieving each of the areas divided by the first boundary in a direction which perpendicularly crosses the boundary;

a second boundary setting step of detecting a portion having no color change by the color change detecting step and setting a new second boundary;

a code converting step of converting each color pixel value into a halftone code expressed by an entry number of a subtractive color pallet with respect to each of the areas divided by the setting of the second boundary;

a pallet forming step of registering the color pixel values as representative color candidates into corresponding entries of the subtractive color pallet each time the color pixel value is converted into the code and determining a representative color every entry after completion of the code conversion; and a data transfer step of transferring the halftone code and the pallet representative color every area.

Formation of Boundary Area on the Receiving Side

According to the invention, there is provided a color image reconstruction processing apparatus for reconstructing a color image by newly setting an area into a boundary area on the receiving side and forming a subtractive color pallet in order to reduce a color deviation in the boundary portion when the color image is reconstructed.

That is, there is provided a color image reconstruction processing apparatus for dividing a color image into a plurality of areas, converting color pixel values into halftone codes which are expressed by entry numbers of a subtractive color pallet every area, determining a representative color of each entry, receiving the transfer data transferred, and reconstructing the color image, comprising: a boundary area retrieving unit for detecting a position having no color change as an area start position by retrieving one area on a row unit basis while setting a reception boundary which divides the reception color image expressed by the entry numbers to a start point, detecting a position having no color change as an area end position by retrieving the other area on a row unit basis while setting the same reception boundary to a start point, and setting a new boundary area including the reception boundary; a pallet forming unit for forming a boundary subtractive color pallet of the newly set boundary area on the basis of two subtractive color pallets reconstructed from the reception data with respect to the areas locating on both sides of the reception boundary; and a code reconstructing unit for reconstructing the color image of the boundary area by converting the halftone code expressed by the entry number of the boundary area by using the boundary subtractive color pallet into the representative color. As mentioned above, the new area including the reception boundary is set on the receiving side, the new subtractive color pallet obtained by determining representative colors from the received subtractive color pallets of the areas on both sides with respect to the boundary area is formed, and the halftone code is converted into the representative color, thereby performing a smoothing process by which the colors change smoothly in the boundary portion. The change in color in the boundary portion can be made natural.

It is most desirable that the start and end positions of the boundary detected by the boundary area retrieving unit are in a portion in which there is no color change and the color in the row direction is the same. In a case where the portion having no color change cannot be detected, however, the portion having the maximum color change is detected and is used as a boundary start portion and/or a boundary end position. The boundary area retrieving unit detects the color change by retrieving the areas locating on both sides of the boundary in the directions so as to be apart from the boundary. The boundary area retrieving unit detects the difference between the entry number of the head pixel of each row and the entry number of each pixel subsequent to the head pixel. The second area setting unit determines that the row in which all of the differences of the entry numbers in the row direction are equal to zero is a row having no color change, and sets the area start position or the area end position.

According to the invention, there is also provided a color image reconstruction processing method of newly setting an area into a boundary portion on a receiving side, forming a subtractive color pallet, and reconstructing a color image in order to reduce a color deviation in the boundary portion when the color image is reconstructed, comprising:

a boundary area retrieving step of detecting a position having no color change as an area start position by retrieving one area on a row unit basis while setting the reception boundary which divides the reception color image expressed by the entry number to a start point, detecting a position having no color change as an area end position by retrieving the other area on a row unit basis while setting the same reception boundary to a start point, and setting a new boundary area including the reception boundary;

a pallet forming step of forming a boundary subtractive color pallet of the newly set boundary area on the basis of two subtractive color pallets reconstructed from the reception data with respect to areas locating on both sides of the boundary; and a code reconstructing step of reconstructing a color image of the boundary area by converting the halftone code expressed by the entry number of the boundary area by using the boundary subtractive color pallet into the representative color.

Weighting According to Distance From Boundary

According to the invention, there is provided a color image transfer processing apparatus in which when a representative color of a subtractive color pallet is determined, a color deviation in a boundary portion of a reconstructed image is reduced by preferentially setting a color pixel near the boundary of an area to a representative color.

That is, in a color image transfer processing apparatus for compressing and transferring color image data, a color image is divided into a plurality of areas at a desired row position by an image dividing unit and a weight according to a distance from the boundary every area is set by a weight setting unit. A code converting unit converts a full color pixel value of each pixel into a halftone code expressed by an entry number of a subtractive color pallet every area. In this instance, a representative color candidate registering unit registers the full color pixel value into the entry of the subtractive color pallet which is designated by the conversion code as a representative color candidate to which the weight according to the distance from the boundary was added. When the code conversion of all of the full color pixels of the area is finished, a representative color determining unit determines the representative color from one or a plurality of candidates registered in the entries of the subtractive color pallet so that a pixel near the boundary remains as a representative color on the basis of the weight. A data transferring unit transfers the halftone code and the representative color of the subtractive color pallet every area. The weight setting unit sets the weight so as to be larger as the pixel is closer to the boundary and to be smaller as the pixel is farther from the boundary. The representative color determining unit determines the representative color by selecting the candidate having the largest weight among a plurality of candidates belonging to the same entry. When a plurality of candidates having the largest weight exist in this instance, the representative color is determined by, for example, an average calculation of the plurality of candidates.

Since the representative color of the subtractive color pallet is determined on the basis of the weight according to the distance from the boundary as mentioned above, the colors of the boundary portion in the area are preferentially registered in the subtractive color pallet, the reproducibility in the boundary portion is increased, the color deviation in the area boundary in the reconstructed image is reduced, and unnaturalness is eliminated.

According to the invention, there is also provided a color image transfer processing method in which when a representative color of a subtractive color pallet is determined, by preferentially using a color pixel near a boundary of an area as a representative color, a color deviation in the boundary portion of a reconstructed image is reduced. The method comprises:

an image dividing step of dividing a color image into a plurality of areas at a desired row position;

a weight setting step of setting a weight according to a distance from the boundary every area;

a code converting step of converting a color pixel value of each pixel into a halftone code expressed by an entry number of the subtractive color pallet every area;

a representative color candidate registering step of registering the color pixel value as a representative color candidate obtained by adding a weight to the color pixel value into an entry of the subtractive color pallet designated by the conversion code each time the color pixel value is converted into the code in the code converting step;

a representative color determining step of determining a representative color so that the pixel near the boundary remains as a representative color on the basis of the weight from one or a plurality of candidates registered in each entry of the subtractive color pallet when the code conversion of the color pixels in all of the areas is finished; and a data transferring step of transferring the halftone code and the representative color of the subtractive color pallet every area.

Dispersion of Errors From Pallet Representative Color

According to the invention, there is provided a color image transfer processing apparatus in which errors between a primary color and a representative color of a subtractive color pallet is detected and a correction for distributing the errors to the periphery is performed in order to prevent a color deviation in a boundary portion when a color image is reconstructed by performing a subtractive color process every divided area and, after that, a color pixel value is converted to a halftone code expressed by an entry number.

For this purpose, the color image transfer processing apparatus is characterized by comprising: a pallet forming unit for forming a subtractive color pallet optimum to each of a plurality of areas obtained by dividing a color image; a color image correcting unit for detecting errors between a full color pixel and a corresponding representative color of the subtractive color pallet every plurality of areas, distributing the errors to the peripheral pixels, and correcting so as to allow each color pixel value to approach the representative color; a code converting unit for converting the color pixel value corrected by distributing the errors into a halftone code expressed by an entry number of the subtractive color pallet; and a data transfer unit for transferring the halftone code and the representative color of the subtractive color pallet every area. By detecting the errors between the representative color of the subtractive color pallet and the primary color pixel and correcting the primary color pixel by distributing the errors to the subsequent peripheral pixels, the color of the original color image is made approach the representative color of the subtractive color pallet. Thus, the color reproducibility by the subtractive color pallet is improved and a color image in which the color deviation in the boundary portion is prevented and a natural color change is obtained can be reconstructed.

The pallet forming unit registers the color pixel value as a representative color candidate into the entry of the corresponding subtractive color pallet each time the color pixel value is converted to the halftone code by the code converting unit, and determines the representative color on the basis of one or a plurality of representative color candidates registered every entry after completion of the code conversion of all of the color pixel values. The pallet forming unit can also select the subtractive color pallet optimum to each area among a plurality of prepared subtractive color pallets. The color image correcting unit distributes the errors to the peripheral pixels subsequent to the pixel as a processing target and corrects each full color pixel value so as to approach the representative color. For example, the color image correcting unit corrects each full color pixel value by distributing the errors to total four pixels comprising the subsequent pixel on the same row as that of the target pixel, the pixel on the next row at the same position as that of the target pixel, and the pixels on both sides of the pixel. The color image correcting unit increases a distribution ratio of the errors as the distance of the pixel subsequent to the target pixel is short, and decreases the distribution ratio of the errors as the distance of the pixel subsequent to the target pixel is long.

According to the invention, there is provided a color image transfer processing method in which errors between a primary color and a representative color of a subtractive color pallet are detected and a correction to distribute the errors to the periphery is performed in order to prevent a color deviation in a boundary portion when a color image is reconstructed by executing a subtractive color process to every area obtained by dividing the color image and, after that, the corrected color pixel value is converted to a halftone code expressed by an entry number. The method comprises:

a pallet forming step of forming an optimum subtractive color pallet every plurality of areas obtained by dividing the color image;

a color image correcting step of detecting errors between each color pixel value and the corresponding representative color of the subtractive color pallet every plurality of areas and distributing the errors to the peripheral pixels, thereby correcting each color pixel value so as to approach the representative color;

a code converting step of converting each color pixel value corrected by distributing the errors into a halftone code expressed by the entry number of the subtractive color pallet; and a data transferring step of transferring the halftone code and the representative color of the subtractive color pallet every area.

Divided Shape of Area

According to the invention, a color image transfer processing apparatus for optimizing an area division of a color image for a subtractive color process is provided. The color image transfer processing apparatus is characterized by having an area dividing unit for dividing a color image in accordance with a geometrical division of a strip, a rectangle, a polygon, a circle, an oval, a random pattern, or the like, a statistical division for dividing in accordance with statistical characteristics of the image, an object division for extracting and dividing a target object in the image, or the like. Each full color pixel value is converted into the halftone code expressed by the entry number of the subtractive color pallet by the code converting unit every area, the representative color of each entry is determined and the subtractive color pallet is formed every area by the pallet forming unit, and finally, the data transfer unit transfers the halftone code and the representative color of the subtractive color pallet every area.

The above and other objects, features, and advantages of the present invention will become more apparent from the following detailed description with reference to the drawings.

BRIEF DESCRIPTION OF THE DRAWINGS

FIGS. 1A to 1C are explanatory diagrams of a subtractive color process using a conventional subtractive color pallet;

FIGS. 4A and 4B are block diagrams of a personal computer and a color printing apparatus to which the invention is applied;

FIGS. 7A and 7B are functional block diagrams of the first embodiment of a color image transfer apparatus of the invention for executing a transfer switching between a full color format and a pallet format;

FIG. 12 is an explanatory diagram of a subtractive color pallet of 7-bit entries;

FIG. 13 is an explanatory diagram of a subtractive color pallet of 6-bit entries;

FIG. 14 is an explanatory diagram of a subtractive color pallet of 5-bit entries;

FIG. 15 is a correspondence explanatory diagram of discrimination threshold values of the transfer data format of the number of entries of the subtractive color pallet which is used in FIGS. 7A and 7B;

FIG. 18 is a correspondence explanatory diagram of the limitation of the number of upper bits and the modes in FIG. 17;

FIGS. 19A and 19B are flowcharts for a transferring process for limiting the number of upper bits of a color pixel in accordance with a color image position;

FIG. 25 is an explanatory diagram of a pallet forming process in the embodiment of FIG. 21;

FIGS. 26A and 26B are flowcharts for a transferring process according to the embodiment of FIG. 21;

FIGS. 31A and 31B are explanatory diagram of two reception pallets converted to a YMC space;

FIG. 32 is an explanatory diagram for a division of a color space in which the two reception pallets of FIGS. 31A and 31B are converted to an L*a*b* space, thereby deciding a pellet representative color;

FIGS. 40A and 40B are specific functional block diagrams of a color image data correcting unit in FIG. 39;

DETAILED DESCRIPTION OF THE PREFERRED EMBODIMENTS

Color Printing Apparatus

Figure 2:
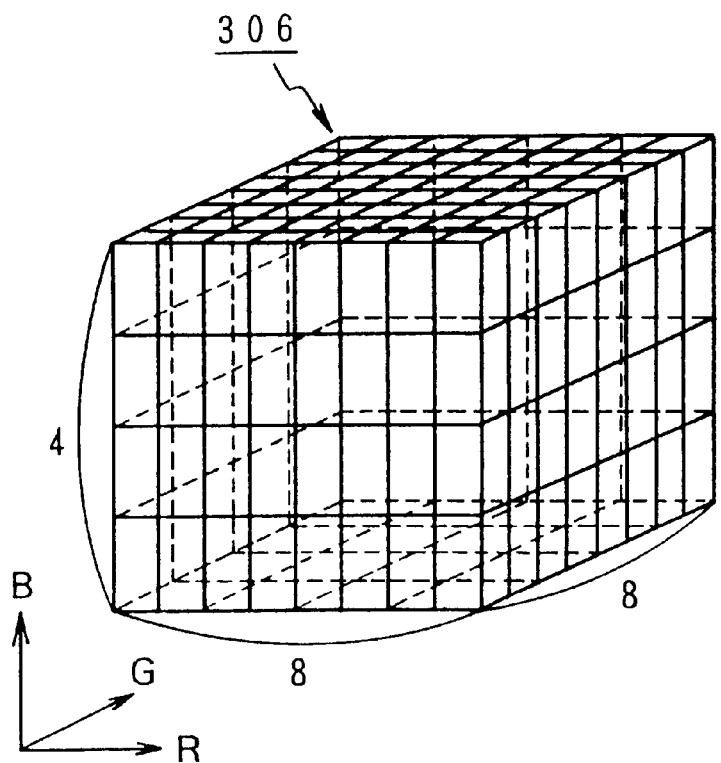
FIG. 2 is a divisional explanatory diagram of an RGB color space to decide a representative color of the subtractive color pallet.
Figure 3:
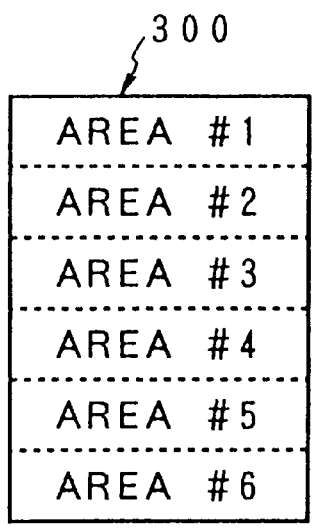
FIG. 3 is an explanatory diagram of a subtractive color process which is performed by dividing a color image into a plurality of areas.
Figure 4A:
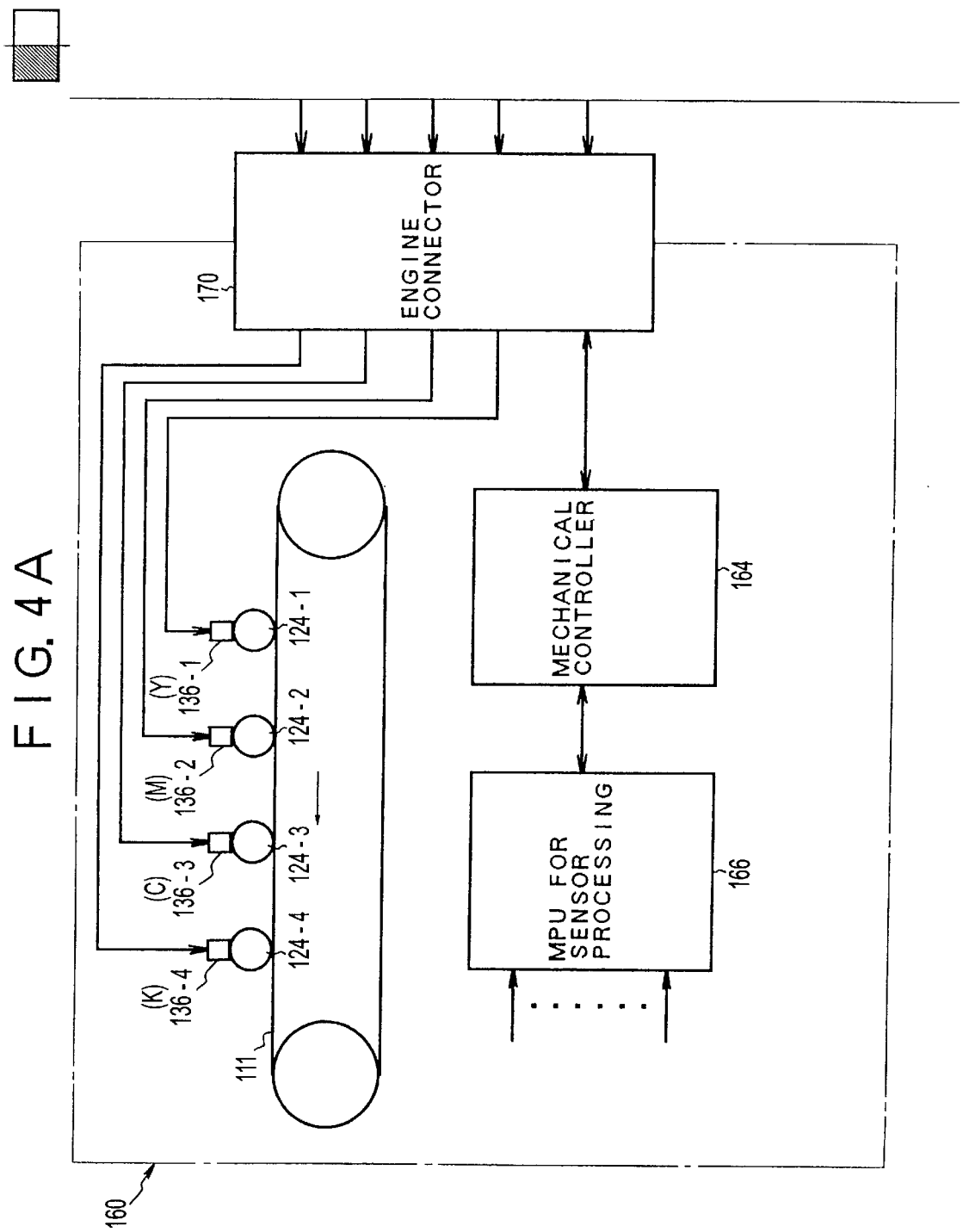

FIGS. 4A and 4B are block diagrams of a personal computer and a color printing apparatus to which a color image transfer processing apparatus of the invention is applied. The color printing apparatus is constructed by an engine 160 and a controller 162. The engine 160 has a mechanical controller 164 for controlling the operation of a printing mechanism section of a conveying belt unit 111, electrostatic recording units 124-1 to 124-4, and the like. A sensor processing MPU 166 for executing processes of various sensors (not shown) arranged for the engine 160 is provided for the mechanical controller 164. The mechanical controller 164 is connected to the controller 162 side via an engine connector 170. In this instance, as a printing mechanism arranged in the engine 160, an endless belt 112 and LED arrays 136-1, 136-2, 136-3, and 136-4 provided for the electrostatic recording units of Y, M, C, and K are shown.

Figure 5:
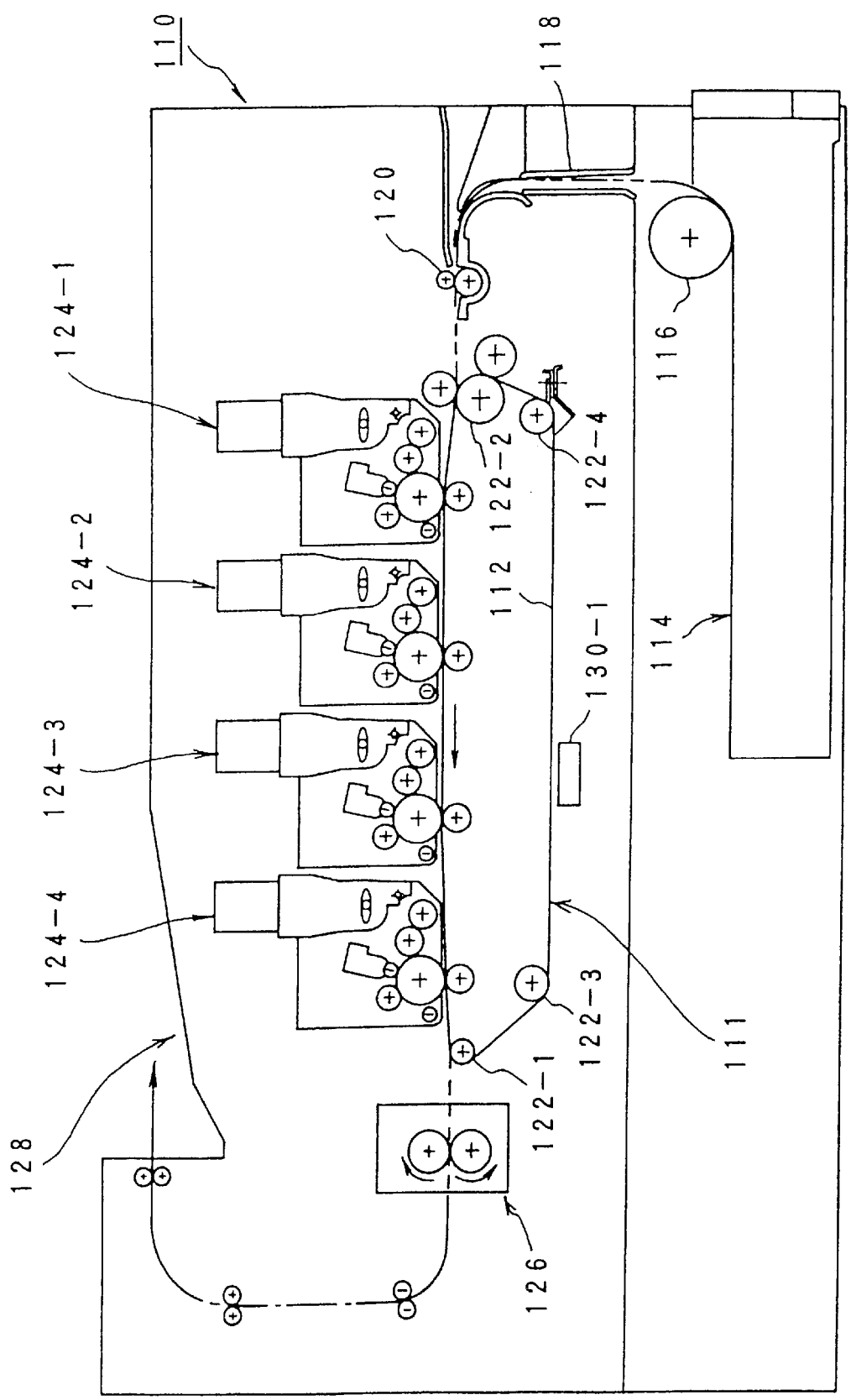
FIG. 5 is an internal structural diagram of the color printing apparatus to which the invention is applied.

FIG. 5 is an internal structure of the color printing apparatus in FIGS. 4A and 4B. The conveying belt unit 111 to convey a recording medium, for example, a recording paper is arranged in an apparatus main body 110. The endless belt 112 made of a flexible dielectric material, for example, a proper synthetic resin material is rotatably provided for the conveying belt unit 111. The endless belt 112 is wound around four rollers 122-1, 122-2, 122-3, and 122-4. The conveying belt unit 111 is detachably attach ed to the apparatus main body 110. The roller 122-1 functions as a driving roller. T he driving roller 122-1 drives the endless belt 112 by a driving mechanism (not shown) so as to run counterclockwise at a predetermined speed as shown by an arrow. The driving roller 122-1 also functions as an AC removing roller for removing charges from the endless belt 112. The roller 122-2 functions as a driven roller. The driven roller 122-2 also functions as a charging roller for applying charges to the endless belt 112. Both of the rollers 122-3 and 122-4 function as guide rollers and are arranged at positions near the driving roller 122-1 and driven roller 122-2. An upper running portion of the endless belt 112 between the driven roller 122-2 and driving roller 122-1 forms a moving path of the recording paper. The recording papers have been stacked in a hopper 114 and are picked up one by one from the top recording paper in the hopper 114 by a pickup roller 116. The paper passes through a recording paper guide passage 118, is guided from the driven roller 122-2 side of the endless belt 112 to the recording paper moving path on the belt side by a pair of recording paper feed rollers 120. The recording paper passed through the recording paper moving path is ejected from the driving roller 122-1. Since the endless belt 112 is charged by the driven roller 122-2, the recording paper is electrostatically adsorbed to the endless belt 112 when the paper is guided from the driven roller 122-2 side to the recording paper moving path, so that a positional deviation of the recording paper during the movement is prevented. On the other hand, since the driving roller 122-1 on the ejecting side functions as a discharging roller, the charges of the endless belt 112 in a portion which is in contact with the driving roller 122-1 are removed. Consequently, when the recording paper passes the driving roller 122-1, the charges on the recording paper are removed. The recording paper is easily peeled off from the endless belt 112 and is ejected without being wrapped into a lower portion of the belt. The four electrostatic recording units 124-1, 124-2, 124-3, and 124-4 of Y, M, C, and K are provided in the apparatus main body 110 and have a tandem structure such that they are sequentially serially arranged in accordance with the order of Y, M, C, and K from the upstream side to the downstream side along the recording paper moving path on the upper side of the belt that is defined between the driven roller 122-2 and driving roller 122-1 of the endless belt 112. The electrostatic recording units 124-1 to 124-4 have substantially the same structure except for a point that a yellow toner component (Y), a magenta toner component (M), a cyan toner component (C), and a black toner component (B) are used as developing agents, respectively.

Therefore, the electrostatic recording units 124-1 to 124-4 sequentially overlap a yellow toner image, a magenta toner image, a cyan toner image, and a black toner image onto the recording paper which is moved along the recording paper moving path on the upper side of the endless belt 112 and transfer and record, thereby forming a full color toner image.

Figure 6:
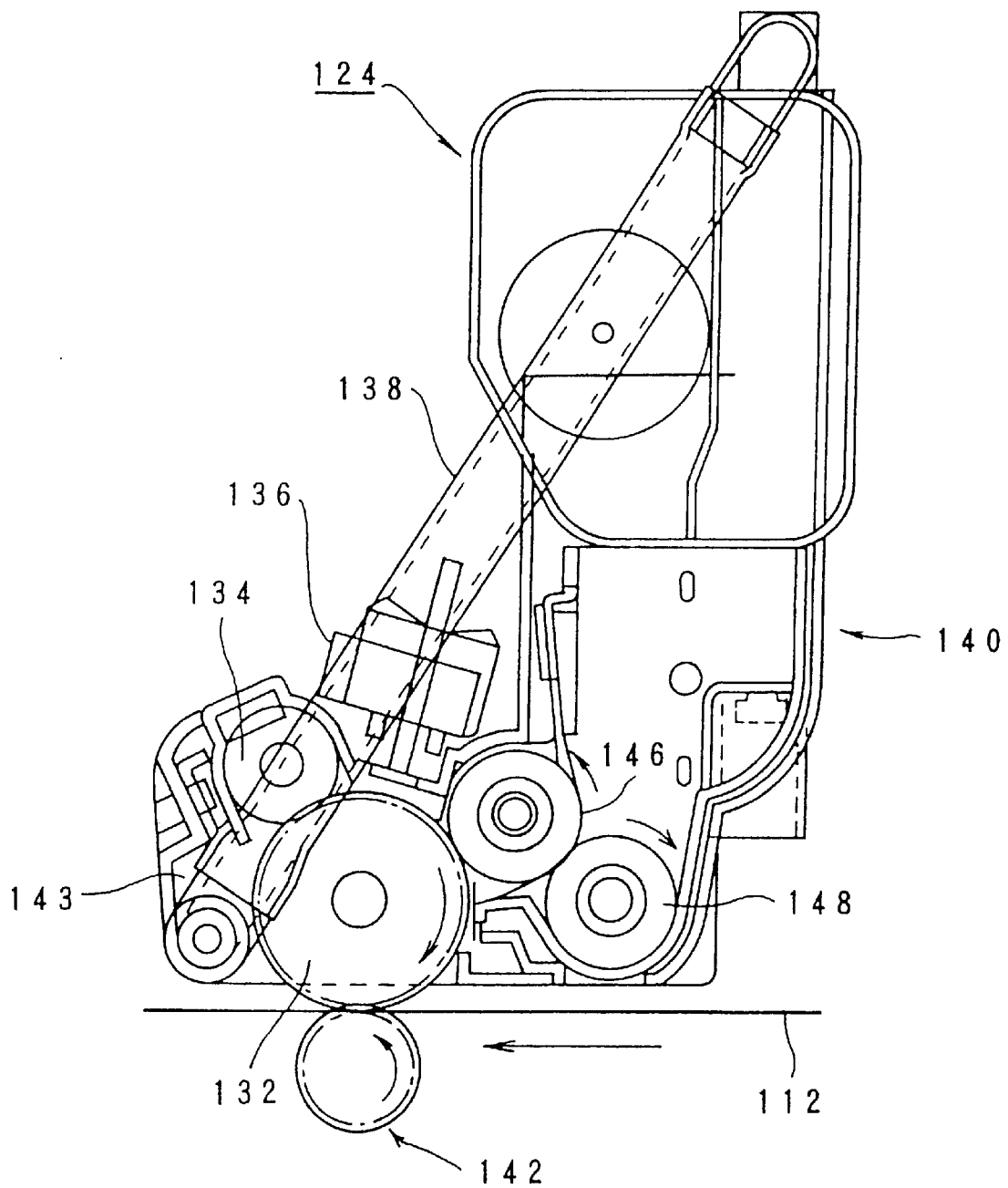
FIG. 6 is a cross sectional view of an electrostatic recording unit in FIG. 5.

FIG. 6 shows one of the electrostatic recording units 124-1 to 124-4 in FIG. 5. The electrostatic recording unit 124 has a photosensitive drum 132. At the time of the recording operation, the photosensitive drum 132 is clockwise rotated. A pre-charging device 134 constructed as, for example, a corona charging device, scorotron charging device, or the like is arranged over the photosensitive drum 132. The rotating surface of the photosensitive drum 132 is uniformly charged by the pre-charging device 134. An LED array 136 functioning as an optical writing unit is arranged in a charged area of the photosensitive drum 132. An electrostatic latent image is written by light emitted due to the scanning of the LED array 136. That is, light emitting devices arranged in the main scanning direction of the LED array 136 are driven on the basis of a gradation value of color pixel data (dot data) developed from image data that is provided as print information from a computer, a word processor, or the like. Consequently, the electrostatic latent image is written as a dot image. The electrostatic latent image written on the photosensitive drum 132 is electrostatically developed as a charge toner image by predetermined color toner by a developing device 140 arranged above the photosensitive drum 132. The charge toner image of the photosensitive drum 132 is electrostatically transferred onto the recording paper by a conductive transfer roller 142 located under the drum 132. That is, the conductive transfer roller 142 is arranged through a very small gap between the roller 142 and photosensitive drum 132 through the endless belt 112. The roller 142 applies charges of a polarity opposite to that of the charge toner image to the recording paper which is conveyed by the endless belt 112, so that the charge toner image on the photosensitive drum 132 is electrostatically transferred onto the recording paper. After completion of the transferring process, residual toner which remains without being transferred to the recording paper is adhered on the surface of the photosensitive drum 132. The residual toner is removed by a toner cleaning device 143 provided on the downstream side of the recording paper moving path for the photosensitive drum 132. The removed residual toner is returned to the developing device 140 by a screw conveyor 138 and is again used as developing toner.

Again referring to FIG. 5, when the recording paper passes the recording paper moving path between the driven roller 122-2 and driving roller 122-1 of the endless belt 112, the toner images of four colors of Y, M, C, and K are overlapped and transferred onto the recording paper by the electrostatic recording units 124-1 to 124-4, thereby forming a full color image. The recording paper is sent from the driving roller 122-1 side to a heat roller type thermally fixing apparatus 126 and a heat fixing operation is performed to the recording paper having the full color image. The recording paper to which the heat fixing operation was performed passes the guide rollers and is arranged and stacked in a stacker 128 provided in the upper portion of the apparatus main body. When toner is supplied to each of the electrostatic recording units 124-1 to 124-4 or the maintenance is performed, the stacker 128 can be easily detached by pulling upward.

An MPU 172 for controller is provided for the controller 162. A printer I/F processing unit 12 serving as a transfer destination of the color image transferring process according to the invention is provided for the MPU 172 for controller and is connected to, for example, a personal computer 192 as an upper apparatus through a control connector 176. The personal computer 192 has a driver 10 which functions as a color image transfer processing apparatus of the invention for transferring color image data which is provided from an arbitrary application program 194 to the color printing apparatus. The driver 10 is connected to the printer I/F processing unit 12 provided in the controller 162 on the printing apparatus side through a personal computer connector 198. In this instance, color image data on the application program 194 of the personal computer 192 is, for example, RGB data. On the other hand, color image data on the color printing apparatus side is YMCK data. Therefore, a color converting function for converting RGB data transferred from the driver into YMCK data for printing is provided for the I/F processing unit 12 of the printing apparatus side. The driver 10 converts 3-byte RGB pixel data of the color image into a halftone code of one byte expressed by the entry number of the subtractive color pallet and transfers the halftone code together with the pallet representative color (RGB pixel data of three bytes) to the printer I/F processing unit 12. In the printer I/F processing unit 12, the color image data expressed by the pallet representative color is reconstructed from the halftone code of the entry number by referring to the subtractive color pallet. Image memories 182-1, 182-2, 182-3, and 182-4 for developing the image data of Y, M, C, and K obtained by the color conversion of the RGB image data transferred from the personal computer 192 into pixel data (dot data) and storing are provided for the MPU 172 of the controller 162. The MPU 172 has an address designating unit 184 in order to perform an address designation when the color pixel data of YMCK is stored into the image memories 182-1 to 182-4, respectively.

Switching Transfer of Pallet Format and Full Color Format

Figure 7B:
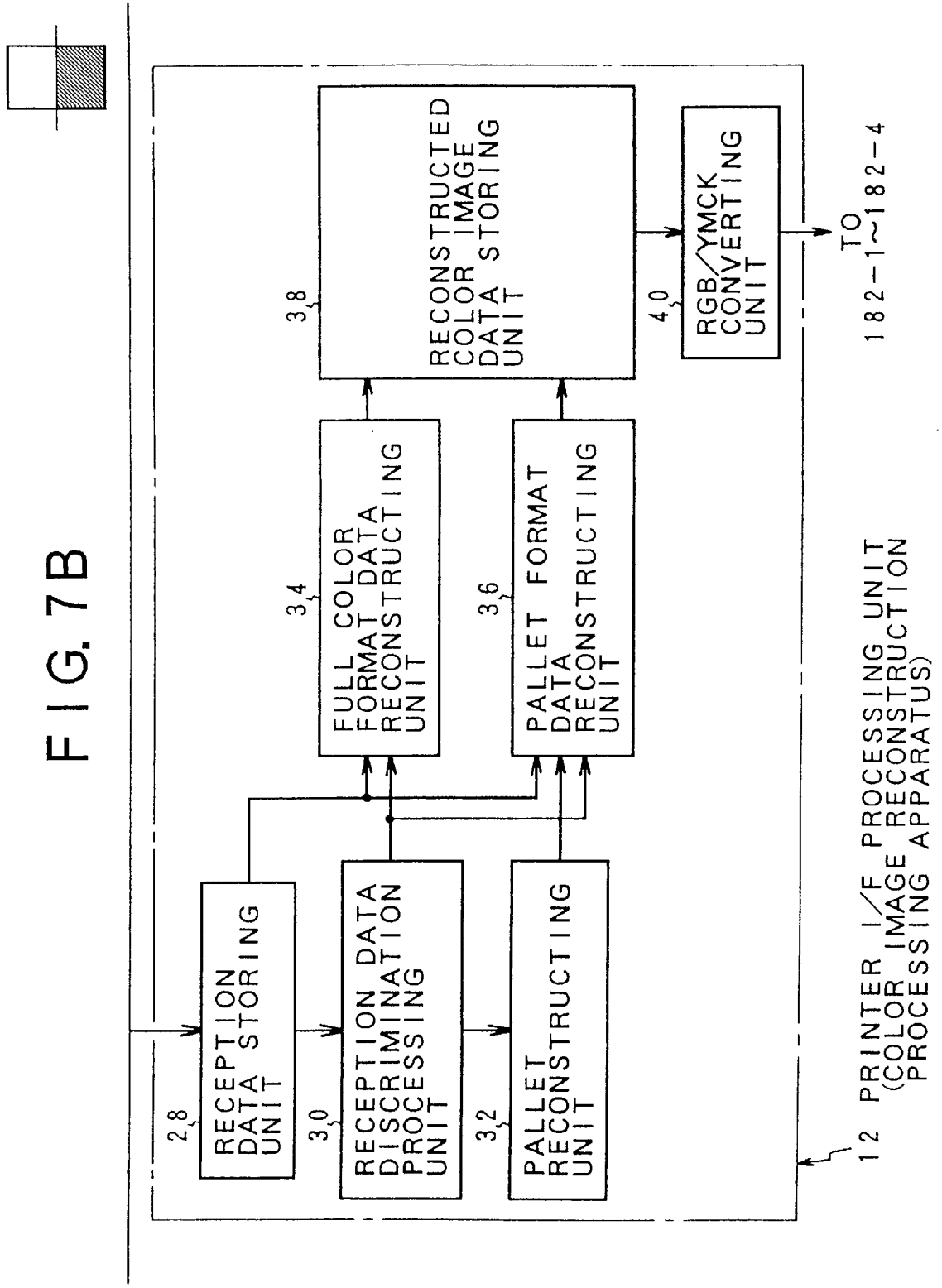

FIGS. 7A and 7B is a functional block diagram of the color image transfer processing apparatus of the invention and relates to an example of the driver 10 provided for the personal computer 192 in FIGS. 4A and 4B. The I/F processing unit 12 provided for the controller 162 of the color printing apparatus is set to the color image reconstruction processing apparatus serving as a transfer destination. The driver 10 on the transfer source side serving as a color image transfer processing apparatus of the invention has a full color image data storing unit 14, a calculating unit 16 of the number of colors, a pallet forming unit 18, a transfer format discriminating unit 20, a full color format data forming unit 22, a pallet format data forming unit 24, and further, a data transfer unit 26. The printer I/F processing unit 12 of the color image reconstruction processing apparatus on the transfer destination side has a reception data storing unit 28, a reception data discrimination processing unit 30, a pallet reconstructing unit 32, a full color format data reconstructing unit 34, a pallet format data reconstructing unit 36, a reconstructed color image data storing unit 38, and an RGB/YMCK converting unit 40. Full color image data formed by the application program 194 provided in the personal computer 192 in FIGS. 4A and 4B, for example, the data formed by computer graphics or the like has been stored in the full color image data storing unit 14 of the driver 10 serving as a transfer source. When considering the RGB display system as an example, the full color image data is constructed by 24-bit data in which the color component data of RGB is combined, namely, by 3-byte data in which one byte is formed by eight bits. The driver 10 converts the full color image data constructed by the RGB pixel data of three bytes into the halftone codes comprising the entry numbers of the subtractive color pallet and transfers the halftone codes to the printer I/F processing unit 12 together with the representative colors of RGB of three bytes registered in the subtractive color pallet, thereby reconstructing. When the full color image data is transferred, the number of colors calculating unit 16 provided in the driver 10 counts the number (A) of colors corresponding to the number (E) of entries of the subtractive color pallet used in this instance. A range of the full color image data of the number (A) of colors which coincides with the number (E) of entries is set to one area and the data transfer is executed.

Figures 8, 9:
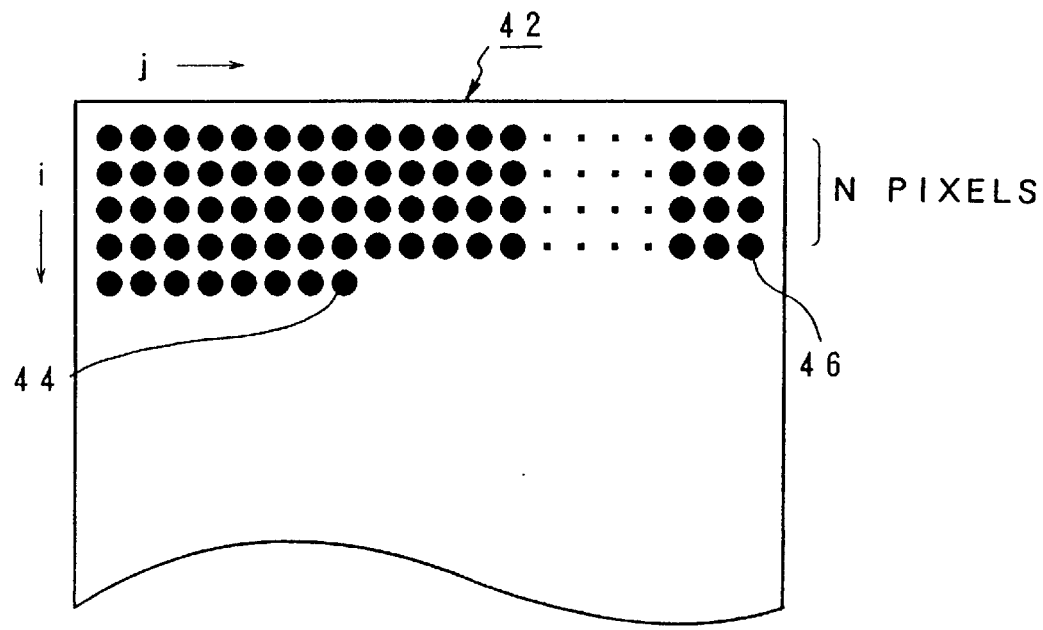
FIG. 8 is an explanatory diagram of a detecting process of the number of colors for the transfer switching between the full color format and the pallet format.
FIG. 9 is an explanatory diagram of a subtractive color pallet of 8-bit entries which is formed in FIGS. 7A and 7B.

FIG. 8 shows a counting process of the number of colors which is executed by the number of colors calculating unit 16 for the full color image data as a target. Full color image data 42 shown as a print image for a recording paper has been stored in the memory so as to have a 2-dimensional arrangement which is designated by the row number (i) and the pixel number (j) in the row direction like color pixels shown by black painted circles. With respect to such full color image data 42, the number of colors calculating unit 16 counts the number (A) of colors from the differences among the values of the RGB pixel data while repeating the scanning operations such that the color pixels are first scanned in the row direction from the color pixel at the right upper corner and, when the scanning position reaches the end of the row, it is returned to the head of the next row. The number (A) of colors counted by the number of colors calculating unit 16 is inputted to the transfer format discriminating unit 20. The number (n) of entries of the subtractive color pallet which is used on the transfer side has been preset as 256 entries [=the number (n) of entries]. The transfer format discriminating unit 20 compares the number (A) of colors which is counted by the number of colors calculating unit 16 with the number (n) of entries (=256). Now, assuming that the number (A) of colors reaches the same number (256 colors) as the number (n) of entries, for example, at a color pixel 44 of the fourth row, an area up to an end color pixel 46 of the previous row is set to an area of the data transfer of once and the number (N) of color pixels in such an area is counted. The entry number is shown at "E" in the following description. When the number of entries is equal to (n), the maximum entry number is equal to En. When the number (N) of color pixels included in the data transfer area of once can be detected as mentioned above on the basis of the counting result of 256 colors, the transfer data amount D1 when the data corresponding to the number (N) of transfer pixels is transferred in the full color format is compared with the transfer data amount D2 when the data is transferred in the pallet format. The data format corresponding to the smaller transfer data amount is selected. The formation of the subtractive color pallet by the pallet forming unit 18 will now be described. In association with the count-up of the number (A) of colors when any one of the color pixel components of RGB differs by the scan in the row direction of the color pixels as shown in FIG. 6 by the number of colors calculating unit 16, the pallet forming unit 18 stores the 3-byte RGB pixel data as a target of the count-up into the area shown by the first entry number Ei (i=1 to n) in a vacant state at that time as a representative color. When the counting of the number (A) of colors of 256 colors is discriminated by the transfer format discriminating unit 20 due to the registration of the representative color by the pallet forming unit 18 in association with the counting of the number (A) of colors, a subtractive color pallet 48 of the 8-bit entries as shown in FIG. 9, namely, an LUT in which the different 3-byte RGB pixel data have sequentially been stored as representative colors in E=0 to 255 by the decimal expression as 8-bit entry numbers En is formed.

In the transfer format discriminating unit 20 in FIGS. 7A and 7B, when the number (A) of colors reaches 256 colors, with respect to the transfer area of (N) pixels in FIG. 8, the transfer data amount D1 of the full color format in which the full color pixel data is transferred as it is and the transfer data amount D2 of the pallet format in which the full color pixel data is converted into the halftone codes which are expressed by the entry numbers of the subtractive color pallet of the 8-bit entries in FIG. 9 and, at the same time, the representative colors as many as 256 entries are transferred and reconstructed on the transfer destination side are calculated and compared. As will be obviously understood from FIG. 8, since there are the 3-byte RGB data of (N) pixels, the transfer data amount D1 of the full color format is $$D1 = (3 \times N) \text{ bytes} \tag{1}$$

On the other hand, now assuming that the number of entries of 256 entries is equal to (n), the transfer data amount D2 of the pallet format which is reconstructed by using the subtractive color pallet 48 of the 8-bit entries in FIG. 9 is $$D2 = \{(n \times 3) + N\} \tag{2}$$

Specifically speaking, in the subtractive color pallet 48 in FIG. 9, since n=256 entries, the transfer data amount D2 of the pallet format is $$D2=(768+N) \text{ bytes} \qquad (3)$$

Figure 10:
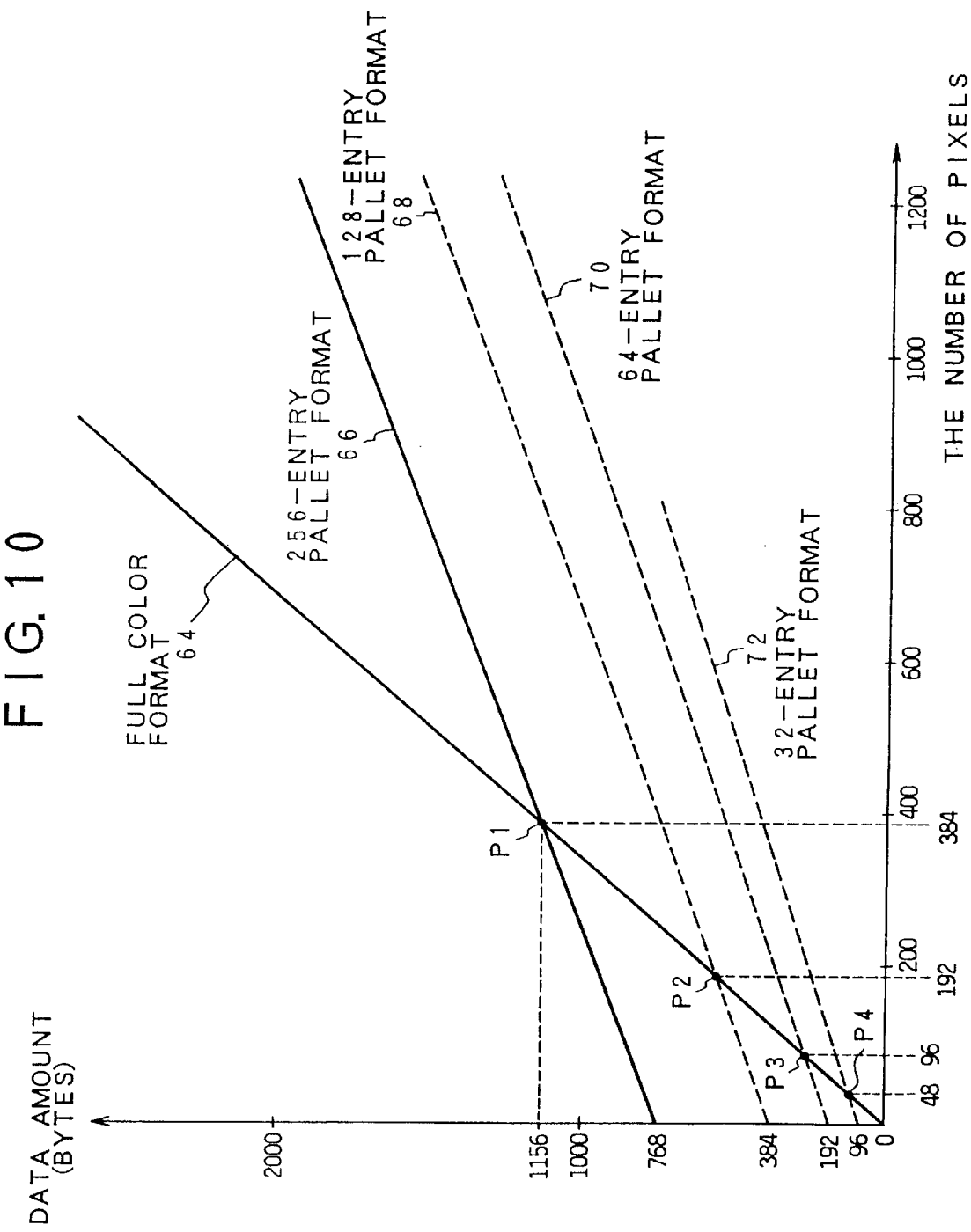
FIG. 10 is a characteristics graph of a transfer data amount to the number of transfer pixels in each of the full color format and the pallet format in FIGS. 7A and 7B.

FIG. 10 is a graph in the case where with respect to the transfer data amount D1 of the full color format of the equation (1) and the transfer data amount D2 of the pallet format which is given by the equation (2), an axis of abscissa shows the number (N) of pixels to be transferred and an axis of ordinate indicates a transfer data amount (D). As shown by a straight line 64, the transfer data amount D1 of the full color format is expressed by a straight line such that it increases in proportion to three times as many as the number (N) of pixels. On the other hand, with respect to the transfer data amount D2 of the pallet format of the equation (3) in which, for instance, the number (E) of entries is set to (E=256 entries), the data amount D2 increases along a straight line 66 for the number (N) of transfer pixels. That is, the straight line 66 shows the characteristics such that when the number of pixels is equal to (N=0), the initial value is set to 768 bytes corresponding to 256 representative colors consisting of the 3-byte RGB pixel data of the subtractive color pallet 48 of the 8-bit entries in FIGS. 7A and 7B and the transfer data amount increases in proportion to the increase in the number (N) of pixels in a one-to-one corresponding manner. Thus, the straight line 64 of the full color format and the straight line 66 of the pallet format of 256 entries cross at a point P1. Now, assuming that D1 of the equation (1) and D2 of the equation (3) are equal, the number $N_O$ of pixels in this instance is given by $$N_O 3 = 768 + N_O$$

By solving this equation, the number $N_O$ of pixels which gives the point P1 is $$N_O = 384$$

Thus, as for the transfer data amounts of the full color format and the pallet format of 256 entries, if the number (N) of pixels is less than ($N_O$=384), the transfer data amount of the full color format is smaller. On the other hand, when the number of pixels exceeds ($N_O$=384), the transfer data amount of the pallet format of 256 entries is smaller.

In the transfer format discriminating unit 20 in FIGS. 7A and 7B, the number of pixels ($N_O$=384) which gives the cross point P1 between the straight line 64 of the full color format in FIG. 10 and the straight line 66 of the pallet format of 256 entries is used as a reference. When the number (N) of pixels of the area obtained on the basis of the counting result of the number (A) of colors in FIG. 6 is larger than ($N_O$=384), the pallet format of 256 entries of the small transfer data amount is designated. On the other hand, when the number (N) of pixels is smaller than ($N_O$=384), the full color format of the small transfer data amount is designated. Actually, the value obtained by adding a margin α including the number of bytes which are allocated to identification (ID) information indicative of the data format in the data transfer to the number of pixels ($N_O$=384) at the point P1 where the magnification relation between the transfer data amounts of the full color format and the pallet format of 256 entries is exchanged is used as a discrimination threshold value to discriminate the full color format and the pallet format. Now, assuming that the discrimination threshold value to discriminate the full color format and the pallet format is labeled as "B", $$B = N_O + \alpha$$

In the actual apparatus, it is sufficient to set the margin a to about (α=10), so that B=394.

Figure 11A:
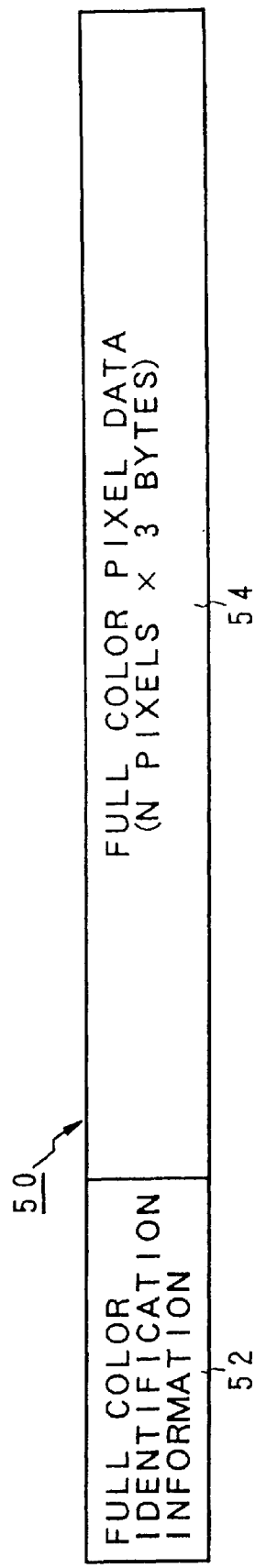
FIGS. 11A and 11B are format explanatory diagrams of transfer data of the full color format and the pallet format in FIGS. 7A and 7B.
Figure 11B:
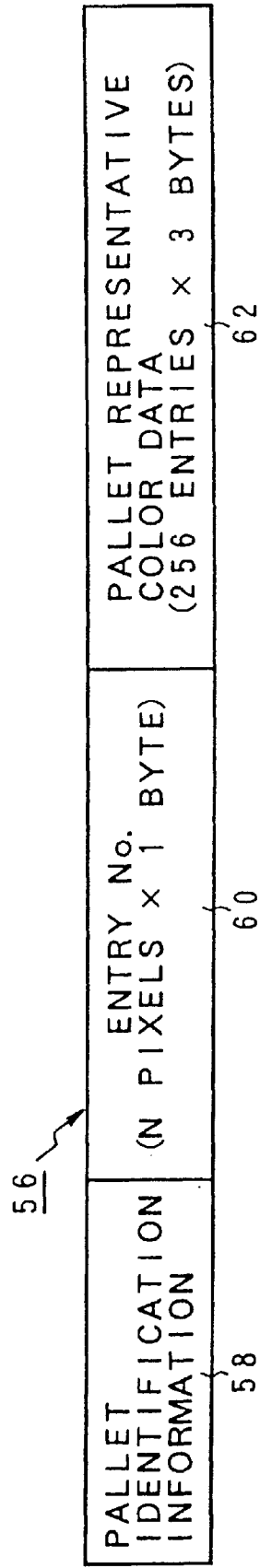

FIGS. 11A and 11B show data formats of the transfer data which is formed by each of the full color format data forming unit 22 and pallet format data forming unit 24 provided for the driver 10 in FIGS. 7A and 7B. FIG. 11A shows full color format transfer data 50. Full color identification (ID) information 52 showing the full color format has been stored in an area of, for instance, head 10 bytes. After that, full color pixel data 54 as much as [the number (N) of transfer pixels×3] bytes has been stored. FIG. 11B shows pallet format transfer data 56. The halftone codes in which the 3-byte RGB pixel data is expressed by the entry number of the subtractive color pallet of the 8-bit entries in FIGS. 7A and 7B, namely, the entry numbers as many as (N pixels×1 byte) are stored in the pallet format transfer data 56 subsequent to pallet identification information 58 of head 10 bytes. Subsequently, the representative colors serving as 3-byte RGB pixel data as many as 256 entries in FIG. 9 as pallet representative color data 62, namely, the representative colors as many as (256 entries×3 bytes) are stored. When forming the entry numbers which are stored into the pallet format transfer data 56 in FIG. 11B, after the subtractive color pallet 48 of the 8-bit entries in FIG. 9 was formed, (N) 3-byte RGB pixel data in FIG. 8 is sequentially read out and the coincident representative color in the pallet is detected and converted into the entry number of the coincident representative color.

The subtractive color pallet 48 having the 8-bit entries of 256 entries in FIG. 9 has been described above as an example of a subtractive color pallet which is formed by the pallet forming unit 18 in FIGS. 7A and 7B. As for the number of entries of the subtractive color pallet which is used in the invention, for example, it is also possible to use a pallet of a size smaller than the subtractive color pallet 48 of the maximum number (256) of entries as shown in FIG. 12. That is, it is possible to use a subtractive color pallet 74 of the 7-bit entries corresponding to the number (128) of entries of FIG. 12, a subtractive color pallet 76 of the 6-bit entries corresponding to the number (64) of entries of FIG. 13, or a subtractive color pallet 78 of the 5-bit entries corresponding to the number (32) of entries of FIG. 15. The number of pixels in which both of the data amounts coincide and which corresponds to the boundary of the magnification relation between the transfer data amounts in the case of performing the data transfer of the pallet format using each subtractive color pallet and the case of performing the data transfer of the full color format is equal to 384 pixels in case of 256 entries, 192 pixels in case of 128 entries, 96 pixels in case of 64 entries, and 48 pixels in case of 32 entries as shown in FIG. 15. Further, now assuming that the margin is set to (α=10 bytes), the discrimination threshold value (B) to discriminate the pallet format and the full color format is equal to 390 pixels in case of 256 entries, 202 pixels in case of 128 entries, 106 pixels in case of 64 entries, and 58 pixels in case of 32 entries.

In FIG. 10, relations of the data transfer amounts for the number (N) of pixels in the pallet format in case of using the subtractive color pallets 74, 76, and 78 corresponding to 128 entries, 64 entries, and 32 entries of FIGS. 12, 13, and 14 are shown by broken lines, respectively. That is, the pallet format of 128 entries is as shown by a straight line 68 of the broken line. The pallet format of 64 entries is as shown by a straight line 70 of the broken line. The pallet format of 32 entries is as shown by a straight line 72 of the broken line. The numbers of pixels which give cross points P2, P3, and P4 between the straight lines 68, 70, and 72 of 128 entries, 64 entries, and 32 entries and the straight line 64 of the full color format change to 192 pixels, 96 pixels, and 48 pixels as will be also obviously understood from the table of FIG. 15. According to such a change in the number of entries of the subtractive color pallet, as shown in FIG. 8, the area of the number (N) of pixels of the color image data 42 serving as a transfer target of once merely decreases in accordance with the increase in the number of entries and the color reproducibility itself does not change.

Figure 16:
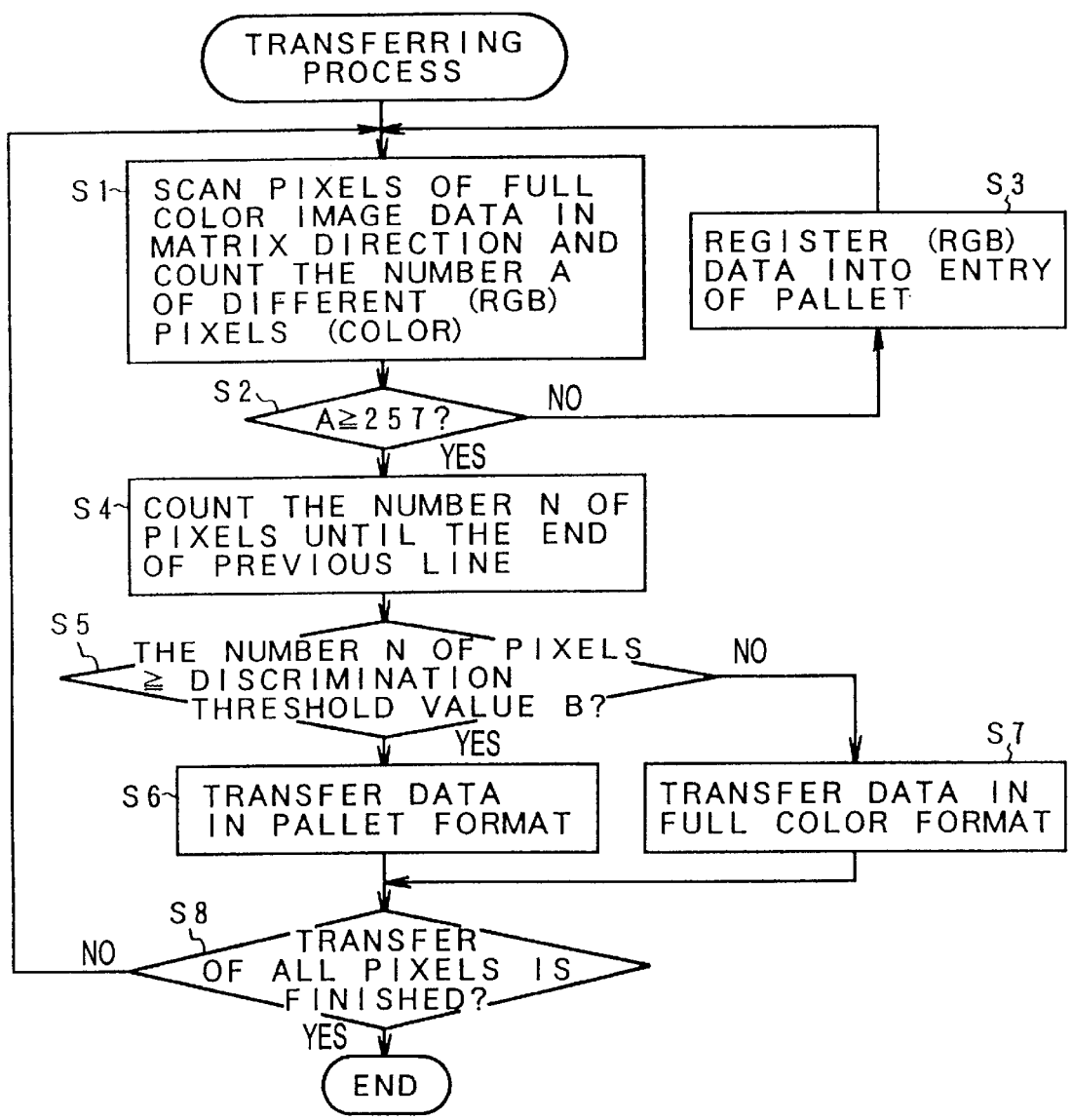
FIG. 16 is a flowchart for a transferring process in FIGS. 7A and 7B.

FIG. 16 is a flowchart for the transferring process in the color image transfer processing apparatus of the invention serving as a driver 10 in FIGS. 7A and 7B. First in step S1, the pixels of the full color image data are scanned in the row direction and the number of pixels having different RGB pixel data, namely, the number (A) of colors is counted by the number of colors calculating unit 16. In step S2, the number (A) of colors counted in step S1 is compared with the value 257 obtained by adding "1" to 256 entries of the subtractive color pallet which is used in this instance. The processing routine advances from step S2 to step S3 until the count value of the number (A) of colors reaches 256 colors. The 3-byte RGB pixel data when the number (A) of colors is sequentially counted in accordance with the entry Nos. 0 to 255 is registered as representative colors into the subtractive color pallet 48 of the 8-bit entries in FIG. 9, thereby forming the subtractive color pallet 48 of the 8-bit entries. When the number (A) of colors exceeds 256 colors by "1", the processing routine advances from step S2 to step S4. As shown in FIG. 8, the number (N) of pixels is counted as the number of transfer pixels up to the end pixel 46 of the previous row. Subsequently, in step S5, a check is made whether the number (N) of pixels to be transferred is equal to or larger than the discrimination threshold value (B=394) which has previously been obtained with respect to 256 entries as shown in FIG. 15 or not. When the number (N) of pixels is larger than (B=394) obtained by adding the margin ($\alpha$=10) to the number $N_O$ of pixels (=384) serving as a boundary of the magnitude relation between the full color format and the pallet format as shown in FIG. 10, the transfer data amount of the pallet format of 256 entries which is given by the straight line 66 is smaller than that of the full color format which is given by the straight line 64. Thus, step S6 follows and the pallet format is designated and the data transfer is performed in accordance with the format of the pallet format transfer data 56 in FIG. 11B. On the other hand, when the number (N) of transfer pixels is less than the discrimination threshold value (B=394), the transfer data amount is located on the left side of the point P1 by the straight line 64 of the full color format in FIG. 10 and is less than the transfer data amount by the straight line 66 of the pallet format of 256 entries. Therefore, step S7 follows and the data transfer is executed in the full color format according to the format of the full color format transfer data 50 in FIG. 11A. After completion of the data transfer of the pallet format in step S6 or the data transfer of the full color format in step S7, step S8 follows and a check is made to see if the transfer of all of the pixels has been finished. When the transfer is not finished yet, the processing routine is returned to step S1 and the processes with respect to the next area are executed. That is, in case of FIG. 8, since the data transfer of up to the end pixel 46 of the fourth row has been finished, in the next process, similar processes are repeated from the head pixel of the fifth row. In the printer I/F processing unit 12 serving as a transfer destination in FIGS. 7A and 7B, when the data transfer is performed every area from the driver 10, the transfer data as much as one area is stored into the reception data storing unit 28. After that, the ID information of the head area in FIG. 11A is checked by the reception data discrimination processing unit 30. When it is the full color ID information 52, the format is determined to be the full color format. When it is the pallet ID information 58, the format is decided to be the pallet format. When the full color format is decided, the full color format data reconstructing unit 34 is activated. The full color pixel data 54 subsequent to the full color ID information 52 of the transfer data of the full color format in FIG. 11A stored in the reception data storing unit 28 is taken out and stored into the reconstructed color image data storing unit 38.

On the other hand, when the pallet format is determined, the pallet reconstructing unit 32 is activated. The pallet data 62 is extracted from the pallet format transfer data 56 in FIG. 11B and the subtractive color pallet 48 of the 8-bit entries as shown in FIG. 9 is reconstructed in the pallet format data reconstructing unit 36. Subsequently, entry numbers 60 subsequent to the pallet ID information 58 in FIG. 11B as many as (N) pixels are sequentially read out, are converted into the representative colors of the corresponding 3-byte RGB pixel data with reference to the reconstructed subtractive color pallet 48 of the 8-bit entries in FIG. 9, and are stored into the reconstructed color image data storing unit 38. When all of the transfer data is stored in the reconstructed color image data storing unit 38, the RGB/YMCK converting unit 40 is activated. The reconstructed RGB pixel data is converted into the pixel data for YMCK printing and stored into each of the image memories 182-1 to 182-4 for YMCK in FIGS. 4A and 4B. When the MPU 172 for controller receives a print instruction, the printing image data of YMCK is read out from the image memories 182-1 to 182-4 and supplied to LED arrays 136-1 to 136-4 for Y, M, C, and K of an electrostatic recording unit of the engine 160. Each color toner is fixed by optically forming an electrostatic latent image onto the photosensitive drum and is transferred onto a belt and fixed, thereby performing a color printing. According to the transferring process of the color image data due to the switching of the full color format and the pallet format in accordance with the transferring process of FIG. 16, the full color pixel data in the original image is transferred as it is as representative colors. With respect to the boundary portion when the color image is divided into the areas and transferred as well, since there is no color deviation between the transfer source and the transfer destination, the good color reproducibility is derived and a color deviation in the boundary portion hardly occurs. On the other hand, in the case where the same color continues, a compressing effect by the data transfer of the pallet format is obtained and the transfer data amount can be sufficiently reduced as compared with that in the full color format. That is, the transfer data amount can be simultaneously reduced without deteriorating the color reproducibility.

Figure 17:
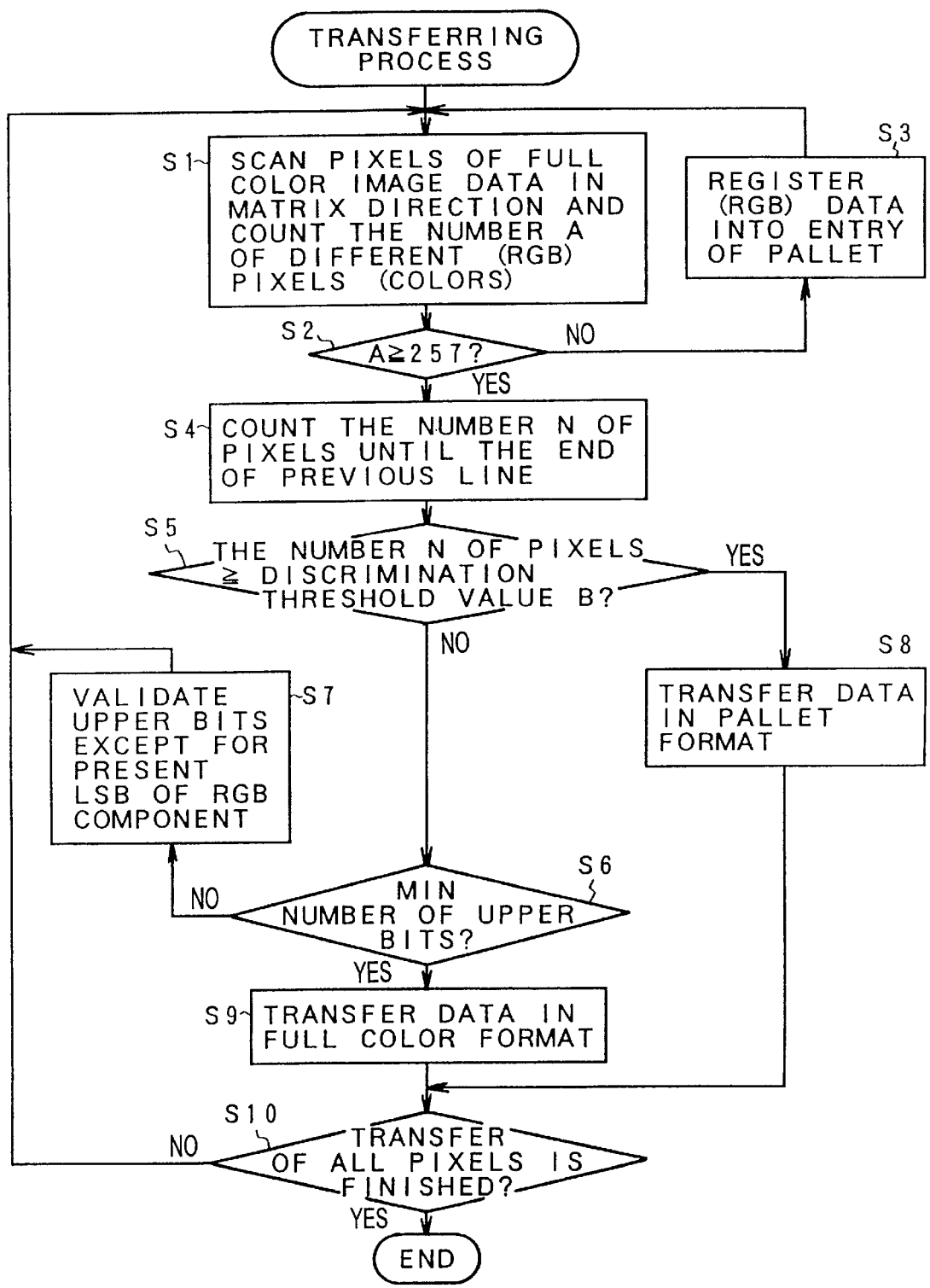
FIG. 17 is a flowchart for a transferring process for sequentially limiting the number of upper bits of a color pixel, thereby allowing the pallet transfer format to be selected.

FIG. 17 shows another embodiment of the transferring process in the color image transfer processing apparatus of the invention provided on the driver 10 side in FIGS. 7A and 7B. FIG. 17 is characterized in that when the data transfer of the full color format is determined in the transferring process in FIG. 16, the data transfer of the full color format is not immediately performed but the number of colors is counted and the subtractive color pallet is formed while restricting the number of upper bits to 7 bits, 6 bits, or 5 bits with regard to each of the 8-bit color component of RGB and the data transfer is executed in the pallet format as much as possible, thereby reducing the transfer data amount.

Figure 18:
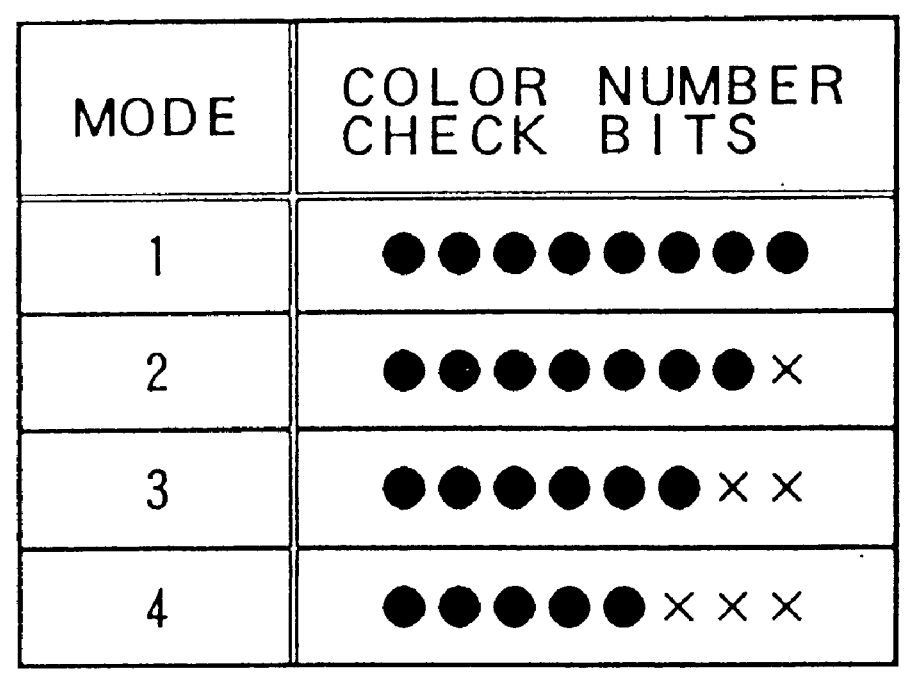

FIG. 18 shows processing modes in the transferring process in FIG. 17. In mode 1, the using bits in each of the RGB color components which are used for the counting operation of the number (A) of colors in step S1 and the formation of the subtractive color pallet in step S3 are all of eight bits and this mode is nothing but the transferring process itself in FIG. 16. When the data transfer of the full color format is not selected in the transferring process in mode 1, the processing mode is switched to mode 2. In mode 2, with respect to eight bits of each of the RGB color components, the counting operation of the number (A) of colors and the formation of the subtractive color pallet are executed by using upper seven bits excluding least significant one bit. Even in mode 2, if the data transfer of the full color format is not selected, upper six bits excluding lower two bits are used in mode 3. If the data cannot be transferred in the full color format even in mode 3, the process is executed by using upper five bits excluding lower three bits in mode 4.

The transferring process will now be described with reference to FIG. 17. First, the transferring process in which all of eight bits are validated in mode 1 is the same as steps S1 to S5 in FIG. 16. At this time, in step S5, when the number (N) of transfer pixels is less than the discrimination threshold value (B=394) in case of 256 entries in FIG. 15 and the transfer data amount of the pallet format is larger than that of the full color format, a check is made in step S6 to see if the number of bits is equal to the minimum number of upper bits. If NO, the present upper bits excluding the least significant bit of the RGB components are validated. That is, the processing mode is switched to mode 2 in FIG. 18. The processing routine is returned to step S1 and with respect to each of the RGB components of upper seven bits in mode 2, the counting operation of the number (A) of colors in step S1 and the registration of the subtractive color pallet in step S3 are executed. When the number (A) of colors reaches 257 in step S2, step S4 follows and the number (N) of pixels as transfer targets is counted. The number (N) of pixels is again compared with the discrimination threshold value (B=394) in step S5. In mode 2, since the pixels of 8 bits of RGB to count the number (A) of colors are limited to upper seven bits, the number of pixels until the number of colors (a=256) is counted increases as compared with the case in mode 1 in which all of eight bits are validated. Thus, the number (N) of transfer pixels obtained by the counting of the number of colors by using upper seven bits in step S5 exceeds the discrimination threshold value (B=394). Step S8 follows and the data transfer of the pallet format is executed. On the other hand, even in mode 2 using upper seven bits, when the data transfer is performed in the full color format, upper six bits in mode 3 in FIG. 18 are used. Even in this case, if the data transfer of the full color format is performed, upper five bits in mode 4 are used. If the transfer data length of the full color format is shorter even in case of the final upper bit number, step S9 follows and the data transfer is executed in the full color format. In the transferring process such that the bit number of each of the RGB color components which are used for the counting operation of the number of colors and the formation of the subtractive color pallet are reduced to upper 8 bits, 7 bits, 6 bits, and 5 bits for the purpose of the data transfer of the pallet format, when the number of bits decreases, a plurality of RGB pixel data exist in the same entry of the subtractive color pallet. Therefore, when a plurality of RGB pixel data exist in the same entry, for example, the center color is registered as a representative color. The average of a plurality of colors can be also obtained and used as a representative color.

Figure 20:
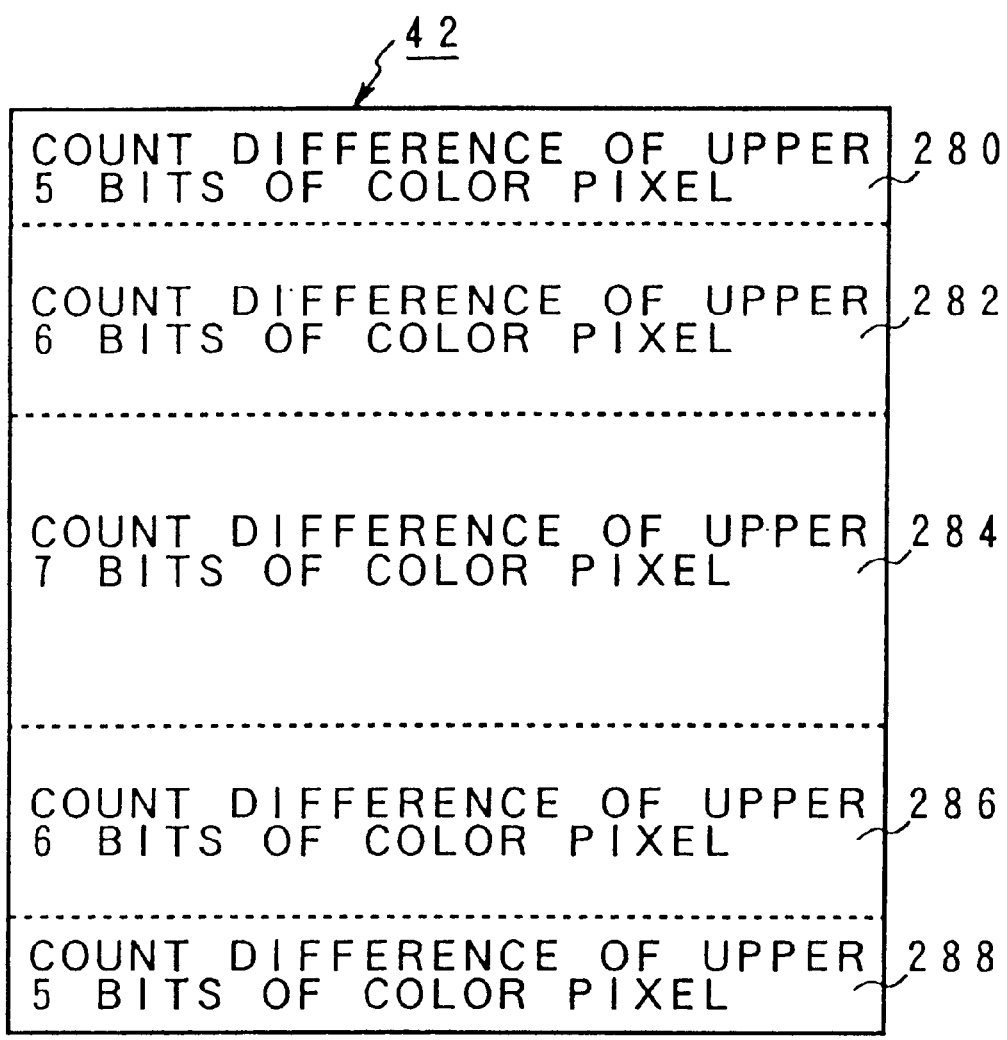
FIG. 20 is an explanatory diagram of the setting of the number of upper bits of the color pixel for the position of the color image.

FIGS. 19A and 19B are flowcharts for the transferring process showing another embodiment of the color image transfer processing apparatus of the invention provided on the driver 10 side in FIGS. 7A and 7B. The transferring process is characterized in that the number of upper bits of each of the RGB components which are used for the counting operation of the number of colors and the formation of the subtractive color pallet are limited in accordance with the position of the full color image data. For instance, as shown in FIG. 20, the full color image data 42 is divided into side bands 280 and 288 locating at the upper and lower edges, next intermediate bands 282 and 286, and a center band 284 locating at the center, and the number of upper bits is changed from the center band 284 toward the side bands 280 and 288 on the outside. That is, in the center band 284, the number of colors is counted by the differences of upper seven bits of each of the RGB component. The number of colors is counted by a difference of upper six bits of each of the RGB components with regard to the next intermediate bands 282 and 286. In the side bands 280 and 288, the number of colors is counted by a difference of upper five bits of each of the RGB components. Generally, in the full color image data 42, color changes are concentrated near the center band 284 and the number of colors is large and as the position approaches the side bands 280 and 288, the color change decreases and the number of colors is small. Therefore, the color reproducibility is raised to the highest value in the center band 284, thereby reducing the color deviation at the area boundary in the data transfer of the pallet format.

The processes by the setting of the upper bits of the color pixels according to the image area will now be described with respect to the flowchart of FIGS. 19A and 19B. First in step S1, the area of an image is discriminated. For example, three areas of the side, intermediate, and center areas are discriminated. When the area is the side area, the number (A) of colors is counted with respect to the difference of upper five bits of each of the RGB components in step S2. Until the number (A) of colors exceeds 256 colors in step S5, the representative color for the primary color pallet is registered in step S6. With respect to the registration of the representative color in this case as well, by limiting the number of bits to upper five bits, a plurality of RGB pixel data exist as representative color candidates in the same entry. Therefore, the center color among a plurality of candidates or the average color thereof is set to the representative color in a manner similar to the process in FIG. 17. When the number (A) of colors reaches 257, the number (N) of pixels to be transferred is counted in step S7. The number (N) of pixels is compared with the discrimination threshold value (B=384) of 256 entries in step S8. When it is equal to or larger than the discrimination threshold value (B), the data transfer is performed in the pallet format in step S9. When it is less than the threshold value (B), the data transfer of the full color format is performed in step S10. In step S11, a check is made to see if the transfer of all pixels has been finished. When the transfer is not finished yet, the processing routine is returned to step S1 and the image area is discriminated. The counting operation of the number of colors and the registration of the representative color for the subtractive color pallet are executed with regard to upper five bits in step S2 in case of the side band, upper six bits in step S3 in case of the intermediate band, and upper seven bits in step S4 in case of the center band, respectively.

Area Width Control of Subtractive Color Pallet

Figure 21:
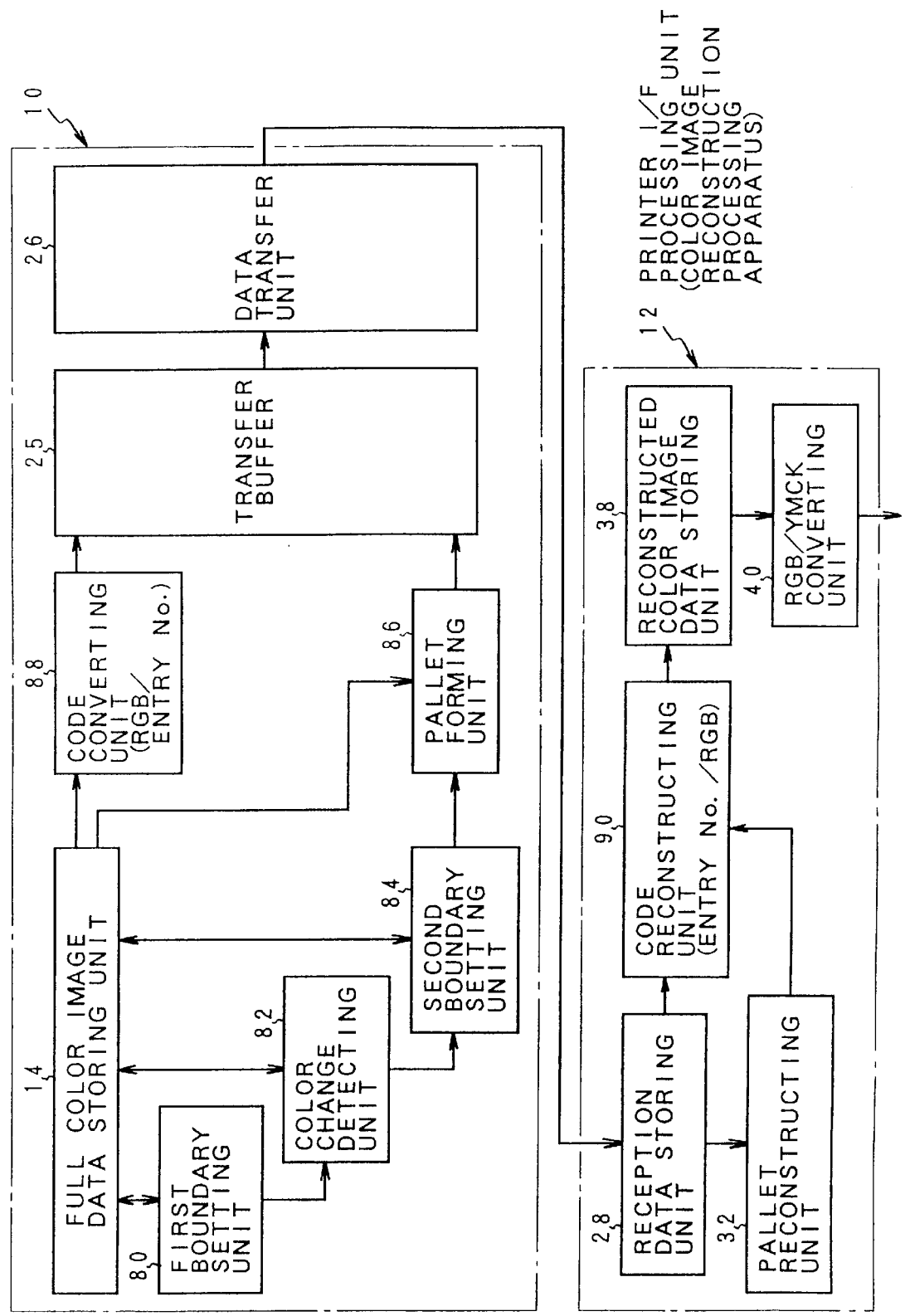
FIG. 21 is a functional block diagram of the second embodiment of a color image transfer apparatus of the invention for setting a boundary of an area division on the basis of a color change.

FIG. 21 shows the second embodiment of a color image transfer processing apparatus according to the invention. The embodiment is characterized in that an area width of a color image as a target of the subtractive color process is dynamically set on the basis of the actual color change. The driver 10 functions as a color image transfer processing apparatus provided on the personal computer 192 side in FIGS. 4A and 4B, data transfers the full color image by the subtractive color process using the subtractive color pallet, and transfers to the printer I/F processing unit 12 provided on the printer side in FIGS. 4A and 4B, thereby reconstructing the image. The driver 10 has the image data storing unit 14, a first boundary setting unit 80, a color change detecting unit 82, a second boundary setting unit 84, a pallet forming unit 86, a code converting unit 88, and the data transfer unit 26. The printer I/F processing unit 12 side has the reception data storing unit 28, pallet reconstructing unit 32, a code reconstructing unit 90, the reconstructed color image data storing unit 38, and the RGB/YMCK converting unit 40. In the first boundary setting unit 80, color change detecting unit 82, and second boundary setting unit 84 provided for the driver 10 in FIG. 21, with respect to the color image using the full color pixel values as transfer targets stored in the image data storing unit 14, a boundary for the data transfer by the subtractive color process is dynamically detected on the basis of the color change.

Figure 22:
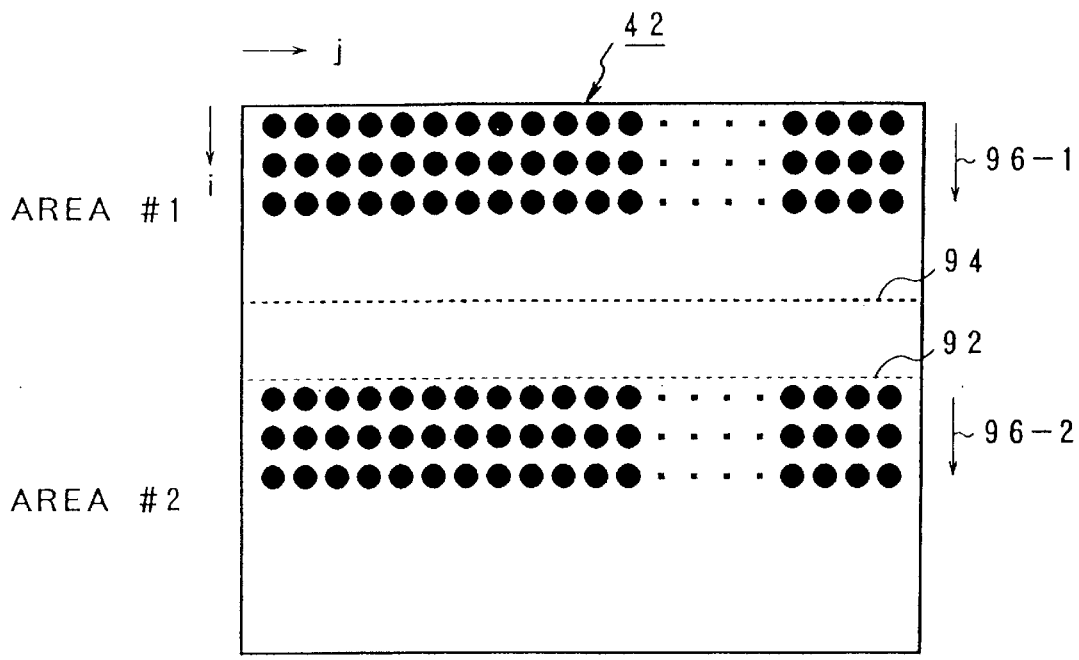
FIG. 22 is an explanatory diagram of the boundary setting according to the second embodiment of FIG. 21.

FIG. 22 is an explanatory diagram of the setting of a boundary for the color image in the driver 10 in FIG. 21. RGB pixel data for full color expression has been stored in the color image data 42 in the matrix direction as shown by black painted circles in correspondence to, for instance, a printer image. For the color image data 42, a predetermined first boundary 92 is fixedly set in the row direction in the first boundary setting unit 80 in FIG. 21. By setting the first boundary 92, the color image data 42 is divided into an upper area #1 and a lower area #2. In the embodiment of FIG. 21, the data transfer by the subtractive color process using the subtractive color pallet is not executed with respect to the areas #1 and #2 by the first boundary 92 which was fixedly set but the color change is detected by the color change detecting unit 82 from the head row of each area with respect to each of the areas #1 and #2 while setting the directions perpendicular to the boundary direction (row direction) to retrieving directions 96-1 and 96-2. For example, when considering the upper area #1 in FIG. 22, the head color pixel of the row at the left edge is set to a reference and a color difference between the reference color pixel and the subsequent color pixel is detected every row.

Figure 23:
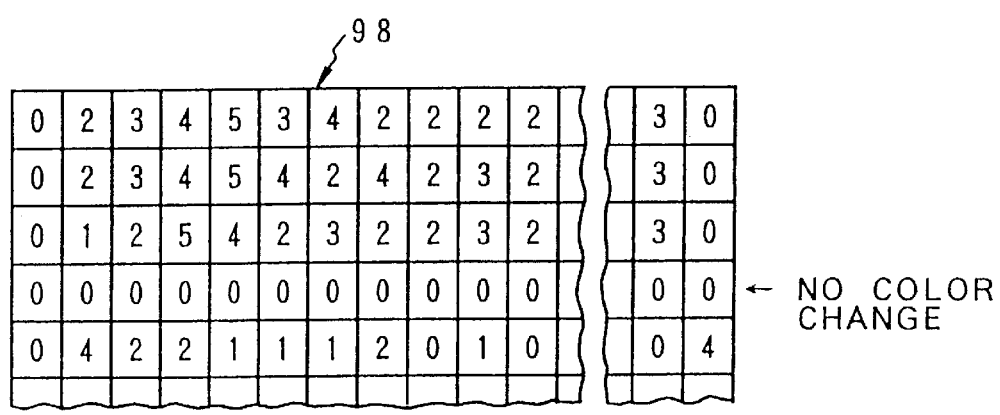
FIG. 23 is an explanatory diagram of a detection result of a color difference on a row unit basis according to the embodiment of FIG. 21.

FIG. 23 shows a detection result of the color differences obtained by the color change detecting unit 82 in FIG. 21 while setting the head pixel at the left edge of each row to the reference and the L*a*b* colorimetric system is shown as an example. The color pixels of the pixel data storing unit 14 in FIG. 21 are based on the RGB display system. On the other hand, they are based on the YMCK calorimetric system on the printer side. In the embodiment, the conversion from the RGB pixel data to the YMCK pixel data is performed by the RGB/YMCK converting unit 40 provided for the printer I/F processing unit 12. Generally, when converting from the RGB colorimetric system to the YMCK calorimetric system, the RGB calorimetric system is once converted into the L*a*b* calorimetric system. In FIG. 23, therefore, the color differences of the L*a*b* pixel values are shown as an example. In such color difference image data 98, all of the color differences of the fourth row are equal to 0 and it will be understood that the pixels of the same color are arranged on the fourth row. In the color change detecting unit 82 in FIG. 21, a row without a color change in which all of the color differences are equal to 0 is detected with respect to the color difference image data 98 in FIG. 23. A second boundary 94 is newly set in such a row as shown in FIG. 22. That is, a portion without a color change in the color image data 42 in FIG. 22 is found and the second boundary 94 is set by the second boundary setting unit 84. The data transfer using the subtractive color pallet process is executed for each of the upper and lower areas #1 and #2 divided by the second boundary 94 newly set. In the second boundary setting unit 84 in FIG. 21, when the row without a color change where all of the color differences are equal to 0 like a fourth row in FIG. 23 is not found, a portion of the maximum color change is set to the second boundary 94 and the transfer data process using the subtractive color pallet is executed every area divided by the second boundary.

Figure 24:
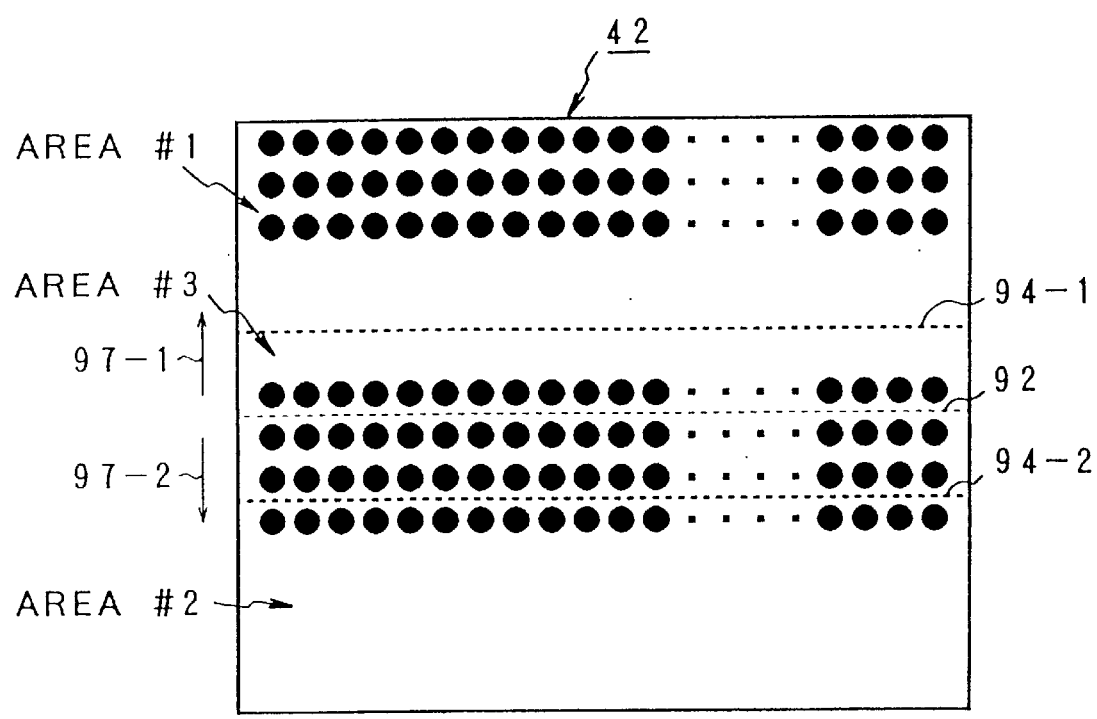
FIG. 24 is an explanatory diagram of the other color change retrieving directions according to the embodiment of FIG. 21.

FIG. 24 shows another embodiment of the process for setting the new second boundary by the color change detecting unit 82 in FIG. 21 while using the first boundary 92 as a reference. In the embodiment, as shown in retrieving directions 97-1 and 97-2, for the areas #1 and #2 locating on both sides of the first boundary 92 which was fixedly set by the first boundary setting unit 80, the color change is retrieved on a row unit basis in the direction away from the boundary while setting the first boundary 92 as a start point. An area without a color change where all of the color differences of the fourth row in FIG. 23 are equal to 0 is found and second boundaries 94-1 and 94-2 are newly set. According to the setting of the second boundaries 94-1 and 94-2 by setting the retrieving directions 97-1 and 97-2 into the areas on both sides of the first boundary 92 as a center, a new area #3 is formed in the boundary portion including the first boundary 92. Thus, although there are initially two areas #1 and #2, the area #3 including the first boundary 92 is newly formed by setting the new second boundaries 94-1 and 94-2. While forming the subtractive color pallet by the pallet forming unit 86 with respect to each of the areas #1, #2, and #3, the subtractive color process for converting the RGB pixel data of each area into the entry numbers of the subtractive color pallet is executed by the code converting unit 88 and the data is transferred to the printer I/F processing unit 12.

FIG. 25 shows a specific example of the forming process of the subtractive color pallet by the pallet forming unit 86 provided for the driver 10 in FIG. 21. In the embodiment, 256 entries in FIG. 9 are used as a subtractive color pallet. The 256-entry subtractive color pallet is made up of an R pallet 200-1, a G pallet 200-2, and a B pallet 200-3. The R, G, and B pallets 200-1 to 200-3 have total 8-bit entries of upper 3-bit entries of the R data, upper 3-bit entries of the G data, and upper 2-bit entries of the B data. For those entries, there are corresponding relations among the R pixel values, G pixel values, and B pixel values shown on the left side of each pallet. In the R, G, and B pallets 200-1 to 200-3, a range for the R pixel values and the G pixel values of eight areas which are determined by the upper 3-bit entries has fixedly been preset as shown by broken lines with regard to the R and G pallets 200-1 and 200-2. Similarly, corresponding relations of the B pixel values have also fixedly been preset as shown by broken lines with respect to four areas of the B pallet 200-3 which are determined by upper two bits of the B data. In the code converting unit 88 provided for the driver 10 in FIG. 21, the RGB pixel data is read out one by one from the image data storing unit 14. The 8-bit data comprising a combination of upper three bits of the R data, upper three bits of the G data, and upper two bits of the B data is stored into a buffer of the data transfer unit 26 as entry numbers of the subtractive color pallet. At the same time, the R pixel values, G pixel values, and B pixel values are stored as candidates of the pallet representative values into corresponding eight or four areas of the R, G, and B pallets 200-1 to 200-3 in FIG. 25. When such processes are finished with respect to all of the RGB pixels of one area, a plurality of representative value candidates have been stored in each area of the R, G, and B pallets 200-1 to 200-3 in FIG. 25. Therefore, the representative pixel value is determined from the average value of the plurality of representative value candidates stored as candidates in each area of the R, G, and B pallets 200-1 to 200-3. For example, a representative R pixel value (=28) is obtained by the average calculation and is stored in the area of 3-bit entries 000 corresponding to the R pixel values 0 to 63 of the R pallet 200-1 in FIG. 25. By obtaining the representative pixel values with respect to all of the remaining areas of the R, G, and B pallets 200-1 to 200-3 as mentioned above, for example, representative pixel values as shown in the diagram are obtained. In the data transfer unit 26 in FIG. 21, the entry numbers converted from the RGB pixel data by the code converting unit 88 and the representative pixel values formed as shown in FIG. 25 by the pallet forming unit 86 are data transferred to the printer I/F processing unit 12 side. In the printer I/F processing unit 12 serving as a transfer destination in FIG. 21, the reception data is extracted every area by the reception data storing unit 28. The subtractive color pallet as shown in FIG. 25 is reconstructed from the representative colors of the received subtractive color pallet by the pallet reconstructing unit 32. The entry number of the corresponding area is read out and converted into the color pixel comprising the representative color of the subtractive color pallet table by the code converting unit 88 and stored into the reconstructed color image data storing unit 38. For example, if the entry number is "10100101", it is first converted into the B pixel value (=41) with reference to the B pallet 200-3 by lower two bits "01", is converted into the G pixel value (=64) with reference to the G pallet 200-2 by subsequent lower three bits "001", and is further converted into the R pixel value (=205) with reference to the R pallet 200-1 by upper three bits "101".

FIGS. 26A and 26B are flowcharts for the color image transferring process on the driver 10 side in FIG. 21. First in step S1, the first boundary 92 which has fixedly been determined with respect to the color image data 42 as shown in FIG. 22 is set and the color image is divided into a plurality of areas. In step S2, the color change is detected every area on a row unit basis and, for example, the color difference image data 98 as shown in FIG. 23 is obtained. In step S3, a check is made to see if there is a row without a color change where all of the color differences in, for example, the row direction are equal to 0 with respect to the detected color difference image data 98. When the row without a color change can be detected, step S5 follows and the new second boundary 94 is set into such a row as shown in FIG. 22. When there is no row without a color change, step S4 follows and a row of the maximum color change is retrieved and a new line boundary is set there in step S5. When it is determined that such processes have been executed with respect to all of the areas in step S6, the data transfer by the subtractive color process of each area is performed in step S7. That is, in step S7, the full color pixel values in the area which is at present being processed, for example, the RGB pixel values are converted into the entry numbers of the subtractive color pallet of eight bits comprising a combination of upper three bits of the R data, upper three bits of the G data, and lower two bits of the B data in correspondence to the subtractive color pallet of 256 entries in FIG. 25 and stored into the transfer buffer. At the same time, the full color pixel values converted into the entry numbers are stored as representative color candidates into the corresponding entries of the subtractive color pallet in step S8. When it is determined in step S9 that the processes in steps S7 and S8 have been finished with respect to all of the pixels of the same row, step S10 follows. The representative color of the entry is determined on the basis of the candidates of the plurality of representative colors stored every entry. The representative color is decided to the average value, center value, or the like of the representative color candidates. When it is determined in step S11 that the decision of the representative color of each entry has been finished with respect to all of the areas, step S12 follows. The entry numbers converted from the full color pixel values and the decided representative color of the subtractive color pallet are data transferred to the apparatus on the transfer destination side every area. As mentioned above, by setting the boundary into the portion without a color change of the color image data and performing the data transfer by the subtractive color process using the subtractive color pallet, if the area without a color change exists in the areas divided by the first boundary which was fixedly decided, the boundary is set into such a portion and the color image is divided into finer areas. Thus, a color deviation when reconstructing the color image which was data transferred by the subtractive color process in the portion of the first boundary which had first been set is suppressed and the boundary can be made inconspicuous.

Figure 27:
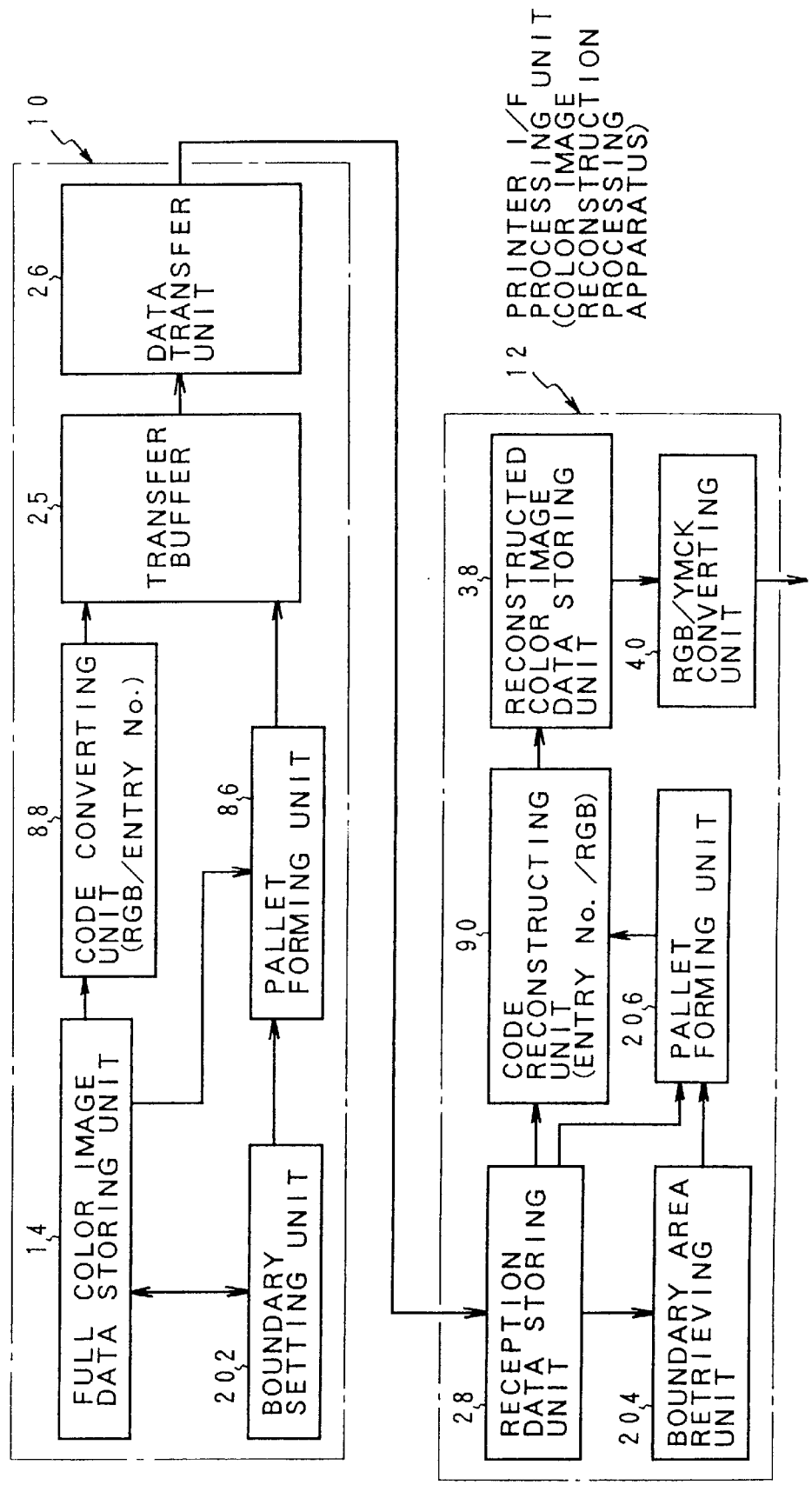
FIG. 27 is a functional block diagram of a color image reconstruction processing apparatus of the invention for setting an area into a boundary portion on the receiving side, thereby smoothing a color change of the boundary portion.
Figure 28:
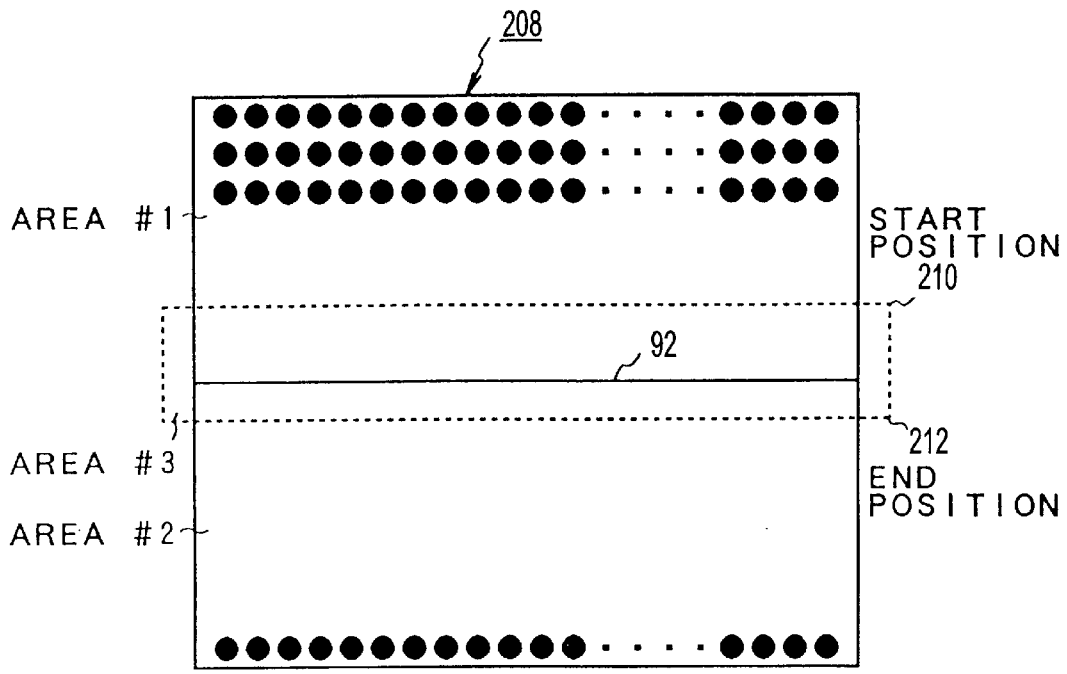
FIG. 28 is an explanatory diagram of the area setting to the boundary portion in the reconstructing process in FIG. 27.

FIG. 27 shows another embodiment of the boundary width control in the subtractive color process and the embodiment is characterized in that the area width is controlled in case of receiving and reconstructing the data which was subjected to the subtractive color process. The driver 10 side serving as a color image transfer processing apparatus is constructed by the image data storing unit 14, a boundary setting unit 202, the pallet forming unit 86, the code converting unit 88, a transfer buffer 25, and the data transfer unit 26. The boundary setting unit 202 merely sets the fixed first boundary 92 in FIG. 22. On the other hand, the printer I/F processing unit 12 functioning as a color image reconstruction processing apparatus has the reception data storing unit 28, a boundary area retrieving unit 204, a pallet forming unit 206, the code reconstructing unit 90, the reconstructed color image data storing unit 38, and the RGB/YMCK converting unit 40. The boundary area retrieving unit 204 forms a new area including a boundary of the divided areas with respect to, for instance, entry number image data 208 by the subtractive color process which was received as shown in FIG. 28 as a target, forms a subtractive color pallet with respect to the area which includes the boundary and was newly formed, and converts the entry numbers into the full color pixel values expressed by the pallet representative colors. That is, in the entry number image data 208, the entry numbers and the RGB pixel values as many as all of the entries of the subtractive color pallet have been received separately for the upper and lower areas #1 and #2 of the reception boundary 92 designated by the transfer source. In the boundary area retrieving unit 204 provided in the printer I/F processing unit 12 in FIG. 27, therefore, the color change is detected on a row unit basis in the direction away from the reception boundary 92 with respect to the upper area #1 around the reception boundary 92 which has fixedly been set as a center. In the detection of the color change as well, in a manner similar to the case of the color change detecting unit 82 provided on the driver 10 side in FIG. 21, the entry number pixel at the left edge of each row is used as a reference, a difference between the reference pixel and each of the subsequent entry number pixels in the row direction is detected as a color difference, and color difference data expressed by a difference of the entry number corresponding to the entry number image data 98 in FIG. 23 is formed. With regard to the color difference data showing the color change as mentioned above, a position without a color change where all of the color differences in the row direction are equal to 0 is detected. As shown in FIG. 28, the position without a color change is set to a start position 210. On the other hand, as for the lower area #2 of the reception boundary 92 as well, the color change is detected on a row unit basis in the direction away from the reception boundary 92 and a position where the color differences in the row direction are equal to 0 is likewise set to an end position 212. Thus, the new boundary #3 in which the positions before and after the reception boundary 92 are set to the start position 210 and end position 212 is set. When the area #3 including the reception boundary 92 can be newly set as mentioned above, the subtractive color pallet is reconstructed by the pallet forming unit 206 in FIG. 27 with respect to each of the areas #1 and #2 and the new area #3.

Figure 29:
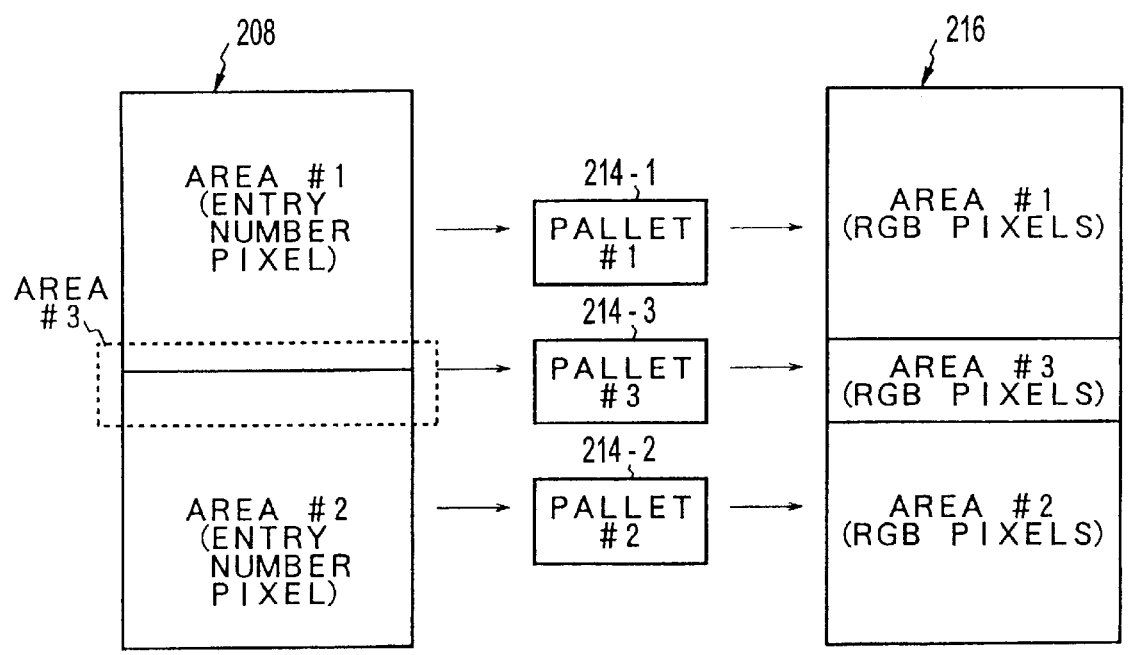
FIG. 29 is an explanatory diagram of a forming process of a subtractive color pallet of the boundary area in FIG. 28.

FIG. 29 shows the pallet forming process by the pallet forming unit 206 in FIG. 27. In the entry number image data 208, the new area #3 including the reception boundary 92 has been set as shown in FIG. 28 and the remaining areas on both sides thereof are the received areas #1 and #2. As for the areas #1 and #2, pallets 214-1 and 214-2 are immediately reconstructed from the reception data and the entry numbers of the areas #1 and #2 can be reconstructed as RGB pixel data comprising the pallet representative colors with reference to the pallets 214-1 and 214-2. On the other hand, with regard to the area #3 which includes the reception boundary 92 and was newly formed on the receiving side, a subtractive color pallet 214-3 is formed on the basis of the subtractive color pallets 214-1 and 214-2 reconstructed from the reception data, and the entry numbers of the area #3 are converted into the RGB pixel data comprising the pallet representative colors by using the newly formed subtractive color pallet 214-3.

Figure 30A:
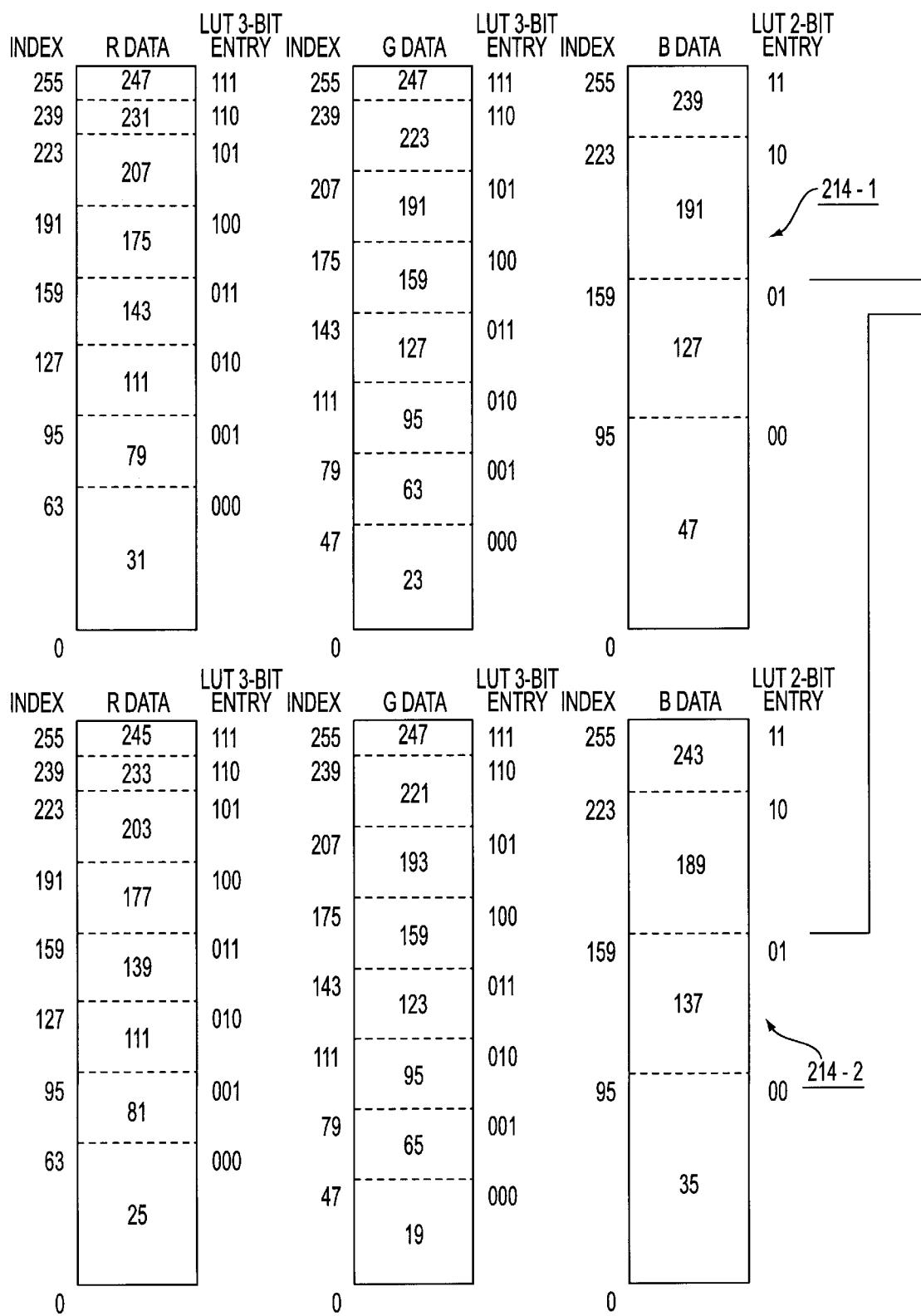
FIGS. 30A and 30B are explanatory diagrams of a specific example in which a representative color of a boundary pallet is decided by an average calculation of two reception pallets.
Figure 30B:
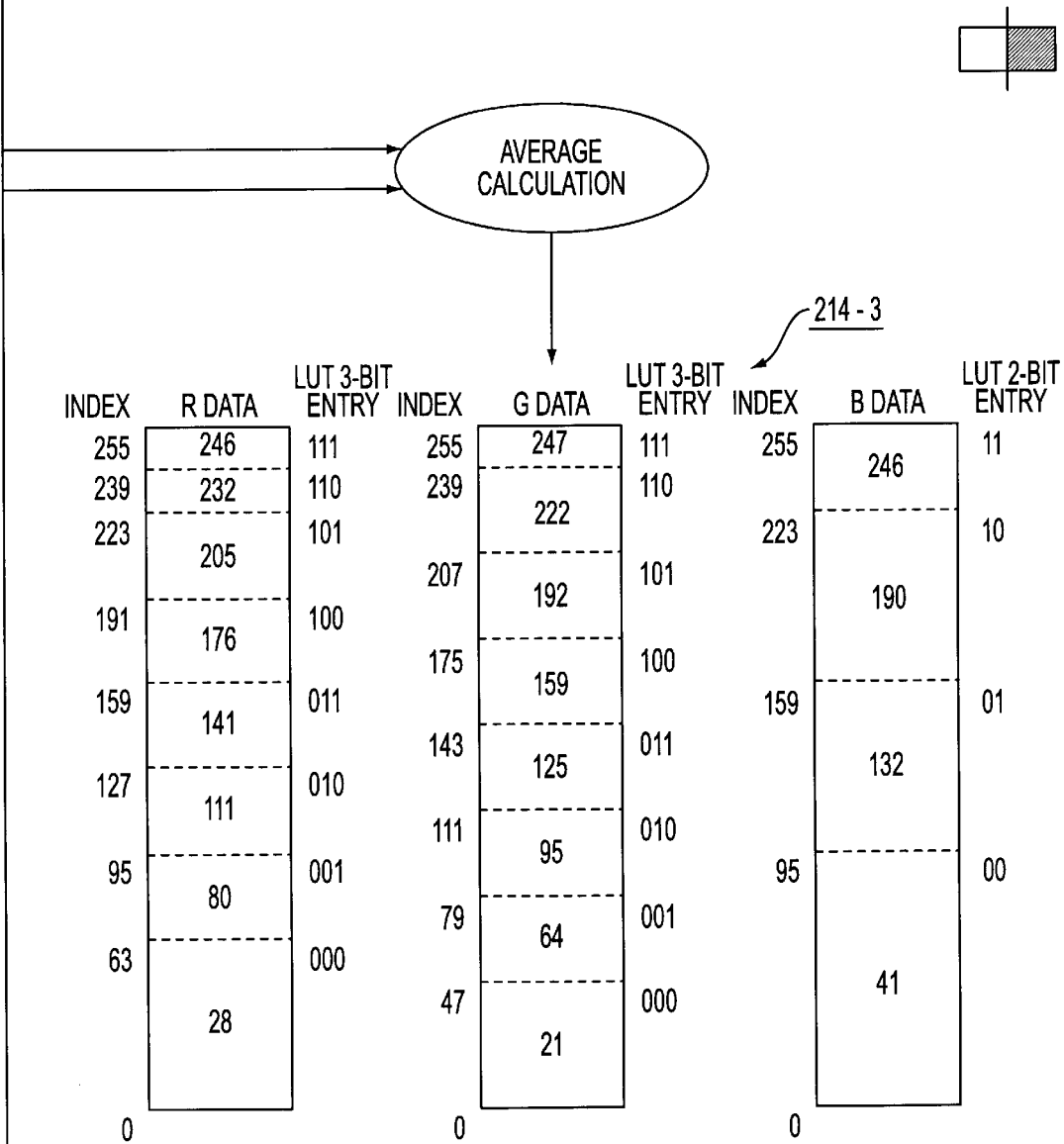

FIGS. 30A and 30B show a specific example of the forming process of the subtractive color pallet 214-3 which is used for the conversion of the newly formed area #3 in FIG. 29. First, in the subtractive color pallets 214-1 and 214-2, the representative colors which are used for the conversion of the entry numbers can be immediately reconstructed from the reception data. The subtractive color pallets 214-1 and 214-2 have the structures shown in FIG. 25. The newly formed subtractive color pallet 214-3 of the area #3 by the average calculation of the subtractive color pallets 214-1 and 214-2 which were received and reconstructed are formed. Specifically speaking, a value obtained by adding the representative colors of the same entry in each pallet of RGB of the subtractive color pallets 214-1 and 214-2 and dividing the addition value by 2 is used as a representative color of the newly formed subtractive color pallet 214-3. For example, in R data upper 3-bit entries "111" corresponding to R pixel values 240 to 255 in the R pallet (R data) of the subtractive color pallets 214-1 and 214-2, since R1=247 in case of the subtractive color pallet 214-1 and R2=245 in case of the subtractive color pallet 214-2, $$R3=(R1+R2)/2=(247+245)/2=246$$

is obtained as a value of the subtractive color pallet 214-3. In a manner similar to the above, the average values are also calculated for the remaining entries and the representative value of each entry with respect to RGB of the subtractive color pallet 214-3 is registered.

In FIGS. 30A and 30B, the subtractive color pallets in which the areas of RGB to decide the representative colors have fixedly been decided are shown and explained as examples. However, it is also possible to actually develop the representative color of the received pallet into the color space, to again divide it into 256 spaces, and to decide the representative color of the subtractive color pallet.

In FIGS. 31A and 31B, the subtractive color pallets 214-1 and 214-2 obtained from the reception data are converted into the YMC colorimetric system. For the RGB calorimetric system, the YMC calorimetric system becomes

Y=1−B
M=1−G
C=1−R

The subtractive color pallet tables 214-1 and 214-2 of the YMC calorimetric system in FIGS. 30A and 30B can be easily obtained from the representative colors of the received RGB subtractive color pallets. Each of the representative colors of the subtractive color pallets 214-1 and 214-2 converted from RGB to YMC in FIGS. 31A and 31B is converted into the L*a*b* pixel and developed into an L*a*b* color space 220 in FIG. 32. The colors of 512 representative colors of the two subtractive color pallets 214-1 and 214-2 shown in FIGS. 31A and 31B exist in the L*a*b* color space. Therefore, the color space is divided into two color spaces 222-1 and 222-2 on the horizontal plane where a middle point of a line segment connecting the 256th point and the 257th point from upper white is obtained. In this instance, if the point is overlapped, a weight is given to this point by only an overlapped amount. In this manner, the color space is subsequently divided into spaces 224-1 to 224-4 so as to equalize the number of points in one space and is finally divided into 256 spaces. When the color space is divided into 256 spaces, points of two pixels exist in each of the divided areas. Therefore, the representative color is decided by any one of the following methods from the values of two pixels existing in each space.

I. The middle point of the line segment connecting two points is set to the representative color.

II. A ratio between the pixel values at two points is calculated, a point at which the line segment connecting the two points is divided by a ratio opposite to the calculated ratio is used as a representative point, and the representative color is decided.

III. The center of gravity of the color space is used as a representative point and the representative color is decided.

IV. The middle point of the line segment connecting the representative point obtained in the item III and the representative point derived in the item II is used as a representative point and the representative color is determined.

V. The middle point of the line segment connecting the representative point obtained in the item I and the representative point derived in the item III is used as a representative point and the representative color is determined.

In FIG. 32, since the representative colors of the subtractive color pallet 214-3 newly formed by the division in the L*a*b* color space are decided, with respect to the newly formed subtractive color pallet 214-3 as well, the values are returned to the pixel values of the YMC colorimetric system in a manner similar to FIGS. 30A and 30B.

Figure 33:
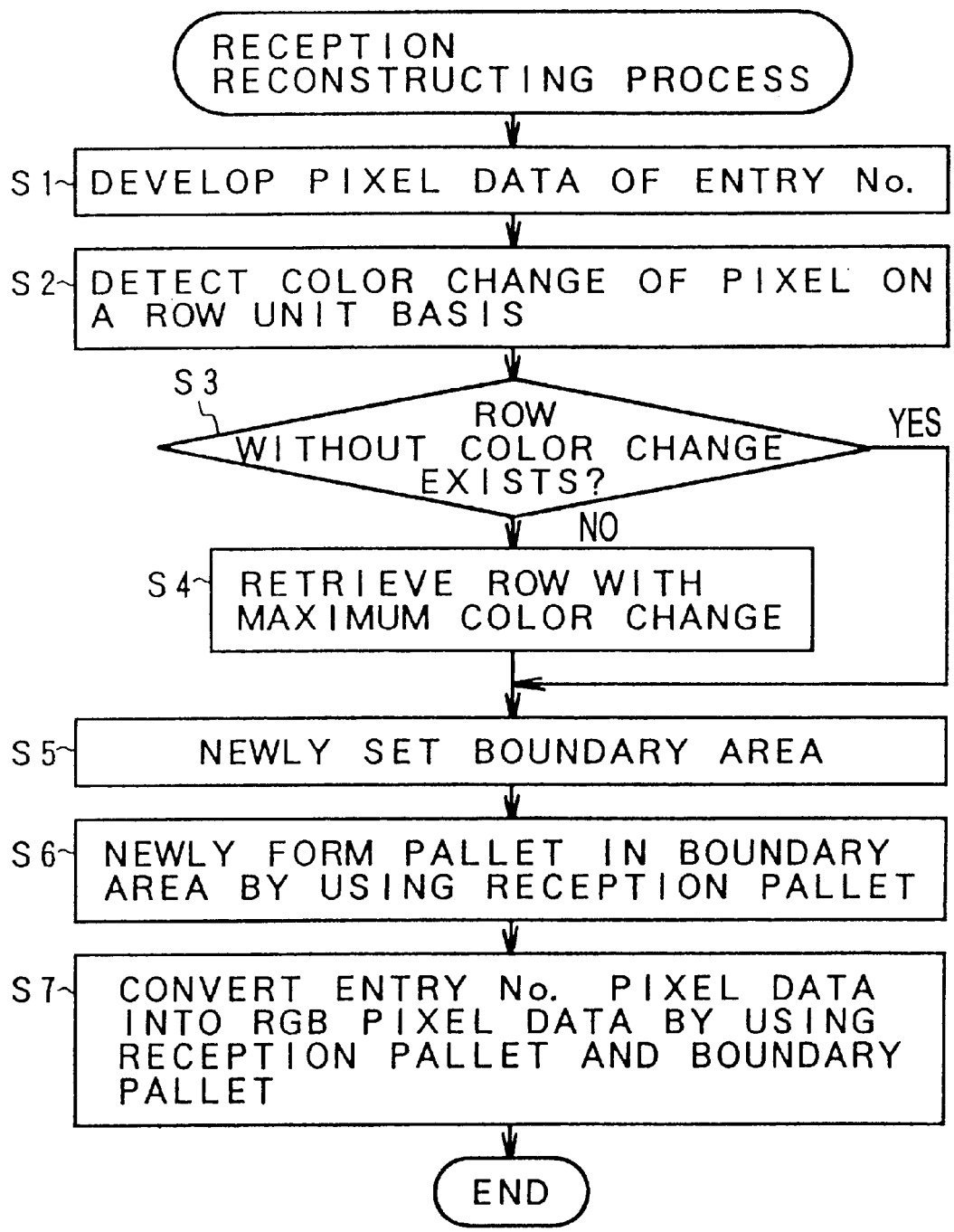
FIG. 33 is a flowchart for a reconstructing process for setting an area into the boundary portion on the receiving side in FIG. 27, thereby smoothing a color change of the boundary portion.

FIG. 33 is a flowchart for the receiving and reconstructing processes in the printer I/F processing unit 12 functioning as a color image reconstruction processing apparatus in FIG. 27. First in step Sl, the pixel data expressed by the entry number is developed from the reception data into the reception buffer or the like of the reception data storing unit 28. In step S2, the color change of the pixel expressed by the entry number is detected on a row unit basis in the direction away from the reception boundary 92 as a start point by the boundary area retrieving unit 204 as shown in FIG. 28. In step S3, if there is a row without a color change, for instance, it is set to the start position 210 in the upper area #1 of the reception boundary 92 and is set to the end position 212 in the lower area #2. In step S5, the boundary area #3 including the reception boundary 92 is newly set. In step S6, a subtractive color pallet which is used for the conversion of the entry number of the newly set boundary area #3 is newly formed by using the received subtractive color pallet. In step S7, the entry number pixel data is converted into the RGB pixel data every area by using the reception pallet and the newly formed subtractive color pallet. With respect to the boundary of the received pixel data as mentioned above, an area is newly set, the subtractive color pallet is formed, and the color image is reconstructed, so that a smoothing process such that a sudden change of the color in the boundary portion is suppressed and a smooth change is obtained is executed. Even if the image data is divided into the areas and the data transfer is performed by the subtractive color process, the color deviation in the boundary portion can be sufficiently suppressed.

Subtractive Color Process by Weighting According to Boundary Distance

Figure 35:
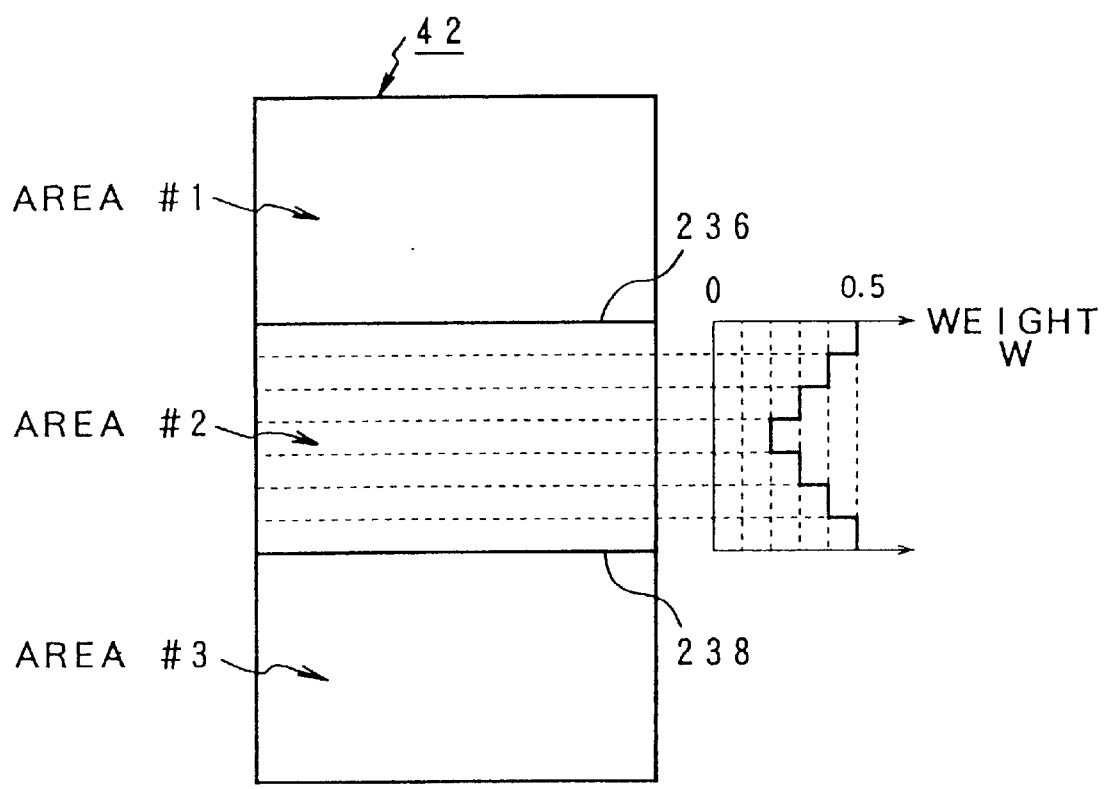
FIG. 35 is an explanatory diagram of a weight setting according to the distance from the boundary in FIG. 34.

FIG. 35 shows the third embodiment of a color image transfer processing apparatus of the invention. The third embodiment is characterized in that with respect to the subtractive color process of each of a plurality of areas obtained by dividing a color image, a representative color of a subtractive color pallet is determined by weighting according to a distance from the boundary. The full color image data storing unit 14 is provided for the driver 10 of a personal computer functioning as a color image transfer processing apparatus. An area dividing unit 230, a weight setting unit 232, and a representative color deciding unit 234 are provided for the full color image data storing unit 14. A subtractive color pallet of each area is formed by the pallet forming unit 86 on the basis of them. The code converting unit 88 converts the RGB pixel values into halftone codes expressed by the entry numbers of the subtractive color pallet every area of the full color image data storing unit 14. The halftone codes converted by the code converting unit 88 and the representative colors of the subtractive color pallet formed by the pallet forming unit 86 are stored into the transfer buffer 25 on an area unit basis. After that, they are sent to the printer I/F processing unit 12 functioning as a color image reconstruction processing apparatus by the data transfer unit 26. The printer I/F processing unit 12 has the reception data storing unit 28, pallet reconstructing unit 32, code reconstructing unit 90 to return the halftone codes expressed by the entry numbers to the RGB pixel values, reconstructed color image data storing unit 38, and RGB/YMCK converting unit 40.

Figure 34:
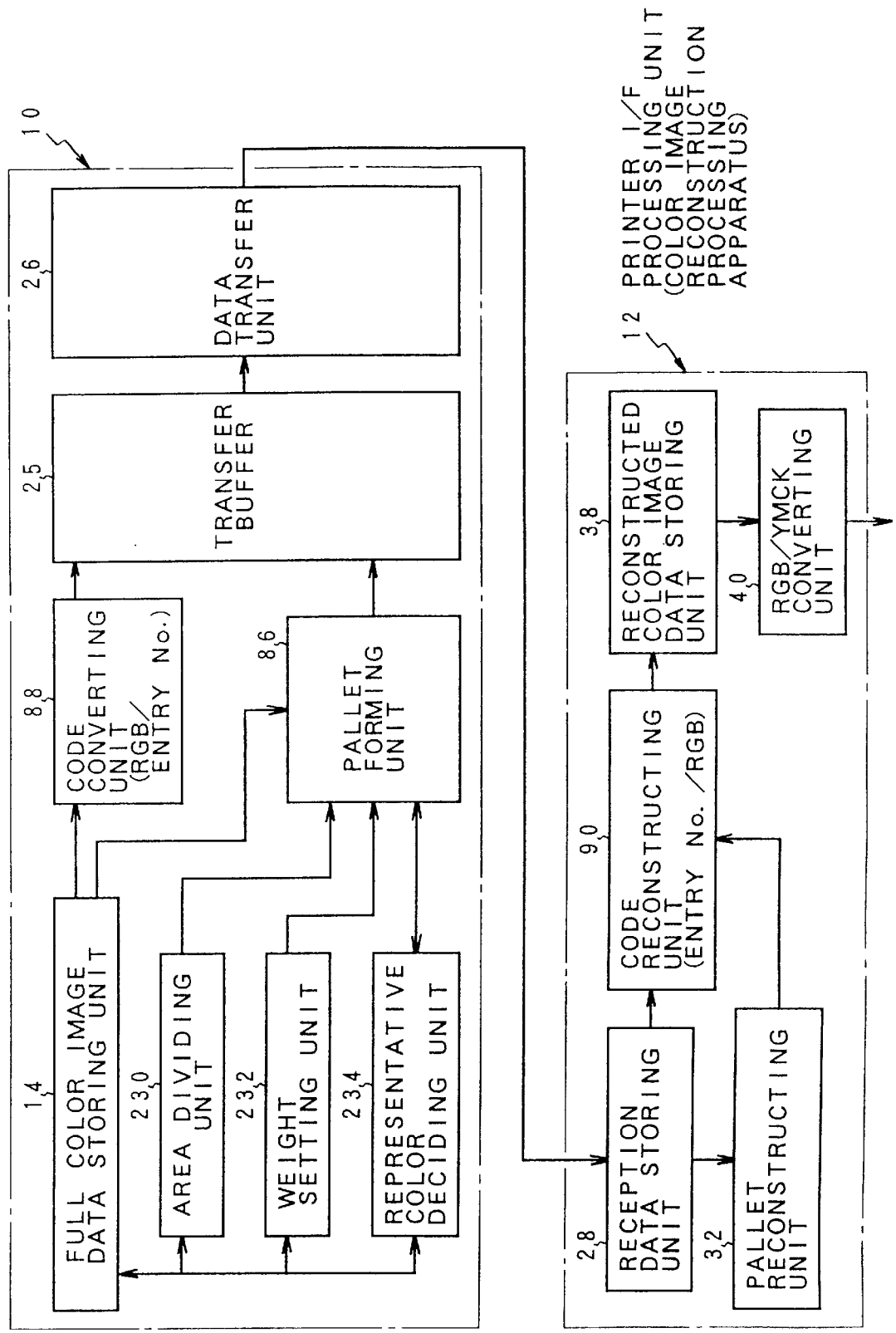
FIG. 34 is a functional block diagram of the third embodiment of a color image transfer apparatus of the invention for deciding a pallet representative color by weighting according to a distance from the boundary.

FIG. 35 is an explanatory diagram of the weight setting by the weight setting unit 232 provided on the driver 10 side in FIG. 34. As color image data 42, the color image 42 having a matrix arrangement corresponding to a print image on the printer side is stored. The color image 42 is divided into three areas #1, #2, and #3 by the area dividing unit 230 in FIG. 34 on the basis of, for instance, boundary lines 236 and 238. The weight setting unit 232 sets a weight according to a distance from the boundary with respect to each of the areas #1, #2, and #3. FIG. 35 shows the weight setting to the center area #2 as an example. As extracted and shown on the right side of the area #2, a weight value (w=0.5) at the boundary position is reduced to 0.4, 0.3, and 0.2 step by step as the position approaches the center from each of the boundaries 236 and 238. Such a weight (w) according to the distances from the boundaries 236 and 238 is used in the pallet forming unit 86 when the representative color of each entry of the subtractive color pallet is determined by the representative color deciding unit 234. That is, in the driver 10, with respect to the full color image data storing unit 14, as shown in FIG. 35, the RGB pixel values are sequentially read out in the row direction every areas #1, #2, and #3 divided by the area dividing unit 230 and they are converted into the halftone codes expressed by the entry numbers of the subtractive color pallet by the code converting unit 88. The halftone codes converted by the code converting unit 88 are stored into the transfer buffer 25. At the same time of the conversion of the RGB pixel values into the halftone codes, the registration of the RGB pixel values as representative color candidates for the corresponding entries among 256 entries is executed in the pallet forming unit 86. That is, as shown in FIG. 25, the subtractive color pallet is constructed by the R pallet 200-1, G pallet 200-2, and B pallet 200-3. The R pixel values are registered as representative color candidates into the area of the R pallet 200-1 which is designated by upper three bits of the R data read out by the color image data storing unit 14. The G pixel values are registered as representative color candidates into the area of the G pallet 200-2 which is designated by upper three bits of the G pixel values. Further, the B pixel values are registered as representative color candidates into the area of the B pallet 200-3 which is designated by upper two bits of the B pixel values, respectively. In the registration of each of the R, G, and B pixel values as representative color candidates for the subtractive color pallet, specifically speaking, the R, G, and B pallets 200-1 to 200-3 in FIG. 25 as mentioned above, the weight setting unit 232 registers the weight (w) set in accordance with the distances from the boundaries 236 and 238 as a parameter for selection of the representative color in combination with the RGB pixel values as shown in FIG. 35. After completion of the registration of all of the pixels, as representative color candidates, of the area which is at present being processed for the subtractive color pallet, the representative color deciding unit 234 determines the representative color every area of the subtractive color pallet. In the decision of the representative color, if a plurality of representative color candidates were stored in the same area, the weight (w) from the boundary in FIG. 35 added to each representative color candidate is checked. The candidates having the largest weight (w=0.5) are selected as representative color candidates. If the number of candidates having the largest weight value (w=0.5) is equal to 1, this candidate is determined to be the representative color of such an area. When a plurality of representative color candidates having the largest weight value (w=0.5) exist, the average value of the pixel values of the plurality of candidates is calculated and set to a representative color. In this case, the candidate locating at the center can be also selected as a representative color in place of the average value. In the decision of the representative color in the subtractive color pallet as mentioned above, as shown in FIG. 25, in each of the R and G pallets 200-1 and 200-2, since the representative color candidates have divisionally been stored in each of the seven areas, the representative color is determined with respect to each area. In the B pallet 200-3, since the representative color candidates have been divisionally stored in four areas, the representative color is similarly determined with regard to each area.

Figure 36:
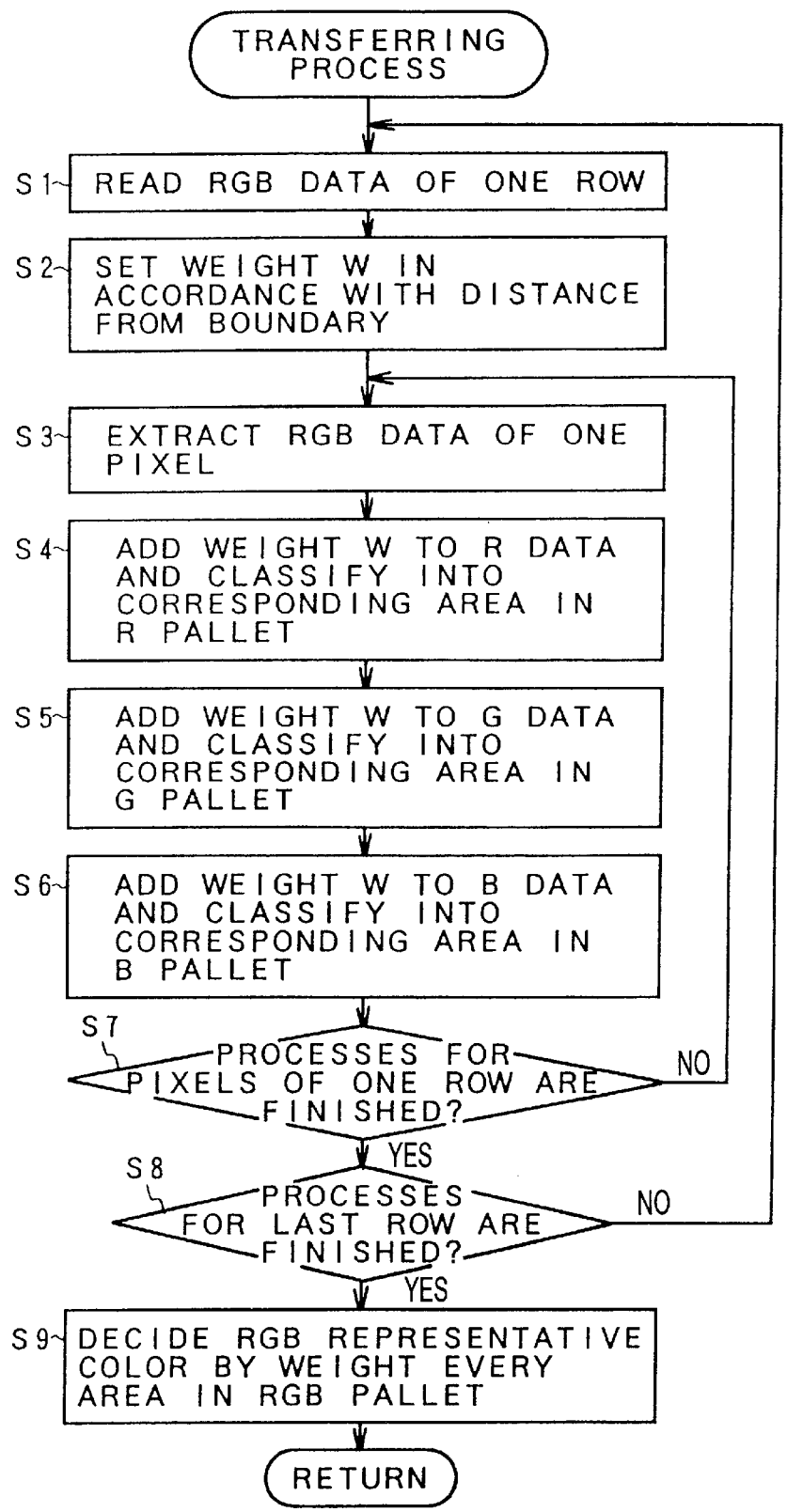
FIG. 36 is a flowchart for a color image transferring process in FIG. 34.

FIG. 36 is a flowchart for the transferring process which is executed on the driver 10 side in FIG. 34. First in step Sl, the RGB data as much as one row of the area of the color image data which is at present a processing target is read. In step S2, the weight (w) is set by the weight setting unit 232 in accordance with the distance of the RGB data of such a row from the boundary. In step S3, the RGB data of one pixel of the row which is at present being processed is extracted. In step S4, the weight (w) is added to the R data, and the resultant data is classified and registered as representative color candidates into the corresponding area of the R pallet. In step S5, the weight (w) is similarly added to the G data and the resultant data is classified and registered as representative color candidates into the corresponding area of the G pallet. Further in step S6, the weight (w) is added to the B data and the resultant data is classified and registered as representative color candidates into the corresponding area of the B pallet. When the processes in steps S3 to S6 mentioned above are executed with respect to all of the pixels of one row in step S7, a check is made to see if the processing row is the last row in step S8. The processes from step S1 are repeated until the last row. When the process of the last row of the area which is at present a processing target is finished, the RGB representative colors are determined by the weight with respect to the representative color candidates stored in each area of the RGB pallets in step S9.

Figure 37:
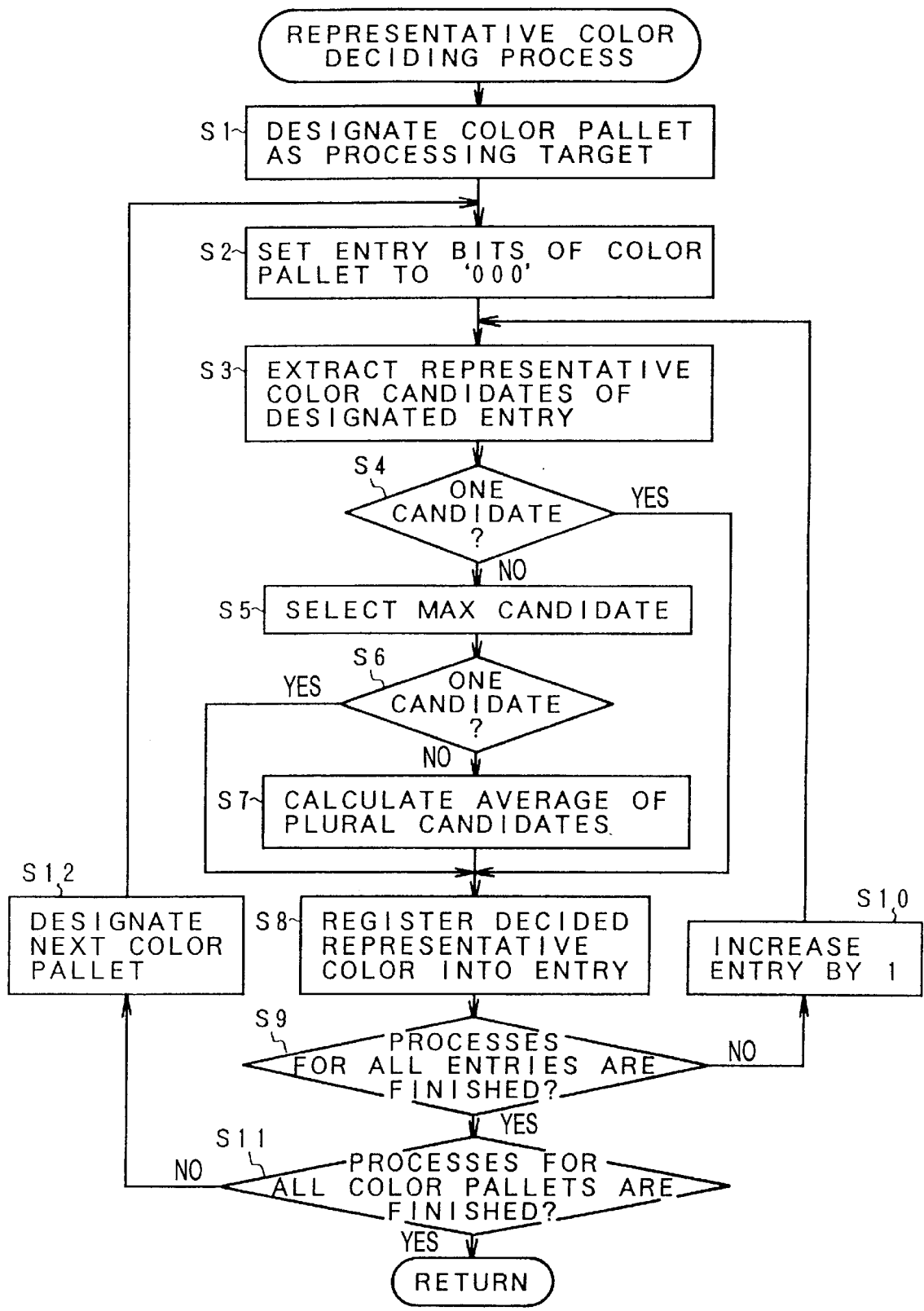
FIG. 37 is a flowchart for a deciding process of the pallet representative color using a weight value in FIG. 34.

FIG. 37 is a flowchart for the deciding process of the representative colors in step S9 in FIG. 36. First in step S1, a specific color pallet, for example, the R pallet among the RGB pallets as processing targets is designated. In step S2, the entry bits to designate the representative color deciding area of the designated color pallet are set to initial values "000". In step S3, the representative color candidates of the designated entry are extracted. If there is one candidate in step S4, step S8 follows and such a candidate is determined to be the representative color. If there are two or more candidates, step S5 follows and the candidates having the largest weight value are selected from a plurality of candidates. If there is one candidate having the largest weight value in step S6, step S8 follows and such a candidate is decided to be a representative color. If a plurality of candidates having the largest weight value exist, step S7 follows. For instance, the average of a plurality of candidates is calculated and the calculated value is set to the representative color in step S8. When the deciding process of the representative color in one pallet entry in steps S3 to S8 is finished, a check is made in step S9 to see if the processes have been finished with respect to all of the entries. If NO, the entry bits are increased by "1" in step S10. The deciding process of the representative color in steps S3 to S9 is repeated with respect to the next pallet entry. When the processes of all of the entries are finished in step S9, step S11 follows and a check is made to see if the processes have been finished with regard to all of the RGB pallets. If NO, the next color pallet, for example, the G pallet is designated in step S12 and the deciding process of the representative color is repeated from step S2 with respect to the G pallet. When the processes are finished with regard to all of the RGB pallets, a series of processes are finished and the processing routine is returned to the main routine. By such a deciding process of the representative color using the weight value according to the distance from the boundary, as a representative color of each entry of the subtractive color pallet, for example, when considering the area #2 in FIG. 35, the representative color candidates near the boundaries 236 and 238 in which the weight (w) is set to the largest value (w=0.5) are finally selected as pallet representative colors. Thus, the color reproducibility near the boundaries 236 and 238 is improved. In the reconstructed color image reconstructed after the halftone data and the representative color data of the subtractive color pallet were transferred to the printer I/F processing unit 12 in FIG. 34, a color deviation in the boundary portion of the area is suppressed and a natural color change according to the original image can be realized.

Subtractive Color Process by Error Distribution

Figure 38:
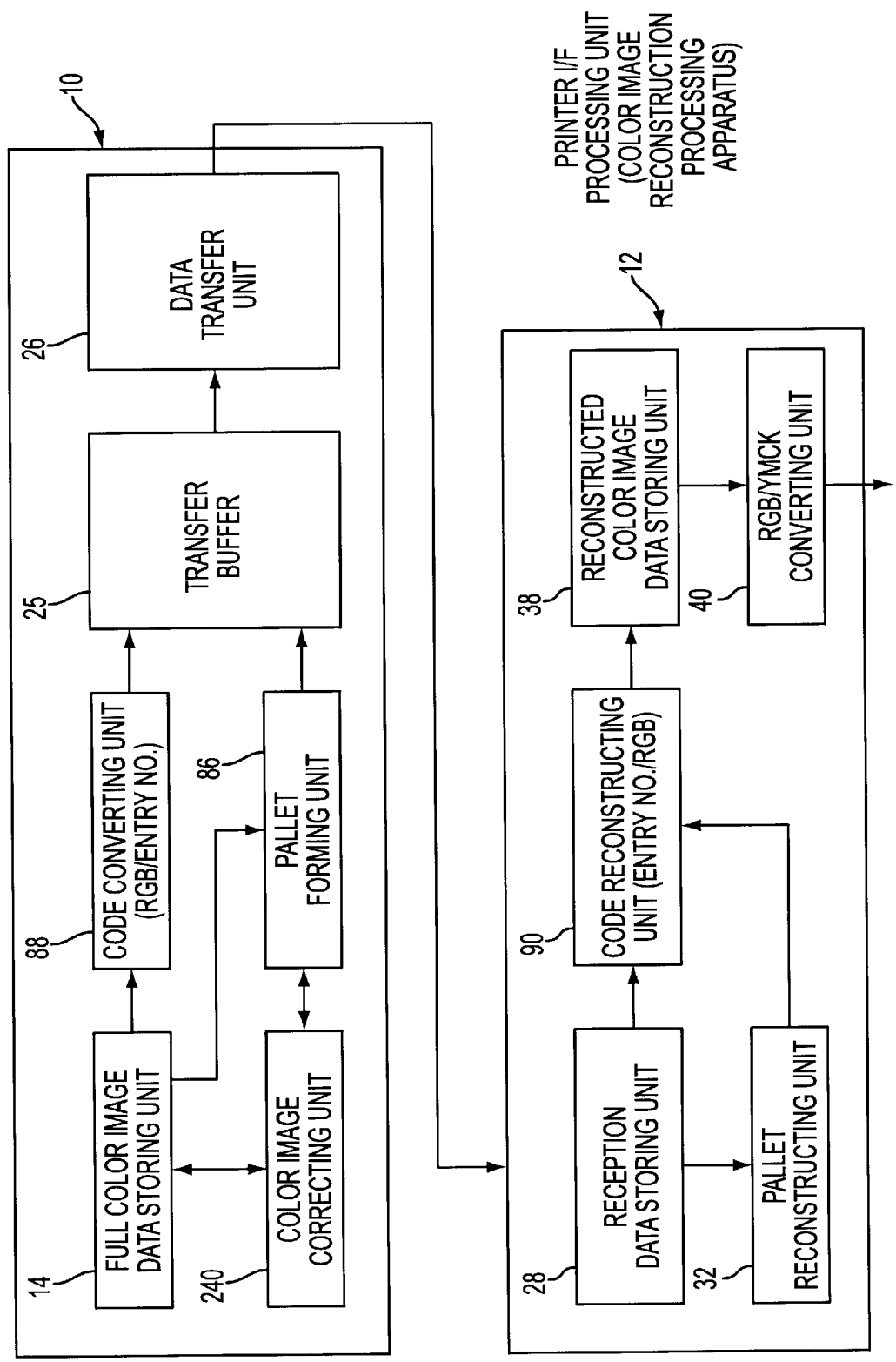
FIG. 38 is a functional block diagram of the fourth embodiment of a color image transfer apparatus of the invention in which an error from the pallet representative color is distributed to the peripheral pixels, thereby correcting a full color pixel value.

FIG. 38 shows the fourth embodiment of a color image transfer processing apparatus of the invention. The fourth embodiment is characterized in that errors between the full color pixel values of the original color image and the representative colors of the subtractive color pallet are detected and the full color pixel values are corrected, thereby making the pixel values approach the pallet representative colors, and after that, the subtractive color process for converting the full color pixel values into halftone codes which are expressed by the entry numbers is executed. The full color image data storing unit 14 is provided for the driver 10 serving as a color image transfer processing apparatus. In a manner similar to the ordinary subtractive color process, the code converting unit 88, pallet forming unit 86, transfer buffer 25, and data transfer unit 26 are provided for the full color image data storing unit 14. In addition to them, in the fourth embodiment of FIG. 38, a color image correcting unit 240 is newly provided for the full color image data storing unit 14. At the stage where the representative color of the subtractive color pallet which is used in the subtractive color process is determined, the color image correcting unit 240 detects an error between each full color pixel value of the area of the color image in the corresponding full color image data storing unit 14 and the corresponding representative color of the subtractive color pallet, distributes the errors to the subsequent peripheral full color pixel values, and corrects the full color pixel values so as to approach the pallet representative colors.

Figure 39:
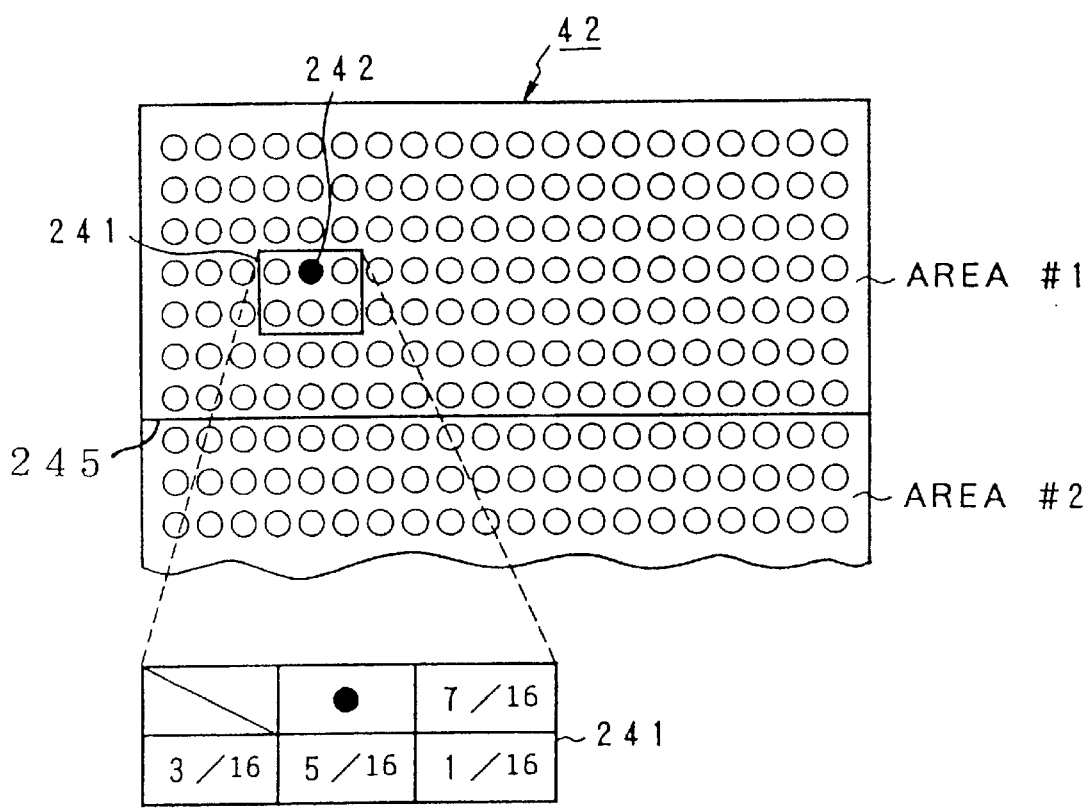
FIG. 39 is an explanatory diagram of the error distribution of the pallet representative color.

FIG. 39 shows a specific example of the correcting process by the color image correcting unit 240. In the color image 42, the full color pixels, for example, RGB pixel data is arranged on a row unit basis in correspondence to a printer image and the color image is divided into a plurality of areas for the subtractive color process and shows the head area #1 in FIG. 39. With respect to the divided area #1, the RGB data is sequentially taken out from the head of the first row and registered as representative color candidates into the entries of the subtractive color pallet. After the registration of all of the pixels was finished, the representative color is decided every entry, thereby forming the subtractive color pallet suitable for the area #1. When the subtractive color pallet suitable for the area #1 can be formed, while reading out the pixels of the area #1 from the head, errors between the read-out pixels and the representative color of the corresponding entry of the formed subtractive color pallet are detected. FIG. 39 relates to the case where the fifth pixel from the head of the fourth row of the area #1 is set to a target pixel 242 serving as a processing target. Errors between the RGB data of the target pixel 242 and the representative colors of the subtractive color pallet which were formed from the RGB data of the target pixel 242 and were referred by the entry numbers are detected. For example, now assuming that the RGB pixel data of the target pixel 242 is labeled as (IR, IG, IB) and the representative colors of the subtractive color pallet corresponding thereto are labeled as (CR, CG, CB), errors ΔR, ΔG, and ΔB between them are calculated by $$\Delta R = IR - CR$$

$$\Delta G = IG - CG$$

$$\Delta B = IB - CB$$

The errors (ΔR, ΔG, ΔB) between the target pixel 242 and the corresponding pallet representative colors are distributed to the peripheral pixels in accordance with a distribution ratio that is determined by a template 241 set for the target pixel 242, thereby correcting the RGB data of the corresponding peripheral pixels. As cut-out and shown on the lower side, the template 241 is made up of six blocks of (vertical×lateral=2×3) and the target pixel 242 is set at the upper column center. A distribution ratio 7/16 is set at the pixel position of the same row subsequent to the target pixel 242. A distribution ratio (3/16) is set at the pixel position on the oblique left lower side of the next row. A distribution ratio (5/16) is set to the next row at the same position as that of the target pixel 242. A distribution ratio (1/16) is set at the adjacent pixel position. As for the distribution ratios (7/16) to (1/16), it will be understood that as the distance from the target pixel 242 is closer, a larger distribution ratio is set and as the distance is far from the target pixel 242, a smaller distribution ratio is set. Therefore, by multiplying the errors (ΔR, ΔG, ΔB) between the target pixel 242 and the corresponding pallet representative colors by the distribution ratios (7/16), (3/16), (5/16), and (1/16) which are given by the template 241, respectively, the distribution values for the RGB data at the respective positions are calculated. By adding the distribution values to the values of the RGB data at the respective positions, the pixel values are corrected. By the correction due to the distribution of the errors according to the distribution ratios of the template 241, the RGB data of the subsequent pixels existing around the target pixel 242 is corrected so as to approach the representative colors of the subtractive color pallet corresponding to the target pixel 242. The correction by setting the template 241 for the target pixel 242 is sequentially executed from the head pixel at the left edge of the first row of the area #1 to the last pixel at the right corner of the seventh row of the area #2. With respect to the pixels of the rows in front of a boundary 245 between the areas #1 and #2, the errors between the RGB data of the area #1 and the pallet representative colors are distributed to the pixels of the head row of the area #2, so that the pixel values are corrected. Even if the subtractive color pallets having the different pallet representative colors in the areas #1 and #2 are used, by the above correction, the representative colors near the boundary 245 of the area #2 are eventually corrected so as to approach the representative color of the subtractive color pallet of the area #1.

Figure 40A:
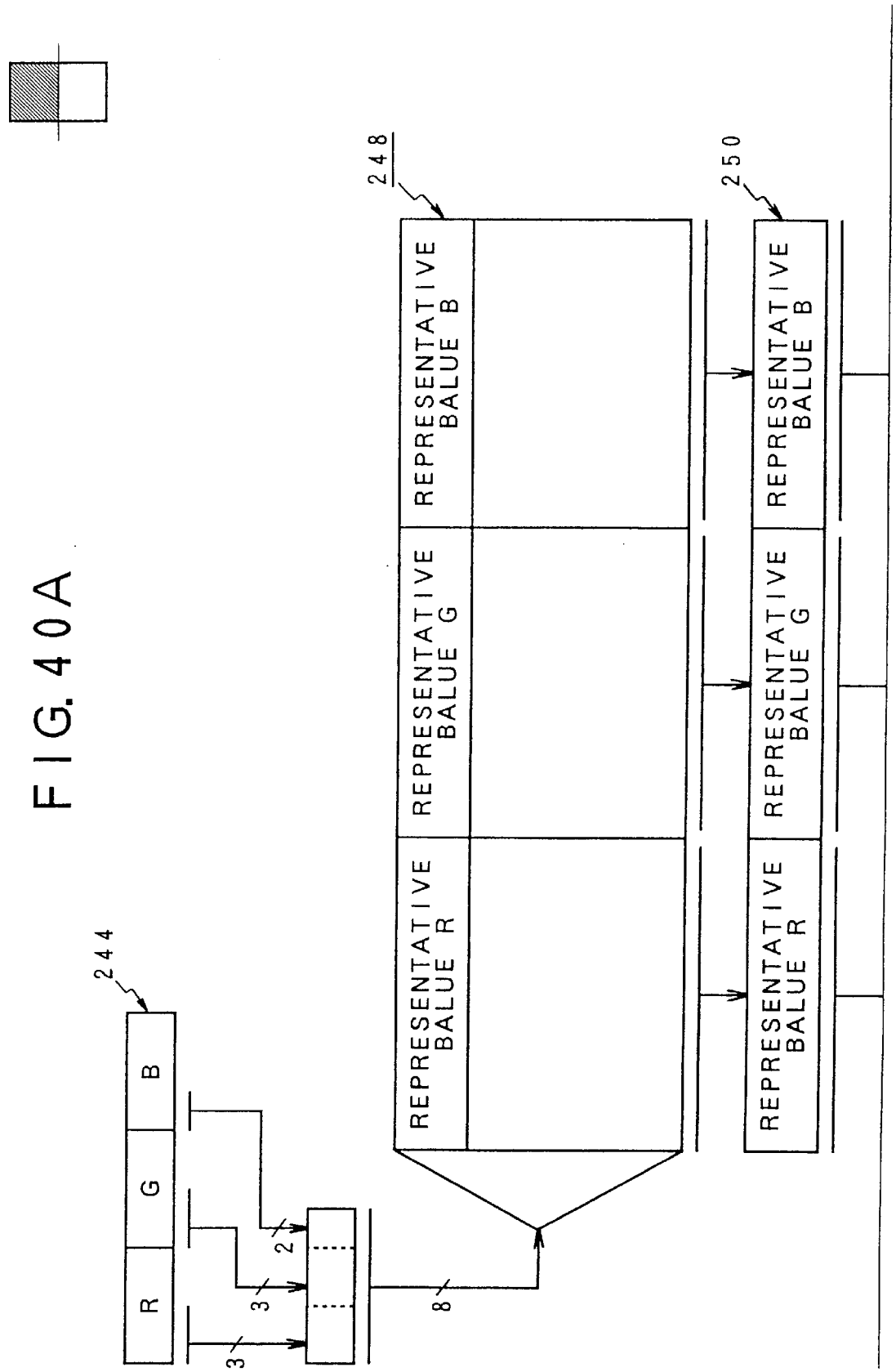

FIGS. 40A and 40B show a specific functional block of the color image correcting unit 240 provided on the driver 10 side in FIG. 38. For example, the values of R, G, and B of the target pixel 242 in FIG. 39 are stored in an RGB register 244. An entry register 246 extracts upper three bits for the R data, upper three bits for the G data, and upper two bits for the B data with respect to the pixel values of R, G, and B stored in the RGB register 244 and forms the entry numbers of the subtractive color pallet of total eight bits. At the time of the correction by the error detection values, since a subtractive color pallet 248 of the area #1 has already been formed, the corresponding representative values R, G, and B are read out into a representative color register 250 with reference to the subtractive color pallet 248 by the values in the entry register 246. Each of the representative values R, G, and B read out to the representative color register 250 is inputted to one input terminal of each of subtractors 252-1, 252-2, and 252-3. Each of the values of R, G, and B of the target pixel 242 stored in the RGB register 244 which is separately shown for convenience of explanation is inputted to the other input terminal of the subtractors 252-1, 252-2, and 252-3. The errors ΔR, ΔG, and ΔB are obtained by the subtraction between both of the input values, respectively. After the errors ΔR, ΔG, and ΔB were stored into an error register 254, they are outputted to an error line buffer 256. The errors ΔR, ΔG, and ΔB stored in the error line buffer 256 are subjected to the correction arithmetic operation of the peripheral pixels by a full color pixel correcting unit 258 on the basis of the selection of the peripheral pixels based on the template 241 in FIG. 37 and the distribution ratios of the detected errors. When the correction arithmetic operation by the color image correcting unit 240 as shown in FIGS. 40A and 40B is finished with respect to all of the pixels of, for instance, the area #1 in FIG. 39 in the full color image data storing unit 14, with respect to the full color pixels, namely, RGB pixel data of the area #1 after the correction, upper three bits of the R component value, upper three bits of the G component value, and upper two bits of the B component value are extracted by the same function as that of the entry register 246 in FIGS. 40A and 40B and are converted into the halftone codes expressed by the entry numbers of the subtractive color pallet 248 by the code converting unit 88 in FIG. 38. The halftone codes are stored into the transfer buffer 25. With respect to the 256 representative colors of the subtractive color pallet 248 of the area #1 formed by the pallet forming unit 86 as well, the halftone codes are similarly stored into the transfer buffer 25. When the halftone codes as much as one area and the representative color data of the subtractive color pallet can be prepared in the transfer buffer 25, the data transfer unit 26 is activated and the data is transferred to the printer I/F processing unit 12 functioning as a color image reconstruction processing apparatus. The transfer data from the driver 10 is stored into the reception data storing unit 28 of the printer I/F processing unit 12. The subtractive color pallet is reconstructed from the reception data by the pallet reconstructing unit 32. The reconstructed subtractive color pallet is set into the code reconstructing unit 90. The representative colors of the subtractive color pallet are read out by the input of the entry numbers received from the reception data storing unit. The color image data expressed by the representative colors is stored into the reconstructed color image data storing unit 38. In the reconstructed color image data, since the original color image has already been subjected to the correction so as to approach the representative color of the subtractive color pallet by the color image correcting process on the driver 10 side, the color reproducibility between the corrected color image and the reconstructed color image is extremely good, a color deviation hardly occurs in the boundary portion of the areas, and a natural color change can be also realized.

Figure 41:
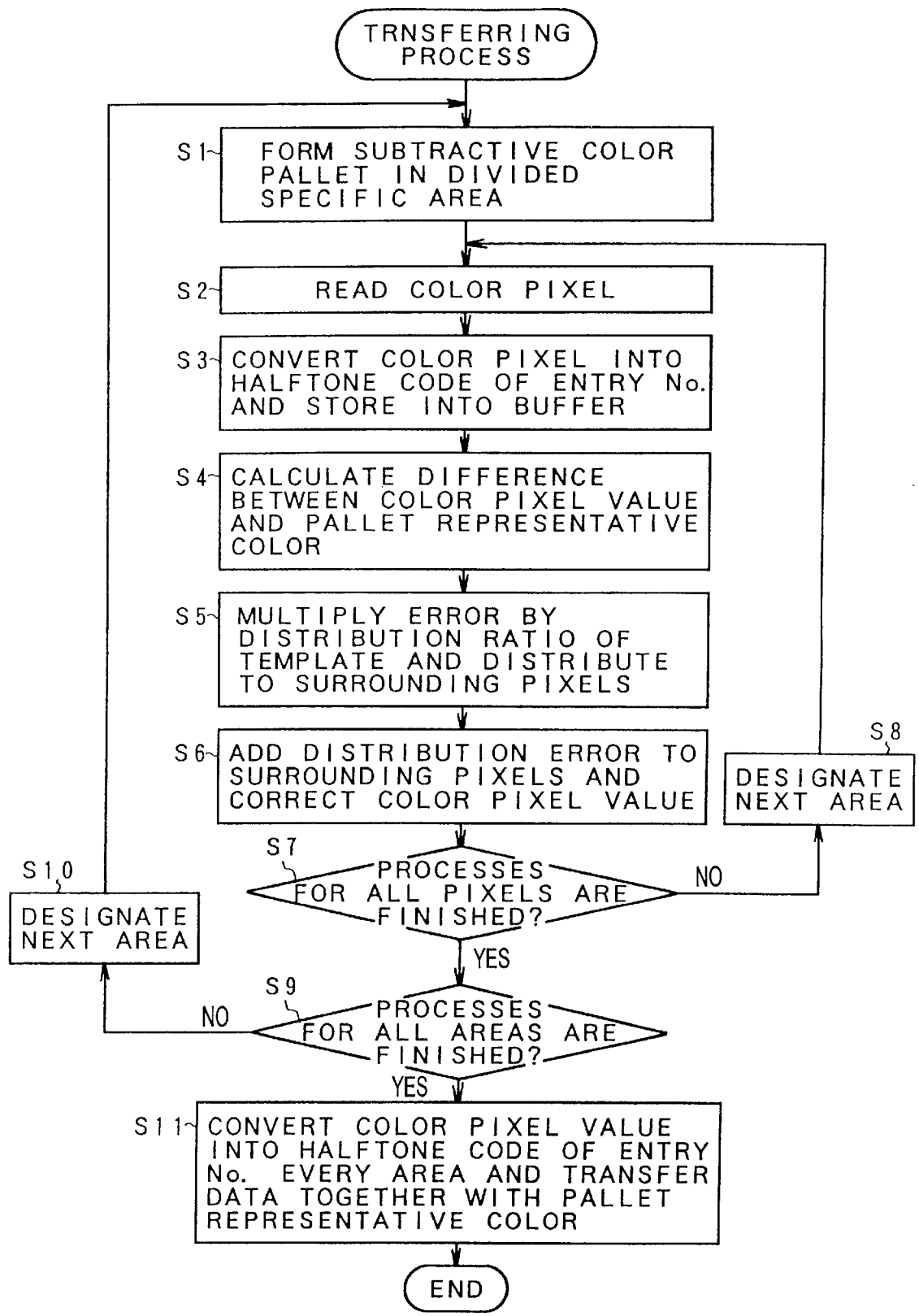
FIG. 41 is a flowchart for a transferring process accompanied with the correction by the error distribution of the color image according to the embodiment of FIG. 36.

FIG. 41 is a flowchart for the transferring process on the driver 10 side in FIG. 38. First in step S1, a subtractive color pallet of a specific area obtained by dividing the color image is formed. For example, after all of the pixels of the area #1 in FIG. 39 were read out as a subtractive color pallet and registered as representative color candidates into the corresponding entries of the subtractive color pallet, the representative color is determined by the average calculation or the like with respect to each entry. As another forming method of the subtractive color pallet, it is also possible to prepare a plurality of kinds of subtractive color pallets of different representative colors, to select the subtractive color pallet optimum to the area as a processing target from those plurality of subtractive color pallets, and to execute the color image correcting process and the subsequent conversion into the halftone codes. As a method of selecting the optimum one of the plurality of subtractive color pallets, it is sufficient to obtain differences between the full color pixel values of the area and the representative color of the corresponding subtractive color pallet and to select the subtractive color pallet in which the difference is the minimum value as an optimum subtractive color pallet. When the subtractive color pallet can be formed in step S1, the first full color pixel is read in step S2. In step S3, an entry number of the subtractive color pallet is formed from the read full color pixel, thereby obtaining the representative color with reference to the subtractive color pallet. In step S4, an error between the full color pixel and the pallet representative color is calculated. In step S5, a distribution ratio of every distribution pixel of the template 241 in FIG. 39 is multiplied to the calculated error, thereby distributing the error to the corresponding peripheral full color pixels. In step S6, the full color pixels are corrected by adding the calculated distributed errors to the peripheral full color pixels. Until such a correcting process in steps S2 to S6 is finished with respect to all of the pixels of the area which is at present a processing target in step S7, the processes are repeated while designating the next pixel in step S8. When the processes of all of the pixels are finished with respect to the area which is at present a processing target, a check is made in step S9 to see if the processes have been finished for all of the areas. If NO, the next area is designated in step S10 and the processes from step S1 are repeated. When the processes for all of the areas are finished in step S9, the full color pixel values of the corrected color image are converted into the halftone codes expressed by the entry numbers of the subtractive color pallet every area in step S11. The data is transferred together with the representative color of the corresponding subtractive color pallet of each area. In the processes in FIG. 41, after the processes of all of the areas were finished in step S9, the data transfer is started in step S11. However, the data transfer can be also performed each time the process is finished every area.

Area Division of Subtractive Color Process

Figure 42A:
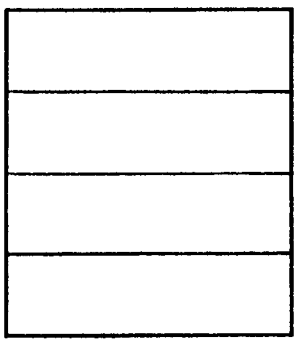
FIGS. 42A to 42G are explanatory diagrams of an area division according to the invention.
Figure 42B:
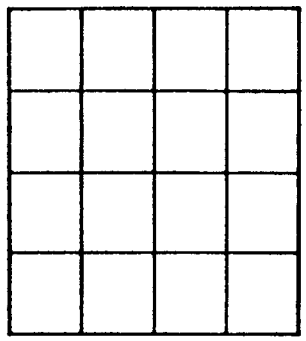
Figure 42C:
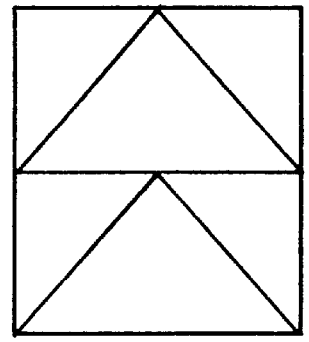
Figure 42D:
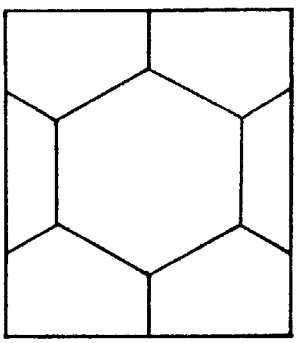
Figure 42E:
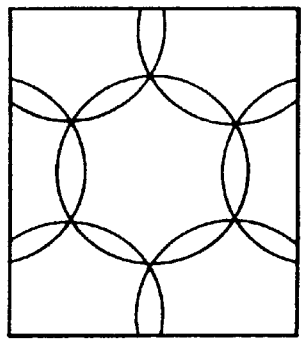
Figure 42F:
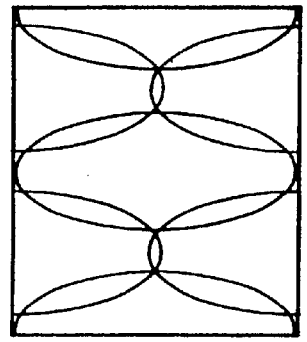
Figure 42G:
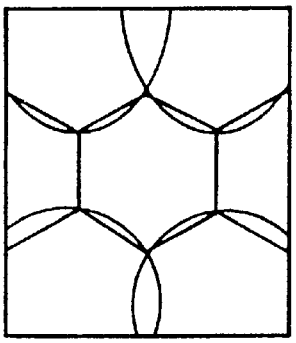

In the color image transfer processing apparatus as a target of the invention, the area division is performed in a predetermined range in the row direction with respect to the color image arranged on a row unit basis in correspondence to the printer image. However, by optimizing the area division, the color reproducibility in case of reconstructing by performing the subtractive color process by the subtractive color pallet every area is improved and the color deviation in the boundary portion can be reduced. FIGS. 42A to 42G show examples of geometrical division of a color image. That is, FIG. 42A shows a strap division and by setting a boundary in the row direction, the color image is divided into a plurality of areas. FIG. 42B shows a rectangular division and the color image is divided into a matrix shape in the row direction and the direction perpendicular to the row direction. FIG. 42C shows a triangular division and the color image is divided into a plurality of triangles. FIG. 42D shows a polygonal division and relates to a hexagon as an example and the color image is divided into a plurality of hexagons. FIG. 42E shows a circular division and the color image is divided into a plurality of circles and an overlap of circles is permitted in this case. FIG. 42F shows an oval division and the color image is divided into a plurality of ovals and an overlap of ovals is also permitted in this case. FIG. 42G shows a random division corresponding to a combination of any ones of dividing patterns of FIGS. 42A to 42F and an overlap is also permitted. By selecting any one of the geometrical dividing patterns of FIGS. 42A to 42G in accordance with the contents of the color image, it is possible to perform the reconstruction by the more proper subtractive color process. As dividing methods other than such a geometrical division, there are a statistical division and an object division. According to the statistical division, a shape to divide the color image is determined on the basis of statistical nature such as a natural image or the like. Although the divided shape has an arbitrary shape depending on a target image, it doesn't have an overlap. In the statistical division, there are two dividing methods of a color difference boundary division and a lightness boundary division. According to the color difference boundary division, an area having a color difference is cut out and set to a divided area. Specifically speaking, the area division can be performed by a golden cut color difference search method or a per target search method. In the lightness boundary division, "high", "middle", and "low" of the lightness are discriminated and the area is divided on the basis of the lightness, thereby attaching importance to the color reproducibility of, for example, the area in the middle lightness portion. Even in the lightness boundary dividing method, specifically speaking, a lightness search of the golden cut or a lightness search per target can be applied. Further, in the object division, by obtaining an object and a style of painting of a natural painting as parameters, the dividing shape is selected. In this case as well, for example, a golden cut is applied and by designating the position to which the golden cut is reflected, the dividing shape is determined. In the object division, the dividing shape is determined by a style of painting such as circle, portrait, collective photograph, or the like.

According to the invention as mentioned above, the following effects are obtained.

According to the color image transfer processing apparatus and method of the invention regarding the switching transfer of the full color format and the pallet format, the number of transfer pixels up to the end of one-previous row when the number of colors of the color image exceeds the number of entries of the subtractive color pallet is counted and the data is transferred by the format of a smaller transfer data amount between the full color format and the pallet format. With this method, in the data transfer of the pallet format, the different color pixel values which are used in the area as a transfer target are transferred as they are as pallet representative colors. The color reproducibility on the transfer destination side is extremely high and no color deviation occurs in the boundary portion. The color image is divided into relatively narrow areas and is transferred by the format of the smaller transfer data amount between the full color format and the pallet format. As compared with the case of only the full color format, the transfer data amount can be reduced.

According to the color image transfer processing apparatus and method of the invention regarding the retrieval setting of the area boundary, by retrieving the row without a color change and dynamically setting the boundary with regard to the color image, the color image is divided into a plurality of areas in which the row having no color change because the same color is arranged is set to the start position and the next row without a color change is set to the end position. The colors near the boundary are preferentially selected as representative colors of the subtractive color pallet. The color reproducibility is improved in the boundary portion and the boundary portion in the reconstructed color image can be made inconspicuous.

According to the color image reconstruction processing apparatus and method of the invention regarding the formation of the boundary area on the receiving side, a new area including the reception boundary is set on the receiving side, a new subtractive color pallet in which the representative color has been decided is formed from the subtractive color pallets of the areas on both sides which were received with respect to the boundary area, the halftone codes are converted into the representative colors. Thus, a smoothing in which the color smoothly changes in the boundary portion is performed and a natural color change in the boundary portion can be realized.

According to the color image transfer processing apparatus and method of the invention regarding the weighting corresponding to the distance from the boundary, since the representative colors of the subtractive color pallet are determined on the basis of the weight according to the distance from the boundary, the colors in the boundary portion of the area are preferentially registered into the subtractive color pallet. The color reproducibility in the boundary portion is raised. The color deviation in the area boundary in the reconstructed image is reduced and unnaturalness is eliminated.

According to the color image transfer processing apparatus and method of the invention regarding the distribution of the errors between the color pixel values and the pallet representative colors, the errors between the representative colors of the subtractive color pallet and the primary color pixels are detected and distributed to the subsequent peripheral pixels, thereby correcting the primary color pixels. Thus, the color of the original color image is made approach the representative color of the subtractive color pallet. Consequently, the color reproducibility by the subtractive color pallet is improved, the color deviation in the boundary portion is prevented, and a color image of a natural color change can be reconstructed.

Further, according to the color image transfer processing apparatus of the invention regarding the dividing shape of the area, the color image is divided by the geometrical division, statistical division, object division, or the like. Each color pixel value is converted into the halftone code expressed by the entry number of the subtractive color pallet every area. In the pallet forming unit, the representative color of each entry is decided and the subtractive color pallet is formed every area. The halftone codes and the representative colors of the subtractive color pallet of each area are transferred, thereby optimizing the area division of the color image and eliminating the color deviation in the boundary portion of the reconstructed image. A natural color change can be realized.

Although the above embodiments have been shown and described with respect to the case of transferring the color image formed by the personal computer to the color printer and printing as an example, the invention can be also applied to the data transfer between arbitrary apparatuses which deal with a color image. The invention is not limited to the foregoing embodiments but incorporates proper variations and modifications within the scope of the invention without departing from the objects of the invention. The invention is also not limited by the numerical values shown in the embodiments.

What is claimed is:

1. A color image transfer processing apparatus for compressing and transferring color image data of a full color space having a number of colors which are expressed by full bits of color pixel values, comprising:

a calculating unit counting a number (A) of colors as a number of different color pixel values while scanning pixels of said color image data every row;

a pallet forming unit which has a storing area of representative colors of a predetermined number of entries, sequentially stores full color pixel values as representative colors into said predetermined number of entries each time said number (A) of colors is counted up, and forms a subtractive color pallet;

a transfer format discriminating unit counting a number (N) of transfer pixels starting with a first pixel counted by the calculating unit up to the end of a previous row when said number (A) of colors exceeds a predetermined number (n) of entries of the subtractive color pallet, comparing a transfer data amount according to a full color format of the number (N) of transfer pixels with a transfer data amount according to a pallet format, and instructing data transfer according to a format of a smaller one of transfer data amounts;

and a data transfer unit for forming and transferring pallet format data including halftone codes obtained by converting color pixel values to entry numbers (E) of the subtractive color pallet and the representative colors of said subtractive color pallet when an instruction of the data transfer in said pallet format is received and forming and transferring full color format data including said color pixels as they are when an instruction of the data transfer in said full color format is received.

2. An apparatus according to claim 1, wherein said transfer format discriminating unit instructs the data transfer of the pallet format when said number (N) of transfer pixels is equal to or larger than a predetermined discrimination threshold value (B) and instructs the data transfer of said full color format when said number of transfer pixels is less than said discrimination threshold value (B).

3. An apparatus according to claim 1, wherein in said transfer format discriminating unit, in the case where the color pixel value of said full color space is constructed by three color component values and the predetermined number of entries of said subtractive color pallet is equal to said predetermined number (n), the number No of transfer pixels in which the transfer data amount of said full color format and the transfer data amount of said pallet format are equals is obtained by $$(No \times 3) = (n \times 3) + No$$

and a predetermined margin a is added to said number No of transfer pixels, thereby obtaining said discrimination threshold value (B).

4. An apparatus according to claim 3, wherein in the case where the predetermined number (n) of entries of said subtractive color pallet is equal to 256 entries, said transfer format discriminating unit uses $$B = 384 + \alpha$$

as said discrimination threshold value (B).

5. An apparatus according to claim 3, wherein in the case where the predetermined number (n) of entries of said subtractive color pallet is equal to 128 entries, said transfer format discriminating unit uses $$B = 192 + \alpha$$

as said discrimination threshold value (B).

6. An apparatus according to claim 3, wherein in the case where the predetermined number (n) of entries of said subtractive color pallet is equal to 64 entries, said transfer format discriminating unit uses

B=96+α as said discrimination threshold value (B).

7. An apparatus according to claim 3, wherein in the case where the predetermined number (n) of entries of said subtractive color pallet is equal to 32 entries, said transfer format discriminating unit uses

B=48+α as said discrimination threshold value (B).

8. An apparatus according to claim 1, wherein said data transfer unit adds identification information indicative of either said pallet format or said full color format to said transfer data and transfers the identification information.

9. An apparatus according to claim 1, wherein in said transfer format discriminating unit, when the transfer data amount of the pallet format is larger than the transfer data amount of the full color format, a counting operation of the number (A) of colors by said calculating unit and the formation of the subtractive color pallet by said pallet forming unit are executed, thereby allowing the data transfer of said pallet format to be executed until the transfer data amount of said pallet format is smaller than the transfer data amount of said full color format while limiting a number of upper bits by reducing a number of bits of the color pixel one bit by one from a least significant bit.

10. An apparatus according to claim 9, wherein in said transfer format discriminating unit, in the case where each of three color component values of the co-or pixel of said full color space is constructed by (n) bits and the number of entries of said subtractive color pallet is constructed by (n) bits, the counting operation of the number (A) of colors by said calculating unit and the formation of the subtractive color pallet by said pallet forming unit are executed, thereby allowing the data transfer of the pallet format to be executed until the data amount of said pallet format is sufficiently smaller than the data amount of said full color format while limiting a number of upper bits to (n−1), (n−2), (n−3), ... , and (n−i) by reducing the number of bits of each of said color component values one bit by one from the least significant bit.

11. An apparatus according to claim 10, wherein in said transfer format discriminating unit, in the case where each of the three color component values of the color pixels of said full color space is constructed by eight bits and entry of said subtractive color pallet is constructed by eight bits, the counting operation of the number (A) of colors by said calculating unit and the formation of the subtractive color pallet by said pallet forming unit are executed, thereby allowing the data transfer of the pallet format to be executed until the data amount of said pallet format is sufficiently smaller than the data amount of said full color format while reducing a number of bits of each of said color component values one bit by one from the least significant bit to upper seven bits, six bits, and five bits.

12. An apparatus according to claim 11, wherein when a plurality of representative color candidates exist in a same entry due to reduction of lower bits, said pallet forming unit sets a center color to a representative color.

13. An apparatus according to claim 11, wherein when a plurality of representative color candidates exist in a same entry due to reduction of lower bits, said pallet forming unit sets an average color to a representative color.

14. An apparatus according to claim 1, wherein said transfer format discriminating unit executes the counting operation of the number (A) of colors by said number of colors calculating unit and the formation of the subtractive color pallet by said pallet forming unit, thereby allowing the data transfer of the pallet format or the full color format to be executed while limiting a number of bits of the color pixel to the number of upper bits obtained by reducing a number of bits one bit by one from the least significant bit in accordance with positions of a plurality of display areas obtained by dividing said color image data.

15. An apparatus according to claim 14, wherein a pixel bit limiting unit increases a number of upper bits in a center area of a display area and decreases a number of upper bits in a side area.

16. A color image transfer processing method of compressing and transferring color image data of a full color space having a number of colors which is expressed by full bits of color pixel values, comprising:

a calculating step of the number of colors for counting a number (A) of colors as a number of different color pixel values while scanning pixels of said color image data every row;

a pallet forming step which has a storing area of representative colors of a predetermined number of entries, sequentially stores said full color pixel values as representative colors into said entries each time said number (A) of colors is counted up, and forms a subtractive color pallet;

a transfer format discriminating step of counting a number (N) of transfer pixels starting with a first pixel counted by the calculating unit up to the end of a previous row when said number (A) of colors exceeds the number (n) of entries of the subtractive color pallet, comparing a transfer data amount according to a full color format of the number (N) of transfer pixels with a transfer data amount according to a pallet format, and instructing data transfer according to a format of a smaller one of transfer data amounts; and a data transfer step of forming and transferring pallet format data including halftone codes obtained by converting said color pixels to entry numbers of the subtractive color pallet and the representative colors of said subtractive color pallet when an instruction of the data transfer of said pallet format is received and forming and transferring the full color format data including said full color pixels as they are when an instruction of the data transfer of said full color format is received.

17. A method according to claim 16, wherein in said transfer format discriminating step, when the transfer data amount of the pallet format is larger than the transfer data amount of the full color format, a counting operation of the number (A) of colors by said number of colors calculating step and the formation of the subtractive color pallet by said pallet forming step are executed, thereby allowing the data transfer of the pallet format to be executed until the transfer data amount of said pallet format is smaller than the transfer data amount of said full color format while limiting the number of upper bits by reducing a number of bits of the color pixel one bit by one from a least significant bit.

18. A method according to claim 16, wherein in said transfer format discriminating step, the counting operation of the number (A) of colors by said number of colors calculating step and the formation of the subtractive color pallet by said pallet forming step are executed, thereby allowing the data transfer of the pallet format or the full color format to be executed while limiting the number of bits of the color pixel to the number of upper bits obtained by reducing said number of bits one bit by one from the least significant bit in accordance with positions of a plurality of display areas obtained by dividing said color image.

19. A color image transfer system having a color image transfer processing apparatus for compressing and transferring color image data of a full color space having a number of colors which are expressed by full bits of color pixel values and a color image reconstruction processing apparatus for reconstructing the color image data from said transfer data, wherein said color image transfer processing apparatus comprises:

- a calculating unit of the number of colors for counting a number (A) of colors as a number of different color pixel values while scanning pixels of said color image data every row;
- a pallet forming unit which has a storing area of representative colors of a predetermined number of entries, sequentially stores said full color pixel values as representative colors into said entries each time said number (A) of colors is counted up, and forms a subtractive color pallet;
- a transfer format discriminating unit for counting a number (N) of transfer pixels starting with a first pixel counted by the calculating unit up to the end of a previous row when said number (A) of colors exceeds a number of entries of the subtractive color pallet, comparing a transfer data amount according to the full color format of the number (N) of transfer pixels with a transfer data amount according to the pallet format, and instructing data transfer according to the format of a smaller one of the transfer data amounts; and
- a data transfer unit for forming and transferring pallet format data including halftone codes obtained by converting said full color pixels to entry numbers of the subtractive color pallet and representative colors of said subtractive color pallet when an instruction of the data transfer in said pallet format is received and forming and transferring full color format data including said full color pixels as they are when an instruction of the data transfer in said full color format is received, and said color image reconstruction processing apparatus comprises:

- a reception data discriminating unit for discriminating whether the color image data transferred from said color image transfer processing apparatus is based on the full color format or the pallet format;
- a full color format data reconstructing unit for reconstructing full color image data from said reception data when said reception data discriminating unit determines the full color format; and
- a pallet format data reconstructing unit for reconstructing said subtractive color pallet from said reception data when said reception data discriminating unit determines the pallet format and reconstructing the full color image data using the pallet representative colors with reference to said reconstructed pallet by the entry numbers of the received halftone codes.

* * * * *